United States Patent
Li et al.

(10) Patent No.: US 12,025,489 B1
(45) Date of Patent: Jul. 2, 2024

(54) FIBER-OPTICAL SENSOR SYSTEM FOR ULTRASOUND SENSING AND IMAGING

(71) Applicant: DEEPSIGHT TECHNOLOGY, INC., Los Altos, CA (US)

(72) Inventors: Fu Li, St. Louis, MO (US); Mucong Li, St. Louis, MO (US); Yihang Li, St. Louis, MO (US); Linhua Xu, University City, MO (US); Lan Yang, Clayton, MO (US); Guangming Zhao, Beijing (CN); Jiangang Zhu, St. Louis, MO (US); Mike Hazarian, San Jose, CA (US)

(73) Assignee: DEEPSIGHT TECHNOLOGY, INC., Santa Clara, CA (US)

( * ) Notice: Subject to any disclaimer, the term of this patent is extended or adjusted under 35 U.S.C. 154(b) by 0 days.

(21) Appl. No.: 18/492,593

(22) Filed: Oct. 23, 2023

Related U.S. Application Data

(60) Provisional application No. 63/510,079, filed on Jun. 23, 2023.

(51) Int. Cl.
*G01H 9/00* (2006.01)
*G01D 5/353* (2006.01)

(52) U.S. Cl.
CPC ......... *G01H 9/004* (2013.01); *G01D 5/35316* (2013.01); *G01H 9/002* (2013.01); *G01H 9/008* (2013.01)

(58) Field of Classification Search
None
See application file for complete search history.

(56) References Cited

U.S. PATENT DOCUMENTS

| | | | |
|---|---|---|---|
| 5,961,463 | A | 10/1999 | Rhyne et al. |
| 8,560,048 | B2 | 10/2013 | Rourke et al. |
| 10,595,816 | B2 | 3/2020 | Tahmasebi Maraghoosh et al. |
| 2008/0128506 | A1 | 6/2008 | Tsikos et al. |

(Continued)

FOREIGN PATENT DOCUMENTS

WO 2021055823 A2 3/2021

OTHER PUBLICATIONS

Baker et al., "Intraoperative Needle Tip Tracking with an Integrated Fibre-Optic Ultrasound Sensor," Sensors 22(9035):1-28 (2022).

(Continued)

*Primary Examiner* — Brandi N Hopkins
*Assistant Examiner* — Nigel H Plumb
(74) *Attorney, Agent, or Firm* — MEDLER FERRO WOODHOUSE & MILLS PLLC

(57) ABSTRACT

Optical fiber based acoustic sensors are provided herein. The optical fiber based acoustic sensors described herein include acoustically responsive optical structures configured to detect and receive acoustic signals, including ultrasound signals, and provide associated optical signals to a system for processing and interpretation to implement tracking, location, and imaging capabilities. Optical fiber based sensors provided herein may be disposed at ends of or along the length of optic fibers. Optical fiber based sensors may be included within various devices, including, for example, medical devices. Optical fiber based sensors may provide a compact technology with high sensitivity to visualize and track objects and provide anatomical imaging.

30 Claims, 34 Drawing Sheets

(56) References Cited

U.S. PATENT DOCUMENTS

| | | |
|---|---|---|
| 2012/0059259 A1 | 3/2012 | Emery et al. |
| 2015/0133787 A1 | 5/2015 | Wegner |
| 2016/0045184 A1 | 2/2016 | Courtney et al. |
| 2016/0245687 A1* | 8/2016 | Digonnet ................. G02B 6/32 |
| 2017/0172539 A1 | 6/2017 | Vignon et al. |
| 2017/0307741 A1 | 10/2017 | Ralston et al. |
| 2020/0319019 A1* | 10/2020 | Westerveld ............ G01H 9/004 |
| 2022/0350022 A1 | 11/2022 | Zhao et al. |
| 2022/0365036 A1 | 11/2022 | Yang et al. |
| 2023/0097639 A1 | 3/2023 | Zhu et al. |
| 2023/0148869 A1 | 5/2023 | Zhao et al. |

OTHER PUBLICATIONS

BD Cue™ Needle Tracking System with BD Prevue™ II Vascular Access System, YouTube, retrieved from internet Feb. 29, 2024 from, <<https://www.youtube.com/watch?v=YqCXAH3gzkg>>.

International Search Report, International Application No. PCT/US2022/077762, Mailing Date: Jan. 17, 2023.

Kåsine et al., "Needle tip tracking for ultrasound-guided peripheral nerve block procedures—An observer blinded, randomised, controlled, crossover study on a phantom model," Acta anesthesiologica Scandinavica 63(8):1055-1062 (2019).

Mari et al., "Needle-tip localization using an optical fibre hydrophone," Proceedings of SPIE—The International Society for Optical Engineering 8938:1-8 (2014).

Onvision® Needle Tip Tracking Demonstration Video, YouTube, retrieved from internet on Feb. 29, 2024, <<https://www.youtube.com/watch?v=2lxvrwsG39c&t=8s>>.

Xia et al., "Coded excitation ultrasonic needle tracking: An in vivo study," Medical Physics 43(7):4065-4073 (2016).

* cited by examiner

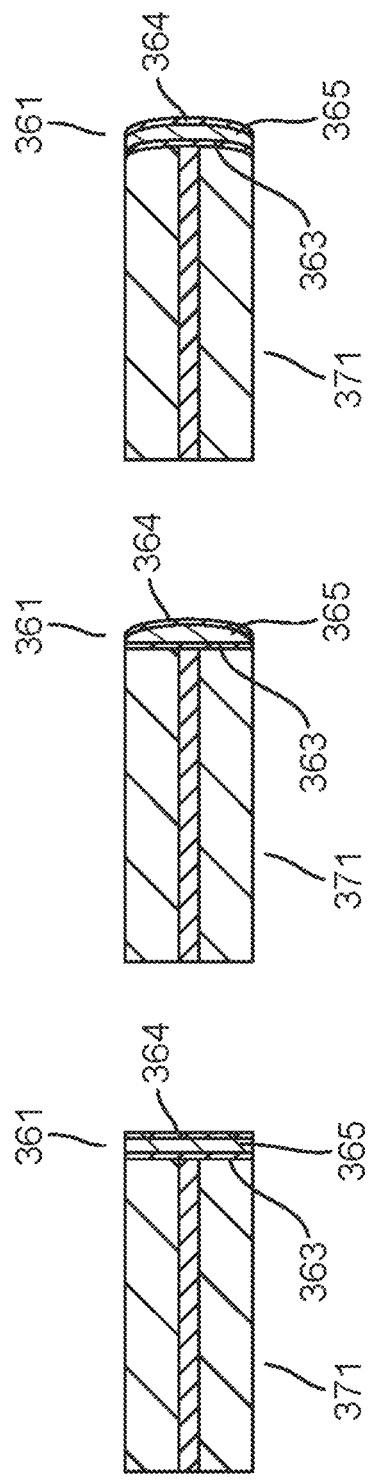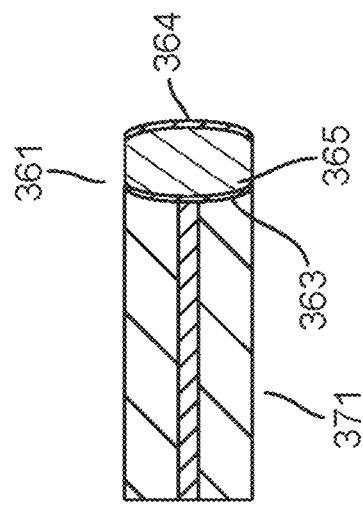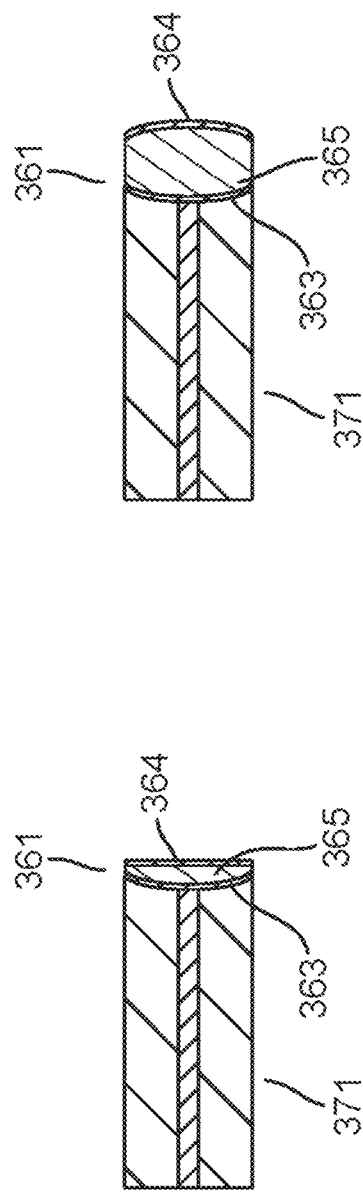

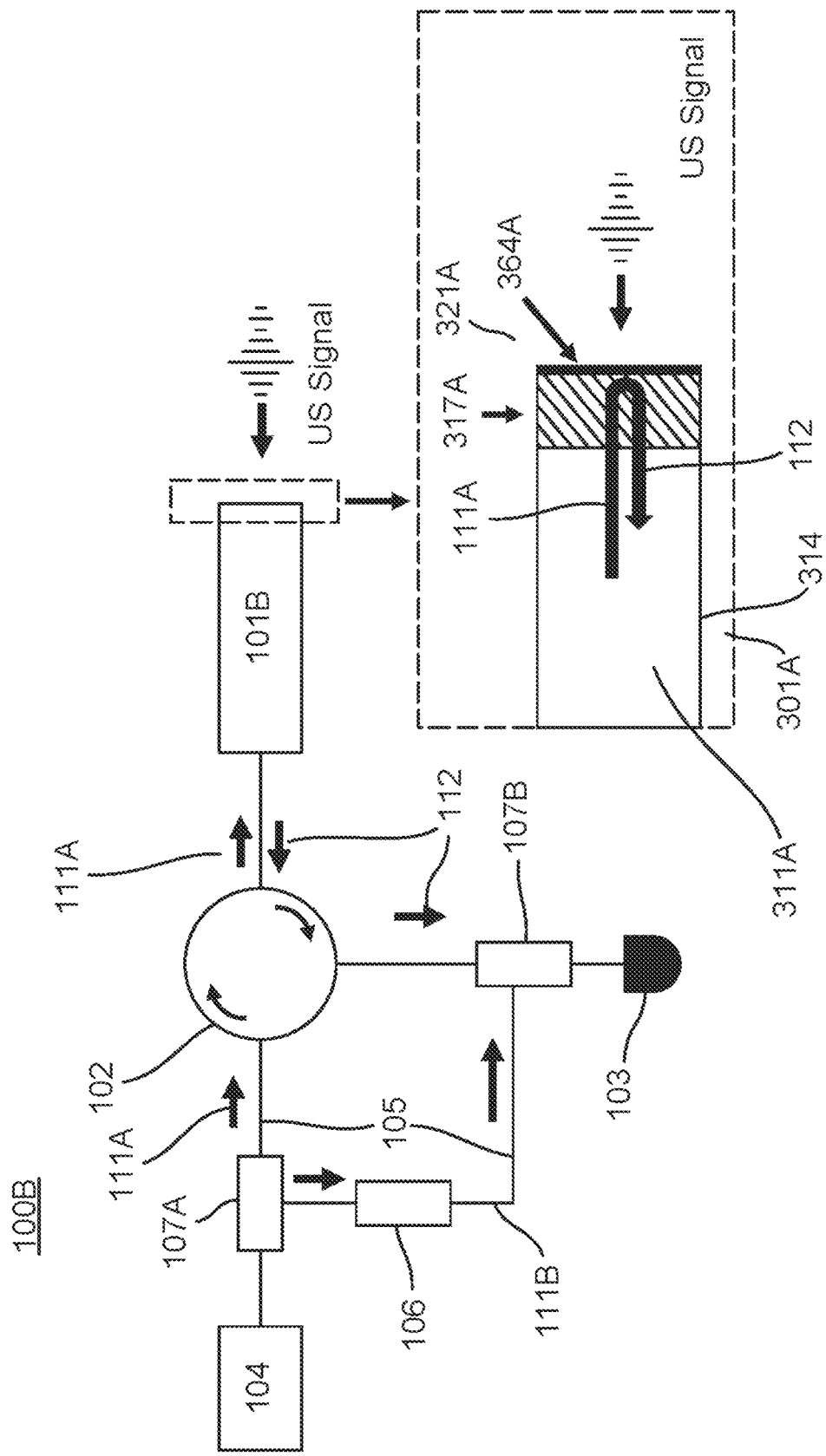

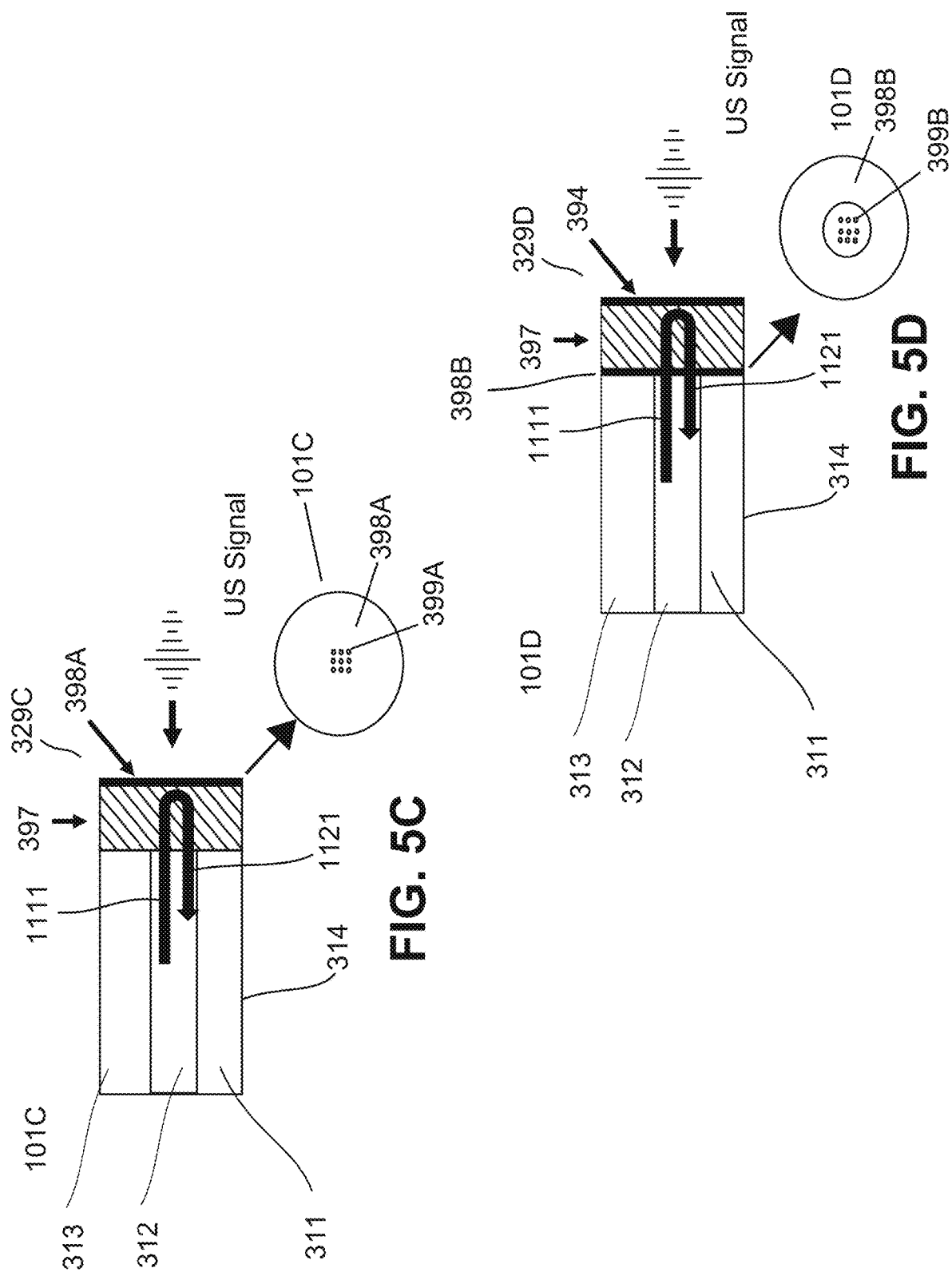

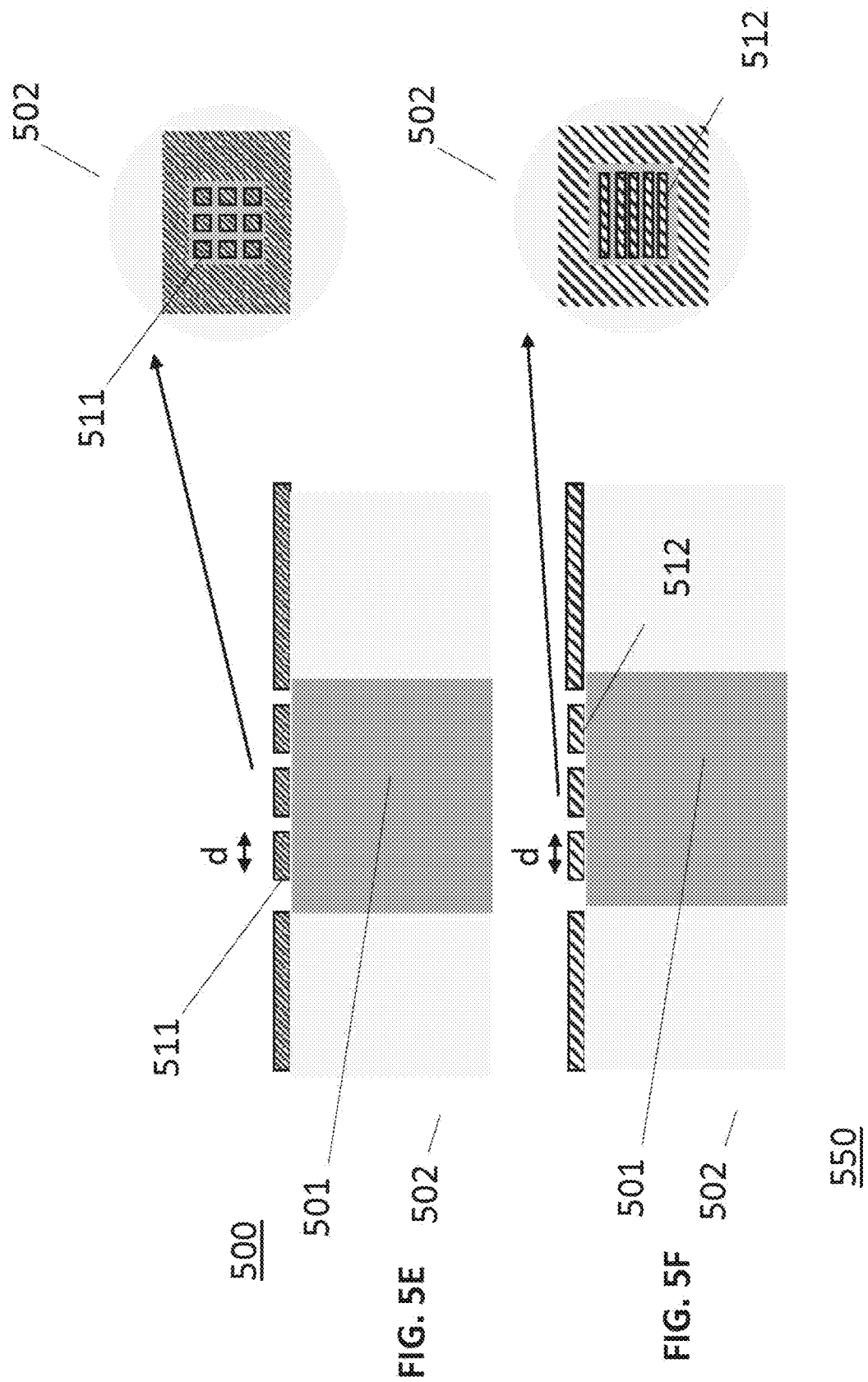

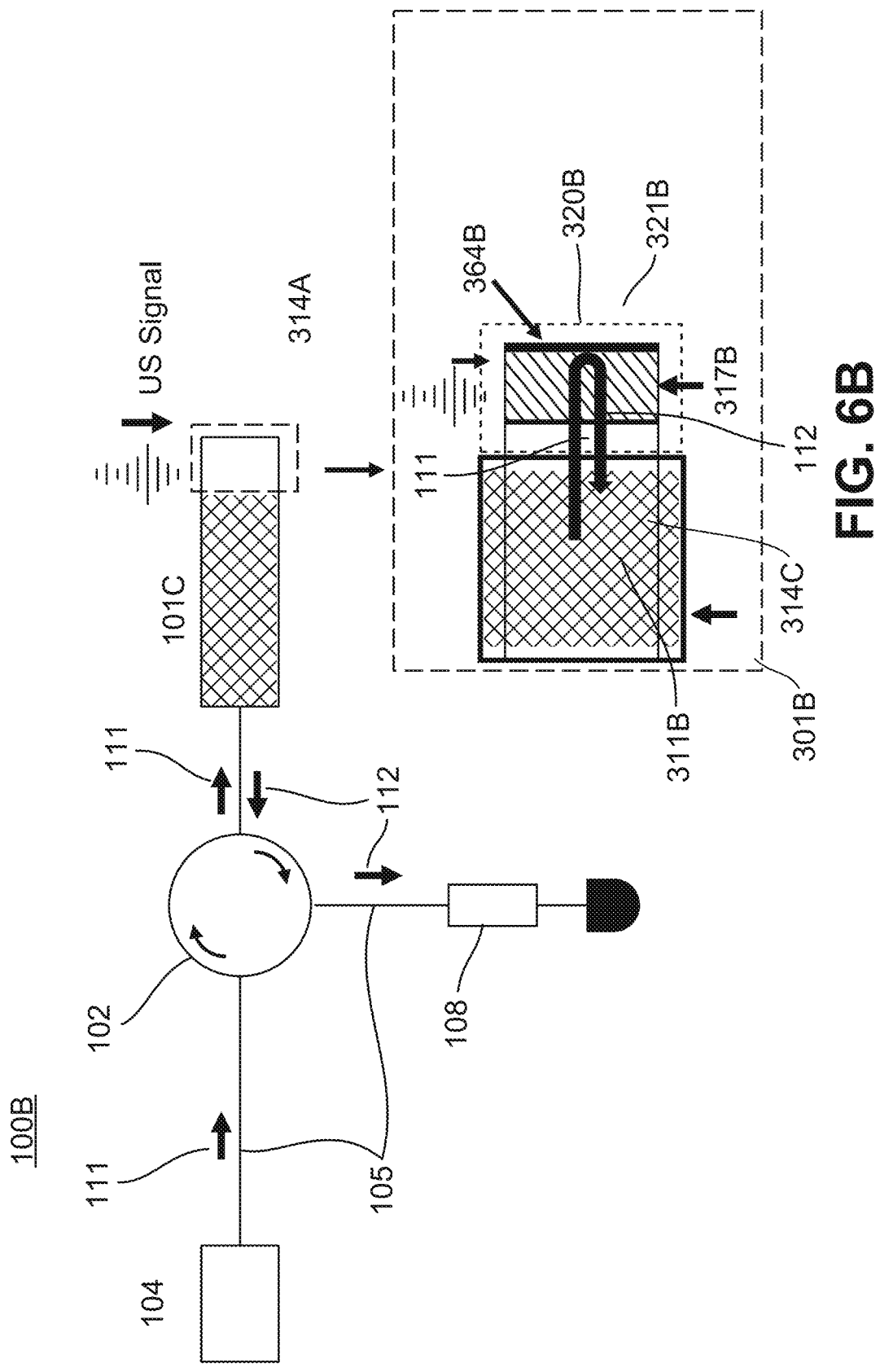

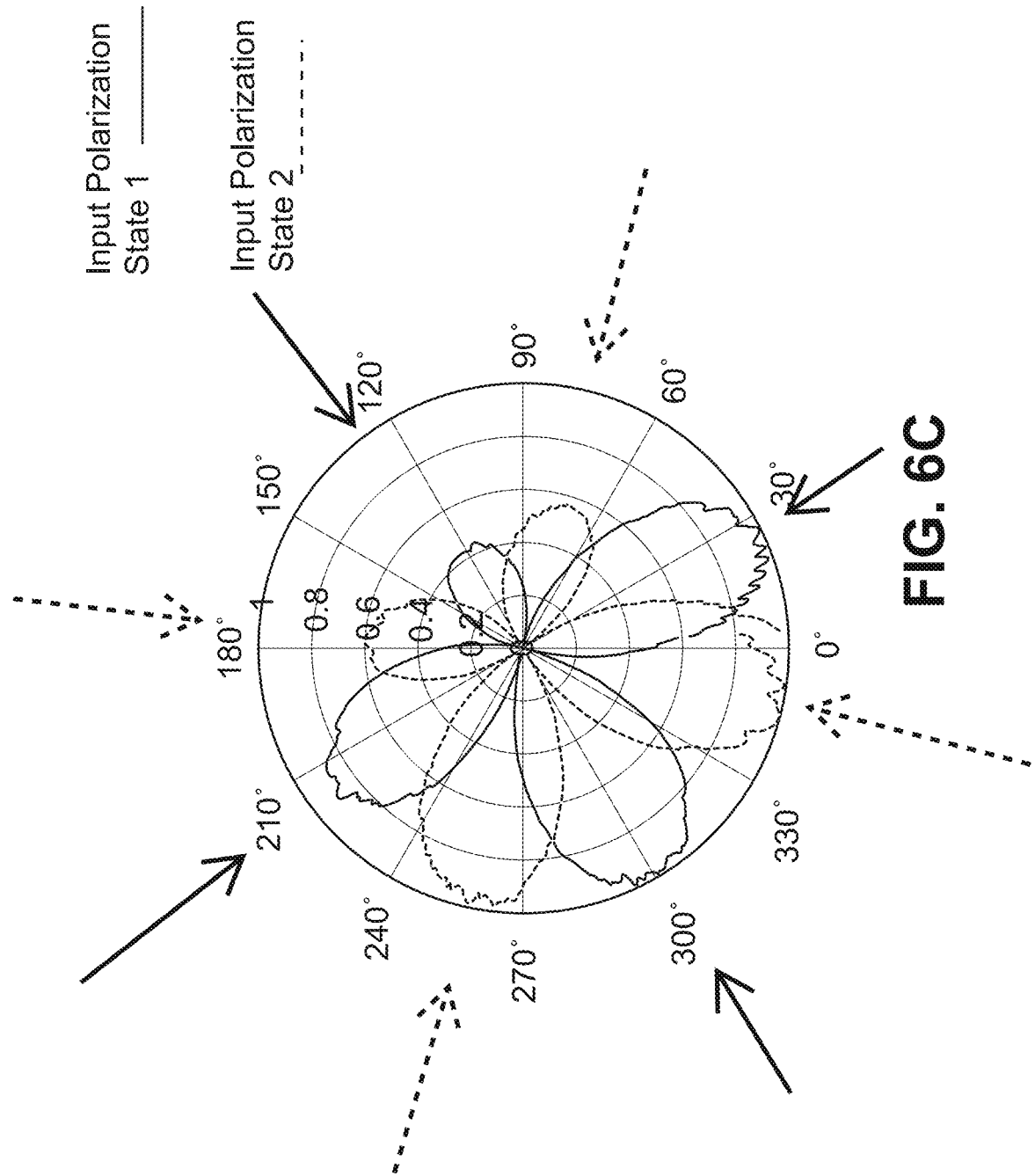

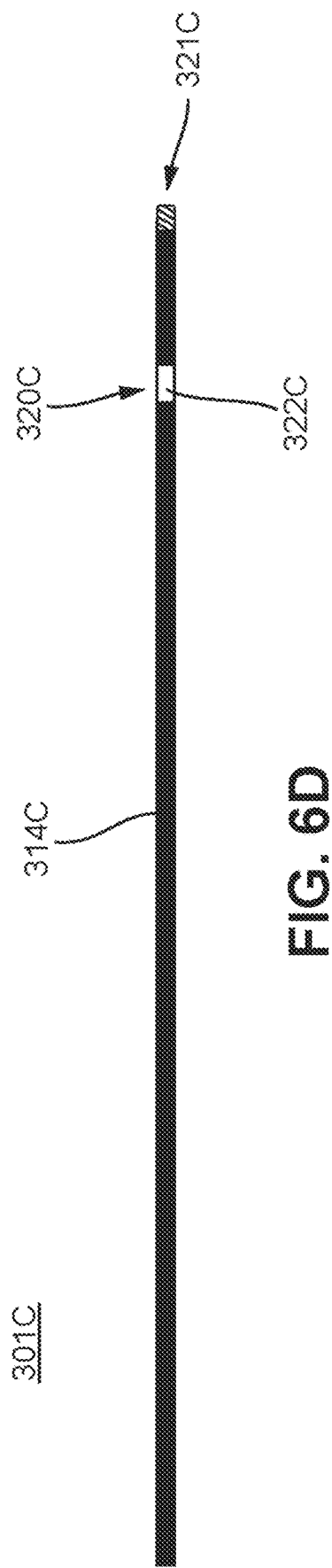

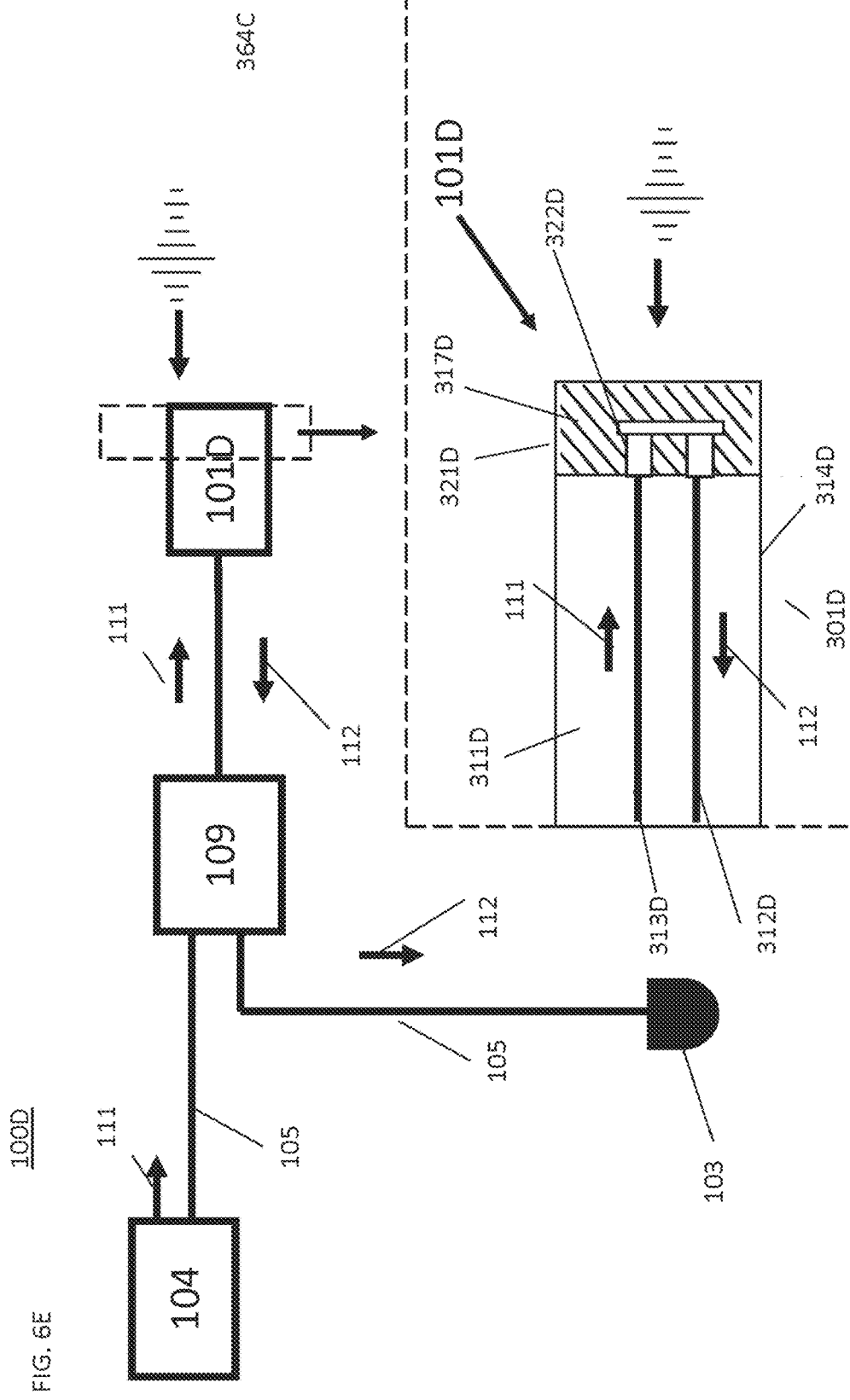

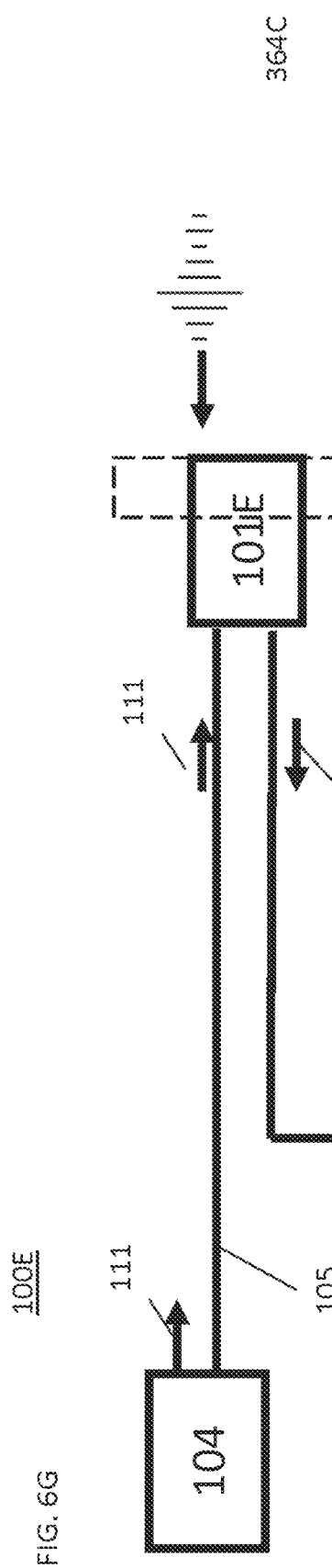
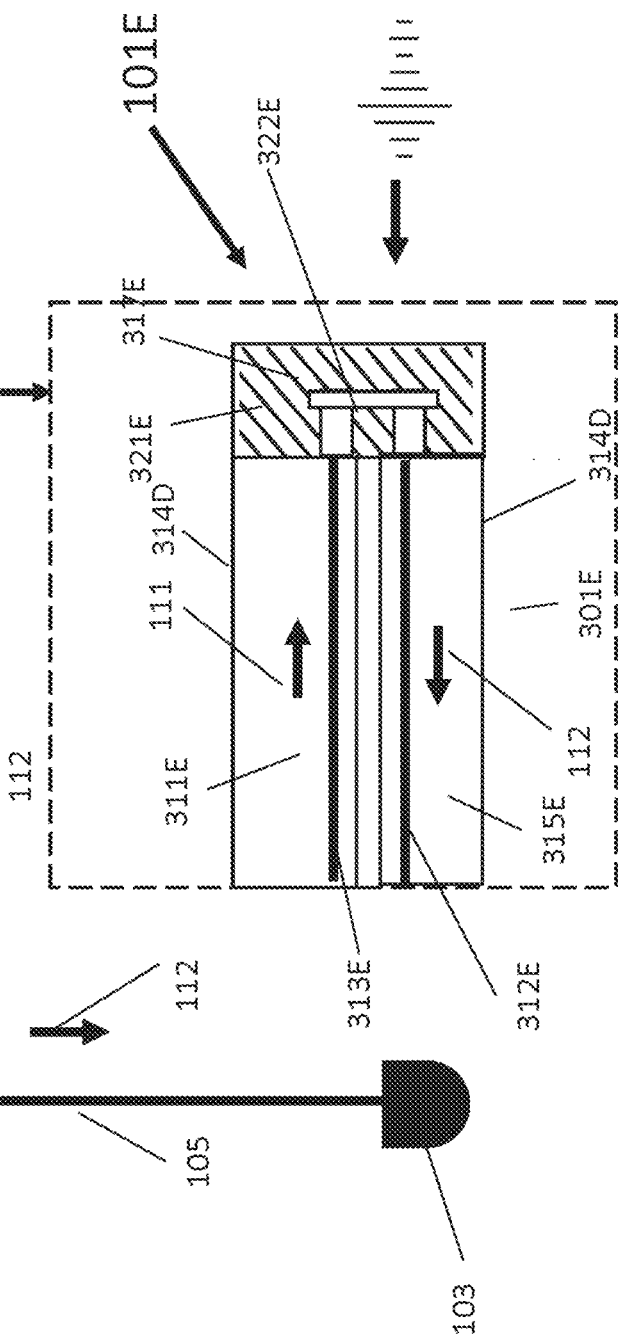

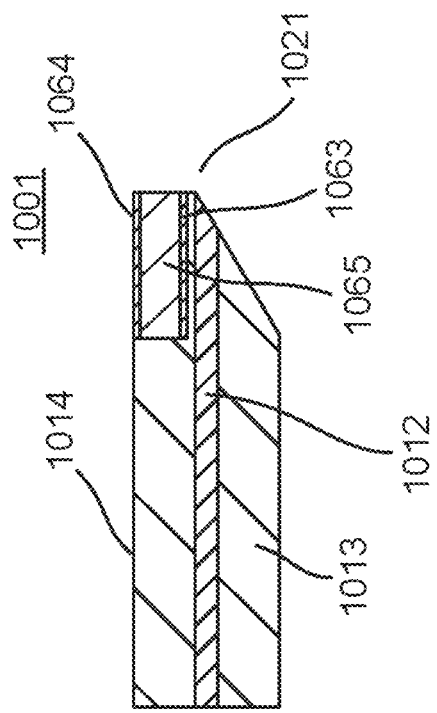
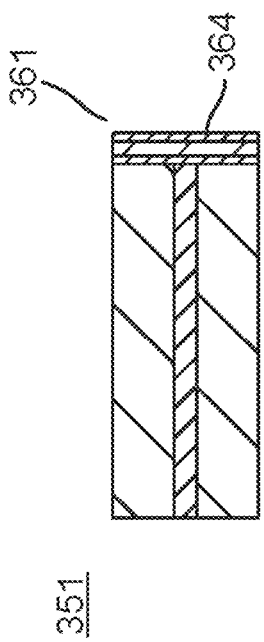
FIG. 11B
FIG. 11A

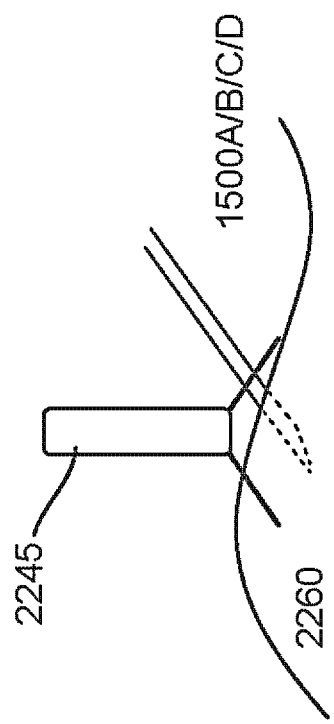

FIBER-OPTICAL SENSOR SYSTEM FOR ULTRASOUND SENSING AND IMAGING

RELATED APPLICATIONS

This application claims priority to U.S. Provisional Application No. 63/510,079, titled FIBER-OPTICAL SENSOR SYSTEM FOR ULTRASOUND SENSING AND IMAGING and filed on Jun. 23, 2023, which is incorporated herein by reference. This application is further related to U.S. Provisional Application No. 63/522,793, titled OPTICAL FIBER WITH AN ACOUSTICALLY SENSITIVE FIBER BRAGG GRATING AND ULTRASOUND SENSOR INCLUDING THE SAME, and filed Jun. 23, 2023, which is incorporated herein by reference. This application is further related to U.S. Provisional Application No. 63/522,994, titled "TRANSPONDER TRACKING AND ULTRASOUND IMAGE ENHANCEMENT," filed Jun. 23, 2023, which is incorporated herein by reference. This application is further related to U.S. patent application Ser. No. 18/382,984 titled Transponder Tracking and Ultrasound Image Enhancement and filed concurrently on Oct. 23, 2023, which is incorporated by reference herein. This application further incorporates by reference U.S. Provisional Patent Application No. 63/545,327, titled Miniature Mixed Array Imaging Probe, filed on Oct. 23, 2023, which is incorporated by reference herein.

TECHNICAL FIELD

This invention relates generally to the field of ultrasound sensing and imaging.

BACKGROUND

Acoustic imaging is used in various industries including medical imaging. Acoustic imaging technologies may be used to visualize and provide internal imaging of a patient's body. Furthermore, acoustic imaging technology may be used to visualize and track objects (e.g., needles, catheters, guidewires, endoscopes and the like), used in medical applications such as diagnostic or therapeutic clinical procedures including, but not limited to biopsy, fluid aspiration, delivery of therapeutics such as drugs, nerve blocks/anesthesia or biologics, catheterization, needle guidance, needle placement, deep vein cannulation, injection, placement of IV, PIC lines, device implantation, minimally invasive surgical procedures etc. Using acoustic imaging for medical applications offers several advantages. For instance, acoustic imaging such as ultrasound imaging is a non-invasive form of imaging. Additionally, ultrasound imaging uses ultrasound signals which are known to have remarkable penetration depth.

In non-medical applications, ultrasound is used in industrial applications for defect detection, non-destructive testing, structural testing, and microparticle particle sorting among other applications, geological applications including mining and drilling operations and underwater marine applications.

Some existing imaging technology use Acoustic Energy Generating (AEG) materials for transducers to visualize and track medical objects and to generate imagery during a diagnostic or therapeutic medical procedure. Commonly used AEG materials include piezoelectric materials such as lead-zirconate-titanate (PZT), ceramic, piezoelectric single crystal (e.g. PIN-PT, PIN-PMN-PT), and polyvinylidene fluoride (PVDF) among many other materials known to those of skill in the art. AEG transducers have limitations. The echogenicity of the object to be tracked and/or anatomy being visualized can affect the image quality of the object being tracked and the tissue being imaged. In certain medical procedures a small form factor is needed, and small AEG transducers generally have low to minimal signal output. Therefore, it may be challenging to use AEG transducers for medical applications requiring a small form factor because of the size limitations (e.g., physical size).

Accordingly, there is a need for new and improved compact technology with high sensitivity to visualize and track objects and provide anatomical imaging, particularly in medical applications.

SUMMARY

Systems, devices, and methods for ultrasound sensing and imaging are presented herein. In particular, systems, devices, and methods described herein may include fiber microsensor devices and systems and methods of use.

In an embodiment, an apparatus comprising a sensor fiber is provided. The sensor fiber may include an optical waveguide comprising a core and a cladding structure; an optical sensor structure coupled to a first end of the optical waveguide including at least one of an optical resonator, an optical interferometer, and a polarization sensitive structure, the optical sensor structure being configured for: detecting an acoustic signal, and providing an optical signal corresponding to the acoustic signal to the optical waveguide. The sensor fiber may further include an encapsulating structure configured with a first portion surrounding the optical waveguide and with a second portion at least partially surrounding the optical sensor structure.

In some aspects, the devices described herein relate to an apparatus including: a sensor fiber including: an optical waveguide including a core and a cladding structure; an optical sensor structure coupled to a first end of the optical waveguide including at least one of an optical resonator, an optical interferometer, a facet end microstructure, and a polarization sensitive structure, the optical sensor structure being configured for: detecting an acoustic signal, and providing an optical signal corresponding to the acoustic signal to the optical waveguide.

BRIEF DESCRIPTION OF THE DRAWINGS

The accompanying figures, which are incorporated herein, form part of the specification and illustrate embodiments of systems, methods, and devices for ultrasound sensing and imaging. Together with the description, the figures further explain the principles of and enable a person skilled in the relevant art(s) to make and use the methods, systems, and devices described herein. The drawings are provided to illustrate various features of the embodiments described herein and are not necessarily drawn to scale. In the drawings, like reference numbers indicate identical or functionally similar elements.

FIG. 4A-FIG. 4E illustrate several variations of the optical resonator structure consistent with embodiments hereof.

FIGS. 5A and 5B illustrate examples of an optical sensor system and fiber optical sensor consistent with embodiments hereof.

FIGS. 5C and 5D illustrate examples of an optical sensor system and fiber optical sensor consistent with embodiments hereof.

FIGS. 5E and 5F illustrate examples of micro facet structures consistent with embodiments hereof.

FIGS. 6A-6DD illustrate examples of an optical sensor system and fiber optical sensor consistent with embodiments hereof.

FIGS. 6E and 6F illustrate examples of an optical sensor system and fiber optical sensor consistent with embodiments hereof.

FIGS. 6G and 6H illustrate examples of an optical sensor system and fiber optical sensor consistent with embodiments hereof.

FIG. 11A and FIG. 11B illustrate a comparison between sensor fibers arranged with a forward facing optical sensor and a side facing optical sensor.

FIG. 22 illustrates uses of a fiber based optical sensor in needle guidance or location.

DETAILED DESCRIPTION

Figure 1:
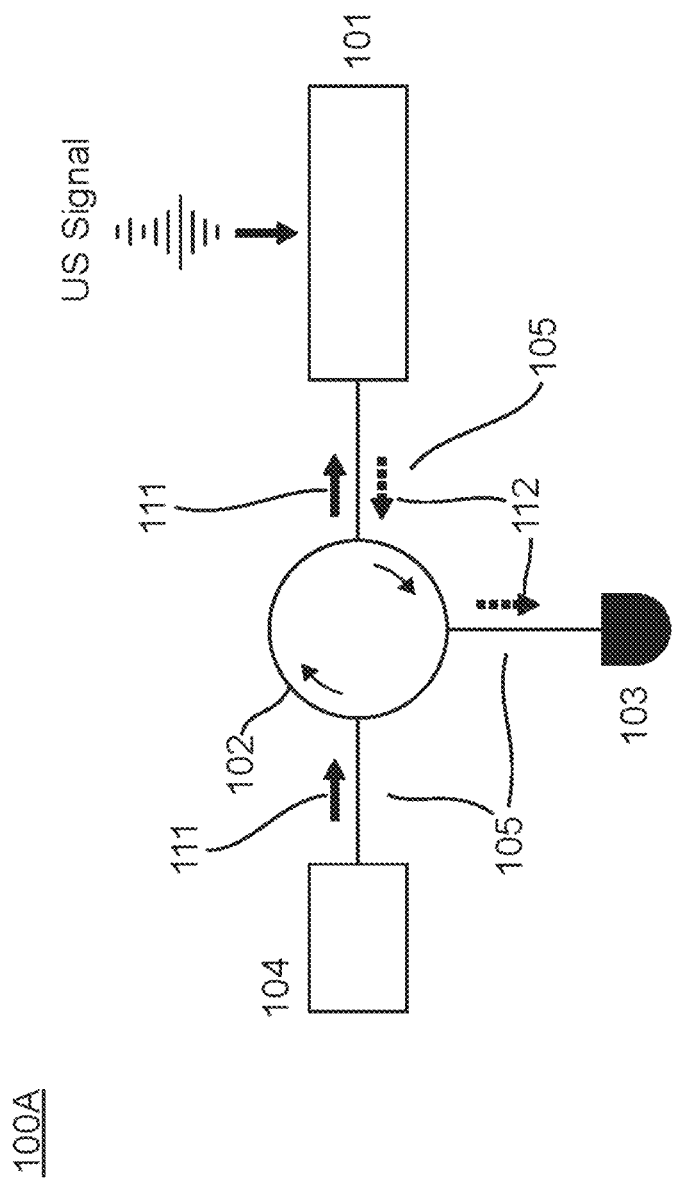
FIG. 1 illustrates an optical sensor system for use with a fiber optical sensor consistent with embodiments hereof.

Non-limiting examples of various aspects and variations of the invention are described herein and illustrated in the accompanying drawings. The following detailed description is merely illustrative in nature and is not intended to limit the invention or the application and uses of the invention. Although the description of the invention is in the context of fiber optical micro-sensor systems, methods, and devices for ultrasound imaging and sensing, the disclosure should not be considered so limiting. For example, although methods may be discussed herein with respect to various medical procedures, embodiments hereof may be suitable for other medical procedures as well as other procedures or methods in other industries that may benefit from the sensing and imaging technologies described herein. Further, various systems and devices that incorporate fiber micro-sensors are described. It is understood that fiber micro-sensors, as described herein, may be integrated into and/or used with a variety of systems and devices not described herein. Modifications may be made to the embodiments described herein without departing from the spirit and scope of the present invention. Therefore, the following detailed description is not meant to be limiting. Furthermore, there is no intention to be bound by any expressed or implied theory presented in the preceding technical field, background, summary, or the following detailed description.

Various structures are described herein according to their geometric properties. As discussed herein, all structures so described may vary from the described shape according to the tolerances of known manufacturing techniques. Unless otherwise specified, features described with the term "substantially" are understood to be within 5% of exactness. For example, features described as "substantially parallel" may deviate from true parallel by 5%.

Systems, devices, and methods for ultrasound sensing and imaging by the use of fiber micro-sensor or fiber sensor devices are disclosed. In particular, the technology described herein may track, visualize, and monitor (e.g., sense) objects during medical procedures as well as generate ultrasound images. The fiber micro-sensor devices described herein incorporate optical devices disposed at the end of optical fibers or designated locations along its length and configured for the detection of acoustic signals, including ultrasound signals. Sensor fibers, as described herein, include an optical waveguide (such as an optical fiber) with a fiber micro-sensor device coupled at an end thereof. As used herein the term optical waveguide may refer to optical fibers, optical fiber cores, photonic integrated waveguides, planar waveguides, etc., based on material systems like: fused glass, polymer, semiconductor/dielectric wafer, nanoimprinted/3D printed polymer on different substrates or any other optical signal channel.

The technology described herein is compact in size and has high sensitivity, thereby making it viable for various industrial applications and therapeutic and diagnostic medical applications. In non-medical applications, ultrasound is used in industrial applications for defect detection, non-destructive testing, structural testing and microparticle particle sorting among other applications, geological applications including mining and drilling operations and underwater marine applications. Such applications are consistent with embodiments described herein. Therapeutic and diagnostic medical applications include ultrasound imaging as well as sensing (tracking, visualizing, guiding and monitoring) of objects (e.g., needle, catheter, guidewire, etc.) during guided needle access, biopsy, aspiration, delivery of drugs, biologics, anesthesia or other therapeutics, catheterization, minimally invasive procedures, ablation, cauterization, placement or moving of objects, tissue, cutting and/or sectioning, and other medical procedures. Procedures and applications in the following disciplines are examples of the wide usage and need for accurate guidance and imaging during diagnostic and therapeutic procedures: anesthesia, cardiology, critical care, dermatology, emergency medicine, endocrinology, gastroenterology, gynecology and obstetrics, hepatology, infectious diseases, interventional radiology, musculoskeletal medicine, nephrology, neurology, oncology, orthopedics, pain management, pediatrics, plastic and reconstructive surgery, urology and vascular access Object visualization, tracking, guidance and location determination in medical applications may be important aspects for performing medical procedures in a safe and reliable manner. Objects for tracking, visualization, and location determination may include any type of medical device that travels or is located within the body of a subject. For instance, medical practitioners visualize and track a needle tip while conducting a biopsy to ensure safety. In such instances, accurate needle tip visualization or tracking may help to prevent or reduce unintentional vascular, neural, tissue or visceral injury. Similarly, it may be helpful to visualize, track, or locate needles, endoscopes, cannulas, laparoscopic tools or other medical device tools when performing medical procedures such as, but not limited to, aspiration of fluid; injections of joints, tendons, and nerves with drugs or biologics; biopsy of fluids or soft tissue masses; aspiration and lavage of calcifications; removal of tissue, organs or foreign bodies, placement of a stent, filter, valve, permanent, temporary or biodegradable implant, shunt or drain, injections for anesthesia, inserting vascular access devices used for infusion therapies, ablation procedures, performing the Seldinger technique or catheterization to gain access to blood vessels and/or other organs in a safe manner. Visualization and tracking may be advantageous in both laparoscopic procedures, minimally invasive procedures and open surgical procedures, especially when it is difficult to visualize the area due to limited access, intervening tissue or organs blood or other fluid.

Some existing technologies use ultrasound imaging for guidance during medical procedures, to visualize anatomical structures of interest as well as to visualize, locate, and track inserted medical devices, especially the distal and/or working portion of the device. However, there are several drawbacks associated with conventional ultrasound imaging technology for medical applications. Traditional technology uses imaging probes that emit ultrasound waves. Because of the smooth surface of needles and other inserted medical devices, the incident ultrasound waves reflected from the surface may be steered away from the receiving direction. This may make the reflected waves too weak to be detected easily, making it difficult to determine the location of the device during the procedure. In some technologies, the medical device may have a roughened surface, such a dimpled, etched or coated surface to increase visibility in ultrasound by increasing the echogenicity of the medical device. However, even with such efforts, limitations remain. Ultrasound-guided tools may also be constrained by their dependence on specific incident angles, which limit their ability to provide accurate visualization, particularly for deeply placed devices. Due to this constraint, ultrasound-guided tools may be relegated to superficial locations which limits their utility, adoption, and cost-effectiveness as a deployable solution.

There are at least two key acoustic performance limitations in the current state-of-art AEG transducers (such as, but not limited to, lead-zirconate-titanate (PZT) ceramic, piezoelectric single crystal (e.g. PIN-PT, PIN-PMN-PT), and polyvinylidene fluoride (PVDF)) compared to the proposed optical sensing technique. First, achieving very high sensitivities requires transducers fabricated from specific AEG materials or specific acoustic designs, but such transducers may provide only a relatively narrow bandwidth in acoustic response. Secondly, the acoustic response of AEG transducers may be restricted due to electrical impedance mismatches when the electrical element sizes become small with respect to their resonant frequency. As a result, for applications requiring a small form factor (e.g. intravascular or intracardiac ultrasound, endoscopic, needle tracking, lung biopsy, sensing, and monitoring, etc.), the signal-to-noise ratio (SNR) and bandwidth of a small AEG transducer is reduced and in certain applications may also present a highly directional response. Additionally, some AEG transducers and systems may be affected by electromagnetic interference, such as that caused by ablation tools, cauterization tools, or any other procedure or technique that applies electrical energy to tissue. Furthermore, use of an electro-mechanical transducer at the distal end will include an electrically conductive line and associated components requiring additional design and safety requirements and challenges.

In contrast, fiber optical sensors consistent with the present disclosure are able to provide ultrasound receivers with high sensitivity, broad bandwidth, and a wide acceptance angle and do not require the electrical components needed for electro-mechanical transducers. With these characteristics, fiber optical sensors will be able to sense harmonic or scattered signals that existing technologies cannot sense. Further, fiber optical sensors consistent with the present disclosure may be compact, low cost, and may contribute to a scalable sensor system. Embodiments hereof include fiber optical sensors configured to detect acoustic signals. Such fiber optical sensors may be disposed at the end of an optical fiber, adjacent an end of an optical fiber or at a diagnostic or therapeutic relevant location on the medical device to create a sensor fiber. Fiber optical sensors include resonant structures, including, but not limited to Fabry-Perot (FP) resonators, optical cavity resonators, whispering-gallery-mode resonators, and photonic crystal resonators; optical interferometers, including but not limited to MZI, phase-shift coherent interferometers, self-mixing interferometers; acoustically responsive fiber end facets; and acoustic induced birefringent polarization sensors.

Acoustically responsive fiber end facets may comprise a substrate suitable for adding various microstructures to enhance the response of the fiber sensor to acoustic signals. Such microstructures may be acoustically responsive structures such as metasurfaces including patterns of small elements (e.g., having a size less than approximately one wavelength of the optical signal) arranged to change the wavefront shape of the acoustic signals and maximize the detection of acoustic signals, acoustically responsive low-dimensional materials with special optomechanical features that are more prone to deformation, and plasmonic structures patterned to amplify light-matter interactions. In addition to operating as an optical sensor, the fiber end facet structures may also be added to the other fiber optical sensors described herein to further enhance acoustic response. For example, a metasurface may include patterns of small elements arranged so as to change the wavefront shape of the acoustic signals and maximize the collection of acoustic signals collected by the other types of fiber optical sensors discussed herein to improve the sensitivity of the fiber optical sensors. Adding low-dimensional materials to a fiber end facet may also improve sensitivity because such materials are more prone to deformation induced by acoustic waves, which may translate into larger changes in the optical signal. By writing plasmonic patterns onto a fiber end facet, it is possible to enhance the optical response to acoustic waves. This enhancement may be achieved through leveraging the hotspots and resonances generated by these plasmonic patterns to amplify light-matter interactions. As used herein, "low-dimensional" or "2 dimensional" features may refer to features having a thickness of less than 1 micron.

The aforementioned optical structures are configured to respond to acoustic (such as ultrasound) signals. Thus, these optical structures may include acoustically responsive materials and/or acoustically responsive structures. Acoustically responsive, as used herein, refers to structures or materials that are configured to respond to incident acoustic signals (e.g., ultrasound acoustic signals) in a manner that adjusts the optical properties of the materials or structures. Reponses to acoustic signals in such resonant, interferometer or acoustically responsive fiber end facet structures may be due to the photo-elastic effect and/or physical deformation of the structures. When subject to acoustic signals, the resonant, interferometer or acoustically responsive fiber end facet structures are subject to mechanical stress and/or strain from the alternating pressures of the acoustic signal sound waves. This mechanical stress and/or strain may change the optical properties of the optical sensor structures due to the photo-elastic effect and may also cause changes or deformations in the physical structure of resonator. With polarization-based sensors, the polarization of optical signals changes when the medium through which the light is passing is subjected to acoustic signals. When coupled to a light source (e.g. a laser light source, a broadband light source (e.g. a lamp or LED) or other suitable light source) via an optical waveguide (e.g., an optical fiber), the effect of acoustic signals on the optical sensor structures may be measured due to changes in the light returned by the optical sensor structures via the optical waveguide. Within this disclosure, optical signals and light may be referred to as responding to acoustic signals. It is understood that such responses are due to the interaction between the acoustic signals and the medium through which the light passes. Thus, as discussed herein, a material or structure that is referred to as acoustically responsive may respond to acoustic signals typical of an ultrasound environment in manner that can be measured, by techniques discussed herein, by optical signals consistent with embodiments hereof.

Embodiments hereof include systems configured for use with fiber optical sensors. For example, systems consistent with the present disclosure may include light sources (e.g., laser light sources, a broadband light source (e.g. a lamp or LED) or other suitable light source), light reception devices (e.g., photodetectors, etc.), optical devices (splitters, combiners, circulators, polarization sensitive couplers, polarization analyzers, polarization controllers, frequency shifters, etc.), control devices, computer processing units, and other devices to facilitate the functionality of the fiber optical sensors. Further, such systems consistent with the present disclosure may include acoustic devices, such as transducers, probes, and hardware/software for their control. Systems consistent with the present disclosure may further include medical systems and devices, including all devices, systems, hardware, and software necessary to carry out any medical procedures that the fiber optical sensors are used to facilitate.

FIG. 1 illustrates an optical sensor system for use with a fiber optical sensor. As used herein, the term "fiber optical sensor" and the term "fiber based optical sensor" refer to optical sensors adapted and/or configured to detect acoustic signals, as described in further detail below. The optical sensor system 100A includes a light source 104, such as a laser, a light reception device 103, such as a photodetector, one or more optical waveguides 105, an optical circulator 102, and a fiber optical sensor 101. In operation, the light source 104 supplies the initial optical signal 111 to the fiber optical sensor 101 via the optical waveguides 105 and through the optical circulator 102. The supplied initial optical signal 111 is returned by the fiber optical sensor 101 back along the optical waveguide 105. The returned optical signal 112 travels via the optical waveguides 105 through the optical circulator 102 and is received at the light reception device 103. As discussed above, acoustic signals incident on the fiber optical sensor 101 alter the optical characteristics (which may include the physical structure as well as the optical material properties) of the fiber optical sensor 101. Such optical characteristic alterations may be measured according to changes in the returned optical signal 112, as discussed in greater detail below.

Figure 2:
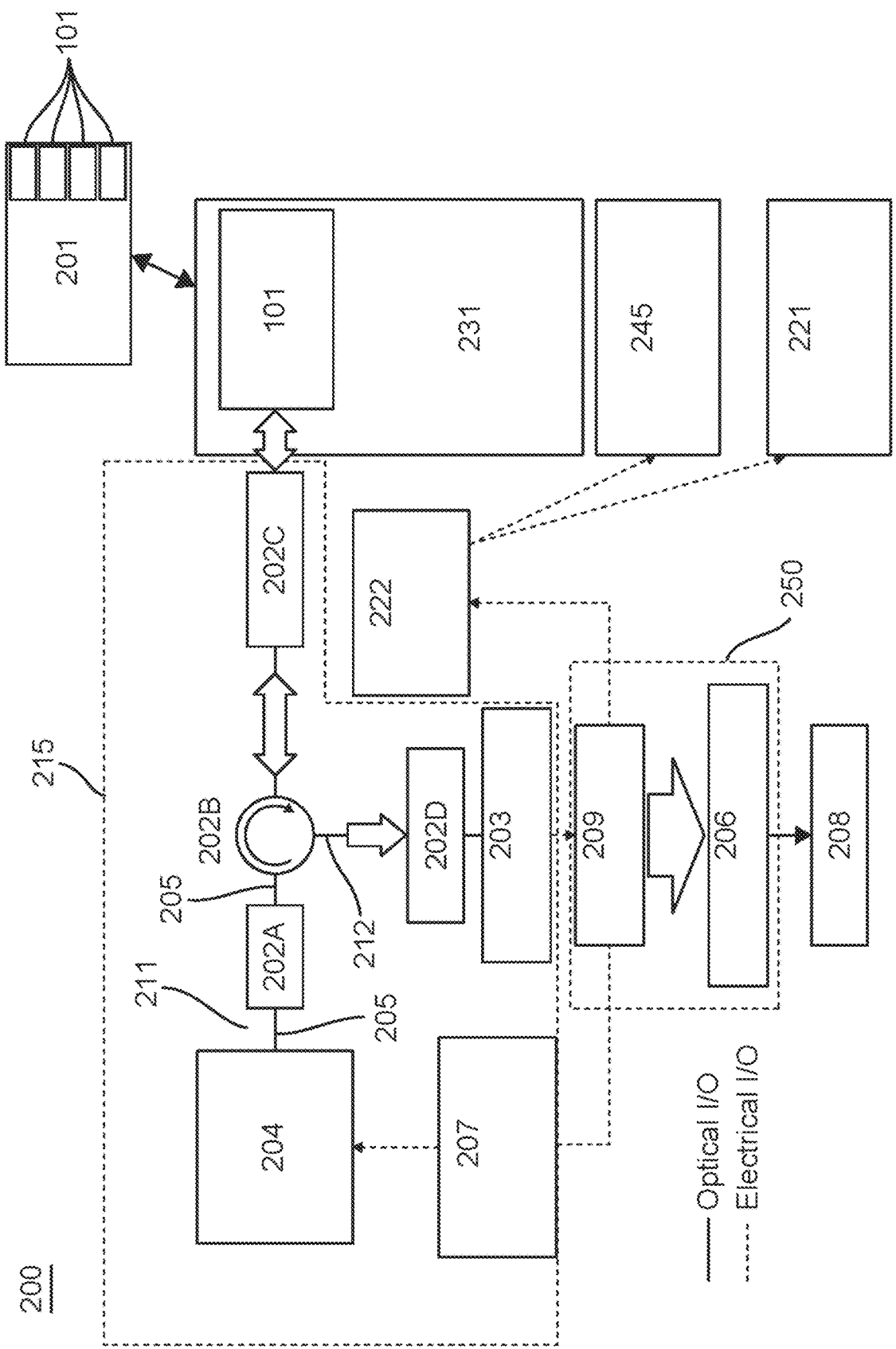
FIG. 2 illustrates an optical sensor system for use with a fiber optical sensor consistent with embodiments hereof.

FIG. 2 illustrates an optical acoustic sensor system for use with a fiber optical sensor. The optical acoustic sensor system 200 includes components, devices, hardware, and software to facilitate the use of a fiber optical sensor 101 or fiber optical sensor array 201 (comprising a plurality of fiber optical sensors 101, as pictured in FIG. 2). Further references to FIG. 2 may refer specifically to the use of a single fiber optical sensor 101; however, it will be understood that, in additional embodiments, a fiber optical sensor array 201 may be incorporated into the optical acoustic sensor system 200 in combination with any of the features discussed below and that any functionality attributed to a fiber optical sensor 101 may further be carried out by the fiber optical sensor array 201. In embodiments, for example as shown in FIG. 2, the optical acoustic sensor system 200 may include hardware and componentry to facilitate the use of an ultrasound transducer and/or ultrasound probe. The ultrasound transducer may be used for generating and receiving acoustic signals or simply generating acoustic signals. The optical acoustic sensor system 200 may include a processing system 250, an optical sub-system 215, and an output device 208.

The processing system 250 may include a processing unit 209 and an image reconstruction unit 206. Processing unit 209 may include at least one computer processor, at least one non-transitory computer readable storage medium, and appropriate software instructions. The processing unit 209 is configured to provide control signals to and receive information signals from the light source control unit 207, the light receiving device 203, and the acoustic control unit 222. The processing unit 209 may communicate (via control signals and information signals) with the light source control unit 207, thereby providing control of optical signals provided to the fiber optical sensor 101. The processing unit 209 may communicate (via control signals and information signals) with the acoustic control unit 222, thereby providing control and reception of acoustic signals via an acoustic probe 245. The processing unit 209 is further configured to communicate with the light receiving device 203 to receive information signals associated with optical signals received by the light receiving device 203. Thus, processing unit 209 operates to provide the necessary control signals and receive the acquired information signals in the optical acoustic sensor system 200.

The processing unit 209 is further in communication with the image reconstruction unit 206, which operates to generate images based on the data and/or information acquired by the processing unit 209. The image reconstruction unit 206 may generate images based on data related to a medium, such as a human body, captured by the fiber optical sensor 101 and the acoustic probe 245. The medical device distal end 231 may include one or more of a needle, a catheter, a guidewire, a delivery device, and/or any other device or apparatus configured for use within the body of a patient. The image reconstruction unit 206 may be integrated within a system containing the processing unit 209 and/or may be a separate system including at least one computer processor, at least one non-transitory computer readable storage medium, and appropriate software instructions. The processing system 250 may provide control signals to an output device 208 to provide a data output. The output device 208 may include, for example, a display or a device including a display.

In some embodiments, the output device 208 may further include an additional systems, such as a medical procedure system that is configured to use the data that is output. For example, output device 208 may include an endoscopy system, a laparoscopic system, a robotic surgical system, neurosurgical system and additionally may include an interoperative ultrasound imaging system. The output data may include information about a location of the medical device distal end or working portion 231, and images acquired of the medium in the area of where the medical device distal end 231 is used/deployed such as the patient anatomy, tissues, other medical tools/devices etc.

The optical sub-system 215 includes a light source control unit 207, a light source 204, optical devices 202A, 202B, 202C, and 202D, and light receiving device 203. The light source control unit is configured to interface with and control the light source 204 to control the production of an initial optical signal 211. The light source may generate a continuous wave (CW) or pulsed light emission (stimulated emission, spontaneous emission, and/or the like.) The initial optical signal 211 may include coherent light, e.g. laser light, provided in one or more modes and at one or more frequencies. The initial optical signal 211 may be of a single frequency/wavelength, a selection of frequencies/wavelengths, and/or a broadband light source. Thus, light source 204 may include a laser array configured to produce laser light in one or more modes and at one or more frequencies. Additionally, the polarization of the supplied light may be controlled to optimize the detected signal levels according to application requirement. The polarization state of light can be controlled to be linear polarized at certain angles or to be circularly polarized. Linearly polarized light will respond optimally to a certain input ultrasound direction, and circularly polarized light will respond to ultrasound from all directions. The polarization of light can be defined from the laser source output, and the output polarization state can be controlled by an in-line fiber polarizer, a paddle fiber polarization controller, an in-line fiber polarization controller, or other types of polarization controller. The optical devices 202A, 202B, and 202C may be configured to manipulate or influence the initial optical signal 211 received at the fiber optical sensor 101. The initial optical signal 211 may be provided at a plurality of wavelengths or across a spectrum of wavelengths. The optical device 202A may include, for example, a wavelength division multiplexing (WDM) device configured to multiplex multiple frequencies of initial optical signal 211 provided by the light source 204 for simultaneous transmission over the optical waveguides 205 that direct the initial optical signal 211 to the fiber end optical sensor 101. The optical device 202B may be a circulator with first, second and third ports, where the first port is in optical communication with the light source through a wavelength division multiplexing device (WDM) 202A. The initial optical signal 211 may pass through a second optical device 202B, which may be an optical circulator, for example, and which is configured to direct the initial optical signal 211 to the optical device 202C. The optical device 202C may include a WDM device configured to de-multiplex the initial optical signal 211 provided to the fiber optical sensor 101, which may be part of an array 201 such that each of multiple fiber optical sensors 101 receives and subsequently outputs light of a different wavelength. Optical device 202C is in optical communication with the second port of the second optical device 202B for dividing the initial optical signal into optical signals each having one of the wavelengths associated therewith and combining the returned optical signals from the fiber optical sensor 101 which is then directed though a third port and optical device 202D which may include a WDM device, to the light receiving device 203.

The initial optical signal 211 is received by the fiber optical sensor 101 (or optical sensors 101 of the fiber optical sensor array 201 some embodiments) and returned through one or more optical waveguides 205 to the optical device 202C, which may be further configured to multiplex the returned optical signal 212 (if required) for transmission to the light receiving device 203. The returned optical signal 212 may be directed by the optical device 202C through the optical device 202B and towards the optical device 202D, which may be a WDM device configured to de-multiplex the returned optical signal 212 for reception by the light receiving device 203.

Optical device 202D may be in optical communication with the third port of the optical device 202B for receiving the returned optical signal and dividing it into individual wavelength components. The light receiving device 203, which may be a photodetector array, for example, may be in optical communication with optical device 202D for receiving the individual wavelength components of the returned optical signal, such that detected phase shifts or other changes in the individual wavelength components are indicative of sensed acoustic signals.

It will be understood that, in embodiments that do not require frequency multiplexing/demultiplexing of the initial optical signal 211 and the returned optical signal 212, the optical devices 202A and 202C may not be required. The light receiving device 203 may include any suitable device configured to detect incident light, including, for example, a photodetector. The light receiving device 203 may further include, but is not limited to, a photodiode. The light receiving device 203 may be in optical communication with the optical device 202D (e.g., a wavelength division multiplexing splitter) for receiving the individual wavelength components of the returned optical signal 212, such that detected phase shifts, changes in polarization, or other changes in the individual wavelength components are indicative of sensed acoustic signals. The changes in the returned optical signal 212 may be converted (e.g., by the processing unit 209 and/or by additional optical components such as polarization sensitive couplers and/or frequency shifters) into data representative of sensed acoustic signals (which may be further used, e.g., to generate data representative of the tissue/anatomical structure of the medium in which the medical device distal end 231 is inserted in the area of a diagnostic or a therapeutic procedure and/or to identify a location of the medical device distal end 231 within the medium). In embodiments, the initial optical signal 211 and returned optical signal 212 signals may undergo pre-processing, beamforming and post-processing, as described in the following documents. U.S. application Ser. No. 18/032,953, filed Apr. 20, 2023 titled Image Compounding for Mixed Ultrasound Sensor Array; U.S. application Ser. No. 18/205,081, filed Mar. 7, 2023 titled Synthetic Aperture Imaging Systems and Methods Using Mixed Arrays; U.S. application Ser. No. 18/901,073, filed Dec. 29, 2022 titled Acousto-Optic Harmonic Imaging with Optical Sensors; PCT Application PCT/US2022/077762, filed Oct. 7, 2022 titled Ultrasound Beacon Visualization with Optical Sensors; PCT Application PCT/US2022/041250, filed Aug. 23, 2022 titled Multi-Dimensional Signal Detection with Optical Sensor; and PCT Application PCT/US2022/018515, filed Mar. 2, 2022 titled Acoustic Imaging and Measurements Using Windowed Nonlinear Frequency Modulation Chirp, each of which is incorporated herein by reference, disclose various methods for ultrasound beamforming and image processing. The image and/or data representative of the medical device distal end 231 (or the fiber optical sensor(s) 101) may then be displayed to the user on output device 208, which may include a computer display or the like. The image and/or data representative of the medical device distal end may further include the distal portion of the medical device in the insonified area.

As discussed above, the light receiving device 203 is in communication with the processing unit 209. The processing unit 209 receives information signals from the light receiving device 203 that are representative of the returned optical signal 212 received at the light receiving device 203. The processing unit 209 may also receive information signals from the light control unit 207 that are representative of the initial optical signal 211 output by the light source 204. The processing unit 209 operates to process the information signals associated with the returned optical signal 212 (optionally in comparison with the information signals associated with the initial optical signal 211) to make determinations about an acoustic environment at the fiber optical sensor 101, as discussed further below. Acoustic environment determinations may include the detection, identification, and interpretation of acoustic signals incident upon the fiber optical sensor 101 or sensors 101 of the fiber optical sensor array 201. Processing unit 209 may determine the presence and nature of acoustic signals incident upon the fiber optical sensors 101 of the fiber optical sensor 101.

Accordingly, the fiber optical sensors 101 may function to detect and/or receive acoustic (e.g., ultrasound) signals, and provide optical signals that are representative of and consistent with the acoustic signals through an optical receive chain (e.g., optical devices 202C, 202B, 202D) to a light receiving device 203 configured to detect and/or receive the optical signals and provide electrical signals representative of and consistent with the optical signals to the processing unit 209 for processing and interpretation. Thus, the processing unit 209 may be configured to receive electrical signals that are representative of and consistent with the received acoustic signals and to process and interpret the electrical signals to reconstruct an image from the acoustic signals. An ultrasound image can be reconstructed using e.g., delay-and-sum beamforming principle (a common way of reconstructing an ultrasound image). In delay-and-sum beamforming, the spatial distribution of the ultrasound field amplitude in the volume of interest (area of image) is reshaped according to the delay timing between transmit, image pixel and receiver, and the received ultrasound signals are consequently recombined for the purpose of generating images. In delay-and-sum beamforming, the signals are coherently summed at each image pixel location according to the delay.

The processing unit 209 may further be in communication with an acoustic control unit 222. The acoustic control unit 222 may be configured to provide control data to and receive signal data from the acoustic probe 245 and/or the acoustic transducers 221. The acoustic probe 245 may be configured for ex vivo or in vivo use and may include an AEG transducer or an array of AEG transducers (or any other suitable acoustic transducers) configured to generate and/or receive acoustic signals, such as ultrasound signals. The acoustic probe 245 may also include a mixed array of both AEG transducers (or any other suitable acoustic transducers) configured to generate and/or receive acoustic signals and optical sensors configured to receive optical sensors such as disclosed in US Patent Publications US2022/0365036, US2023/0097639; US2022/0350022, and US2023/0148869, each of which is incorporated herein by reference. The one or more array elements of the first type (e.g., AEG transducers) may be used to form a first image. In parallel, the one or more array elements of the second type (e.g., the optical sensors) are used to detect acoustic echoes that can be used to form a second image. The second image that is generated by highly sensitive and broadband optical sensors may be used independently or can be combined with the first image to form an even further improved image. Because of the high sensitivity and broad bandwidth of optical sensors, the image produced by the optical sensors may have improved spatial resolution, improved penetration depth, improved signal-to-noise ratio (SNR), improved tissue harmonic imaging, and/or improved Doppler sensitivity.

The acoustic transducers 221 may be a component of a medical device system that is configured for in vivo deployment within the medium where the diagnostic or therapeutic procedure is or will be performed. The acoustic transducers 221 may include endoluminal or endocavity transducers located on a catheter, cannula or the like, or may be an intraoperative transducer that may allow for transducer positioning during a minimally invasive procedure, such as on a laparoscopic tool, positioned on the end of a robotic arm or held by a surgeon, assistant, or any other medical personnel for selectively positioning. In embodiments, the acoustic transducers 221 may be disposed on a same medical device as the medical device distal end 231, e.g., along with the fiber optical sensor(s) 101. In embodiments, the acoustic transducers 221 may be disposed on one or more devices separate from that of the medical device distal end 231.

In vivo transducers 221 may be positioned on catheters/endoscopes/cannulas and transmit acoustic waves outward that insonify the region of interest in the medium and may be referred to as forward viewing probes, as is known in the art. Alternatively, the acoustic transducers 221 may emit acoustic waves to the side. For example, the transducers 221 may be part of side emitting phased array used in IVUS applications. In another example, the transducers 221 may be used in a guide catheter with two side by side lumens, one capturing the guidewire and one working lumen that does not extend as distally as the guidewire lumen. Further, the transducers 221 may radially transmit acoustic waves. For example, the transducers 221 may be included in an echoendoscope with a radial (or sector), linear, curvilinear (convex array), trapezoidal, or any other image format used in ultrasound imaging. And linear (convex array) acoustic pattern. A radial echoendoscope may provide circumferential views at rights angles to the shaft of the echoendoscope or in other words an image perpendicular to the insertion tube. Different ultrasound frequencies may be used to provide ultrasound imaging of distant and proximal structures. A radial echoendoscope may provide a 360 degree image of anatomy, which may be used in screening but may be limited for therapeutic applications, such as obtaining tissue samples. A curvilinear, linear or other appropriate array may be used for therapeutic applications, such as tissue sample collection, cyst drainage, biopsies of lesions/lymph nodes and injection for pain management. In embodiments, the transducers 221 may be incorporated in a curvilinear echoendoscope that visualizes in a range dependent upon the curvilinear radius and allows for real time insertion of needle/therapeutic device. In such an embodiment, the ultrasound view may be in the same line or plane as the scope shaft. In further embodiments, the transducers 221 may be incorporated in a transverse array and provide an image in a plane perpendicular to shaft of scope.

In further procedures, a moveable intraoperative transducer may be positioned on the end of a robotic arm or other tool (e.g., such as bk Medical Rob12C4) or simply held by the medical professional during the procedure. Further, certain cannulas and endoscopes may have a front-facing emitting transducer 221 for insonifying the region in front of the cannula, catheter, or scope such as a craniotomy transducer.

Typical ex vivo transducers 221 or probes 245 may be positioned on the patient's skin surface, such as commonly used for general imaging or for specific procedures, such as needle guidance, needle location, or needle placement.

The processing unit 209 is configured to use the information signals from the acoustic probe 245 or acoustic transducers 221 (as well as any other acoustic signal generator that may be connected to or in communication with the optical acoustic sensor system 200) as received by the fiber optical sensor 101 to sense, track, and monitor the medical device distal end 231 as well as generate ultrasound images of the anatomy in the area of the procedure. In embodiments, the fiber optical sensor 101 or sensor array 201 operates to receive/detect acoustic signals generated by the acoustic probe(s) 245 and/or the acoustic transducers 221, along with scattered signals and tissue harmonics. Imaging of the medium may be accomplished by processing unit 209 according to differences between acoustic signals output or transmitted by the acoustic probe(s) 245 and/or acoustic transducers 221 and corresponding acoustic signals received and/or detected by the acoustic (s) probes 245 and/or acoustic transducers 221 and the fiber optical sensor 101. The signals detected may include the detected scattered signals and tissue harmonics. Portions of the medium through which the acoustic signals generated by the acoustic probe(s) 245 and/or acoustic transducers 221 travel may be imaged according to the detected acoustic signals.

The fiber optical sensor 101 (or sensor array 201) receives the acoustic signal transmitted from the acoustic probe 245 and/or acoustic transducers 221. Based on the signals received from the fiber optical sensor 101, the location of the fiber optical sensor 101 (and thus, the location of the medical device distal end 231) may be calculated either by triangulation (e.g., based on the receipt of one or more acoustic signals transmitted from a known origin) and/or by coherent image formation. More details can be found in co-pending application U.S. Provisional No. 63/522,994, titled Transponder Tracking and Ultrasound Image Enhancement, filed on Jun. 23, 2023 and U.S. application Ser. No. 18/382,984 titled Transponder Tracking and Ultrasound Image Enhancement and filed concurrently on Oct. 23, 2023 with this application. The location of the fiber optical sensor 101 may be overlayed on an ultrasound image of the anatomy to determine the relative location of the fiber optical sensor 101 with respect to a known location of the acoustic probe 245 and/or acoustic transducers 221. Further, an ultrasound image of the surrounding anatomy may be coherently reconstructed according to a combination of acoustic signals received by the fiber optical sensor 101 and by one or more of the acoustic probe 245 and/or the acoustic transducers 221. Such a combination may produce a better image quality than an image formed using acoustic probes 245 and/or acoustic transducers 221 alone.

In embodiments for tracking, sensing, and monitoring the medical device distal end 231, the optical acoustic sensor system 200 may include a plurality of acoustic probes 245 that are either fixed in place or have their locations tracked. Tracking, sensing, determining, and monitoring the location and movement of the medical device distal end 231 may be accomplished, for example, by identifying timing and/or directional differences between a plurality of acoustic signals detected by the fiber optical sensor 101 and the acoustic transducer 221.

It will be understood that the configuration of the optical acoustic sensor system 200 as illustrated in FIG. 2 is provided by way of example. Different configurations may be employed without departing from the scope of this disclosure. For example, different arrangements of optical devices 202A/B/C/D, different numbers and arrangements of fiber optical sensors 101 and fiber optical sensor arrays 201 may be employed. In embodiments, the light source control unit 207 and the acoustic control unit 222 may be incorporated or integrated within the processing system 250. Additional combinations of the components of the optical acoustic sensor system 200 may be selected as appropriate to achieve the functionality as described herein.

Figure 3A:
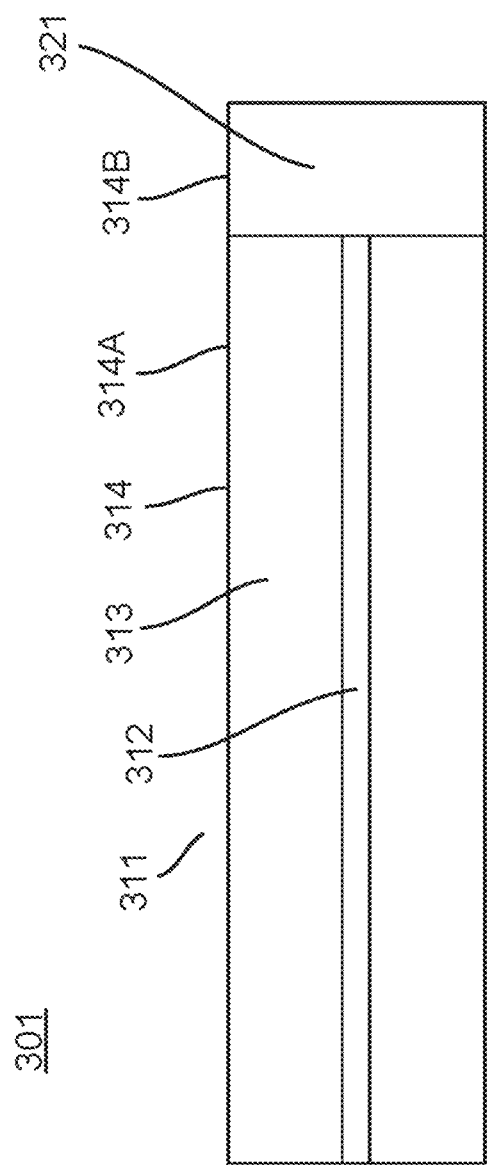
FIG. 3A illustrates a sensor fiber including a fiber optical sensor and associated optical fiber.

FIG. 3A illustrates a sensor fiber including a fiber optical sensor and associated optical fiber. An apparatus, as illustrated in FIG. 3A, may include a sensor fiber 301. The sensor fiber 301 may be an optical fiber configured with a fiber optical sensor disposed on an end thereof. Sensor fiber 301 includes an optical waveguide 311 comprising a core 312 and a cladding structure 313. The optical waveguide 311 is configured to transmit or carry light therein, e.g., within the core 312. The core 312 is surrounded by and protected by the cladding structure 313. The optical waveguide 311 may be substantially cylindrical along its length and/or may be of another suitable shape. The core 312 may be substantially in the center of the cladding structure 313. In embodiments, the optical waveguide 311 may be an optical fiber and may include any materials common to optical fibers. For example, core 312 may include silica glass, polymer, or other appropriate material. The cladding structure 313 material may be selected to be responsive to, for example, changes in ultrasound-induced pressure or strain. The pressure or strain induced by ultrasound will introduce a deformation or refractive index changes, leading to variations in optical signals passing through the optical fiber. When used as an ultrasound sensor, for example, the larger the variation, the higher the sensitivity and the better the detection limit. The cladding material may have at least one material property associated therewith, where the at least one material property may be a lower refractive index (RI) than a refractive index of the optical fiber core 312. Material properties such as the Young's modulus and photo-elastic coefficient of the fiber core, cladding materials, and encapsulating structures, which may be identical or different materials, can be tailored for the application. A smaller Young's modulus and larger photo-elastic coefficient may be preferred for increased ultrasound sensitivity and for acoustic responsiveness. As used herein, sensitive or responsive to acoustic signals may refer to materials that have a relatively small Young's modulus (E), a relatively high photo-elastic coefficient, and/or a relatively large refractive index (n), for example, as compared to silica materials. As used herein, a relatively small Young's modulus may refer to a Young's modulus less than 3.0 GPa, less than 2.0 GPa, less than 1.2 GPa, or within a range between 1.2 and 0.8 GPa. A relatively high photo-elastic coefficient C (i.e., $|C_1-C_2|$) may refer to photo-elastic coefficients greater than $C=2*10^{-12}$ 1/Pa. A relatively large refractive index may refer to a refractive index greater than approximately 1.46 for optical signals that range between approximately 300 nm-2000 nm. Such materials may be selected to increase, improve, or optimize the ability of optical structures discussed herein to detect acoustic signals. Because the optical structures described herein are configured to detect acoustic signals (e.g., ultrasound signals), the materials of which they are constructed may be selected to maximize or increase the sensitivity of the optical properties of the structures with respect to incident acoustic signals. For example, a material with a lower Young's module requires less stress to deform. In some applications, increased deformation may be undesirable. However, increased deformation in response to incident acoustic signals may amplify or increase detectable changes in optical signals that pass through the optical structures experiencing greater deformation. Similarly, increases in the photo-elastic effect are desirable in optical structures as described herein, but may be undesirable in different structures configured for different purposes.

It should be understood that the optical fiber core 312 may be any suitable type of optical fiber core, such as those made from silica, silicon, optically transparent polymers, or the like. As a non-limiting example, if the optical fiber core 312 is made from silica ($SiO_2$), the cladding material may be MY-133, a low refractive index optical coating manufactured by MY Polymers Ltd. of Israel, or BIO-133, also a low refractive index optical coating manufactured by MY Polymers Ltd. of Israel. As a further non-limiting example, if the core is silicon, which has a higher RI than silica, the cladding structure 313 may be polyvinylidene fluoride (PVDF), polystyrene (PS), parylene, benzocyclobutene (BCB), MY-133, or BIO-133.

The optical waveguide 311 may be configured for single mode (SM) transmission or for multi-mode (MM) transmission, depending upon the form factor and laser and sensor wavelength tuning requirements, as a SM fiber will be smaller in size. For example, a single mode fiber configured to operate in a 1550 nm band may have a 50 um cladding structure diameter and a core D=>4.2 um. Such a fiber may be a polarization maintaining fiber. A Multimode fiber configured to operate in the 1550 nm band may have a core D=50 um-60.5 um and a 125 um cladding diameter. In embodiments, a polymer fiber (e.g., PMMA, polystyrene) may be used. Such a fiber may have a larger diameter and a larger minimum bending radius than typical glass optical fibers. In other embodiments, a photonic crystal fiber (having a hollow structure/periodic pattern) may be used.

Disposed at an end of the sensor fiber 301 is an optical resonator structure 321. The optical resonator structure 321 is coupled to the end of the optical waveguide 311 and may include an optical resonator, such as a Fabry-Perot (FP) resonator, whispering-gallery mode resonator, micro-ring, micro-toroid, spiral resonator or a photonic crystal resonator integrated therein. The optical resonator structure 321 and other optical resonator structures described herein may include, in addition to the optical resonator, additional structures and components configured to facilitate the functionality of the optical resonator, as described below. The optical resonator is configured for receiving a first optical signal (e.g., light) supplied to it via the optical waveguide and providing a second optical signal back along the optical waveguide. The second optical signal may correspond to and represent an acoustic signal incident upon the optical resonator structure 321. As discussed above, the incident acoustic signal may cause physical deformation and/or material property alteration of the optical resonator structure 321. Accordingly, an optical signal provided along the optical waveguide 311 by the optical resonator structure may be altered by, influenced by, or otherwise indicative or representative of the acoustic signal and therefore may be used to characterize the incident acoustic signal.

The sensor fiber 301 may further comprise an encapsulating structure 314, which may include, for example, an outer coating, shielding, protective outer layer, and/or fiber jacket. The encapsulating structure 314 is configured with a first portion 314A surrounding the optical waveguide and 311 and a second portion 314B that at least partially surrounds the optical resonator structure 321. The encapsulating structure 314 may include a polymer, such as parylene, MY-133, BIO-133, or other suitable polymer that is sensitive or responsive to acoustic signals, as discussed above. The acoustic impedance of the encapsulating structure 314 may be selected to match an impedance of the optical resonator structure 321 so as to enhance the sensitivity of detection of acoustic signals. As used herein, "matching the impedance" may refer to selecting materials and/or structures that have acoustic impedances that match, generally it is well known to those of skill in medical ultrasound that acoustic impedances within 20% of one another provide an acceptable match. Closer matches in acoustic impedance lead to a better transmission of the acoustic signal (e.g., a smaller portion of the acoustic signal is reflected) and thus higher sensitivity. In embodiments, the first portion 314A surrounding the optical waveguide and 311 and a second portion 314B that at least partially surrounds the optical resonator structure 321 may comprise different materials selected for different purposes. For example, the first portion 314A may include an acoustically transmissive material, e.g., having an acoustic impedance selected to increase matching and thereby minimize reflection of acoustic signals. The second portion 314B may include acoustically responsive/sensitive materials, as discussed above, to increase a response to an incident acoustic signal in the area of the optical resonator structure 321. Unless explicitly stated otherwise, all encapsulating structures discussed herein may include properties similar to those of encapsulating structure 314, including a first portion and a second portion comprising different materials selected for different purposes.

The optical resonator structure 321 is disposed at an end of the optical waveguide 311 and may therefore be referred to as a fiber-end sensor. The cladding structure 313 may have a first diameter and the optical resonator structure 321 may have a second diameter. The first diameter and the second diameter may or may not be substantially the same. Depending on the application, it may be advantageous to have the fiber substantially the same size or to have a significantly larger sensor than the fiber, such as a bulb like structure that may or may not be symmetrical. The increased size may further enhance the acoustic sensitive surface area of the sensor, increasing the overall sensitivity. As discussed above, the sensor fiber 301 may be compact as may be needed in view of the small form factor needed for certain medical applications, in some examples, wherein the first diameter and/or the second diameter are less than 200 microns, less than 175 microns, less than 150 microns, less than 130 microns, less than 100 microns, or less than 85 microns.

Figure 3B:
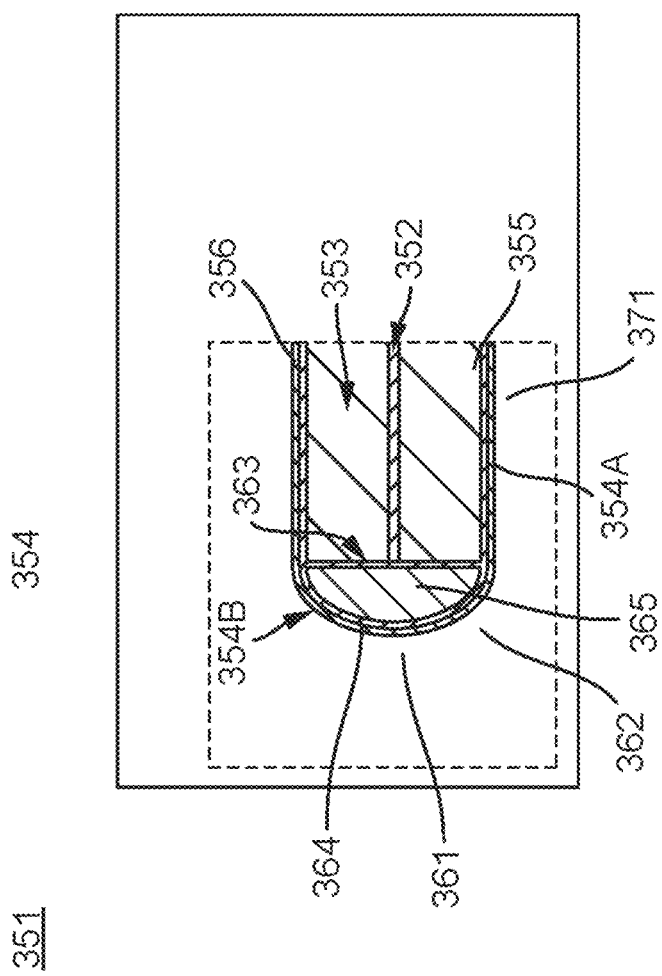
FIG. 3B illustrates a sensor fiber including an optical waveguide and optical resonator structure having a Fabry-Perot resonator as an optical sensor.

FIG. 3B illustrates a sensor fiber including an optical waveguide and optical resonator structure having a Fabry-Perot type resonator as an optical sensor. Sensor fiber 351 is an example of sensor fiber 301 and may include any of the features of sensor fiber 301 as described above. Sensor fiber 351 includes an optical waveguide 371 having a core 352 and a cladding structure 353. The core 352 may have a diameter in a range between 7 and 12 microns or a diameter of approximately 9 microns. These dimensions are provided as an example only and do not limit the sizes and diameters encompassed by embodiments of the present disclosure. The sensor fiber 351 may include an encapsulating structure 354, which may, for example, include an outer coating, protective outer layer, and/or fiber jacket, that encapsulates both the optical waveguide 371 and an optical resonator structure 361 disposed at an end of the optical waveguide 371. The encapsulating structure 354 may be a multi-layer structure, including, for example, an inner layer 355 and an outer layer 356. The inner layer 355 may include gold or any suitable reflective material layer for the optical wave while the outer layer 356 may include parylene, MY-133, BIO-133, or other suitable protective layer that may be acoustically transparent. The encapsulating structure 354 may include a first portion 354A that encapsulates or surrounds the optical waveguide 371 and a second portion 354B that encapsulates or surrounds the optical resonator structure 361. The encapsulating structure 354 may have features similar to those of encapsulating structure 314, including a first portion and a second portion of different materials. The optical resonator structure 361 may be configured with a Fabry-Perot resonator as an optical resonator 362. The optical resonator 362 includes a distal reflecting surface 364 and a proximal reflecting surface 363 arranged at either side of an optical cavity 365. The distal reflecting surface 364 and the proximal reflecting surface 363 may be constructed of any suitable reflective material. As shown in FIG. 3B, the distal reflecting surface 364 and the proximal reflecting surface 363 are formed from and integral with the inner layer 355 of the encapsulating structure 354, and are thus formed of gold or other suitable reflective material. As illustrated in FIG. 3B, the distal reflecting surface 364 may be curved and the proximal reflecting surface 363 may be substantially flat. This arrangement is by way of example only, and the distal and proximal reflecting surfaces 364/363 may be arranged with different shapes and/or configurations. Some additional examples are provided in FIGS. 4A-4E. In other embodiments, the distal reflecting surface 364 and the proximal reflecting surface 363 may be formed from different materials and/or may be structures separate from the encapsulating structure 354. The optical cavity 365 is disposed between the distal reflecting surface 364 and the proximal reflecting surface 363. The term "optical cavity," as used herein, refers to a volume occupied by a material that provides minimal attenuation to light passing therethrough (e.g., having a high Q factor typically higher than 1000). The quality (Q) factor is a dimensionless parameter that describes the amount of damping within a resonator. A higher Q factor corresponds to a more sensitive resonator.

In optics, the Q factor of a resonant cavity is given by:

$$Q = \frac{2\pi f_0 E}{P},$$

where $f_0$ is the resonant frequency, E is the stored energy in the cavity, and $$P = -\frac{dE}{dt}$$

is the power dissipated. The optical Q factor is equal to the ratio of the resonant frequency to the bandwidth of the cavity resonance. The average lifetime of a resonant photon in the cavity is proportional to the cavity's Q factor. Thus, a high Q factor represents low damping, with a high lifetime for a photon within the cavity.

The Q factor, as well as any other determinations of sensitivity and responsiveness, are ultimately limited by the choice of material used for the optical fiber core. A conventional Fabry-Perot interferometer may be formed uniformly from a single material, such as silica throughout the entire structure. Although silica, for example, has excellent optical transmission capabilities, it does not have equally exceptional acoustic sensitivity. Although numerous materials with superior acoustic sensitivity are known, such materials, on their own, may not make suitable replacements for silica and the like for optical fiber cores. The present invention adapts resonant actuators to take advantage of the acoustic sensitivity found in other materials.

The optical cavity 365 may be composed of a suitable material, such as a polymer. Polymer materials, such as MY-133 or BIO-133, with high acoustic transmissivity may be employed to enhance the sensitivity of the optical resonator structure, as discussed above. The optical resonator structure 361 may be configured to detect acoustic signals. Acoustic signals incident upon the optical resonator structure, e.g., upon the distal reflecting surface 364, the proximal reflecting surface 363, and/or the optical cavity 365 may cause vibrations and/or other physical deformations of these structures, which may alter or influence their optical properties. Further, due to the photo-elastic effect, the material properties of these structures may be altered and thus further change the optical properties. Accordingly, return optical signals provided to the optical waveguide 371 by the optical resonator structure 361 (e.g., in response to optical signals supplied via the optical waveguide 371) may be indicative of or representative of the acoustic signals incident upon the optical resonator structure 361. More particularly, detected phase shifts of the light in the sensor beam, are indicative of sensed acoustic signals. With a polarization based sensor, a polarization analyzer will interpret the phase shift/delays between the different polarization components in order to generate the signal indicative of the sensed acoustic signals.

FIG. 4A-FIG. 4E illustrate several variations of the optical resonator structure 361 consistent with embodiments hereof. FIG. 4A illustrates an optical resonator structure 361 having a proximal reflecting surface 363 and a distal reflecting surface 364 that are substantially flat and substantially parallel at either end of an optical cavity 365 that is substantially cylindrical. FIG. 4B illustrates an optical resonator structure 361 having a proximal reflecting surface 363 that is substantially flat and substantially square to the optical waveguide 371 and a concave distal reflecting surface 364 with respect to the optical cavity 365. FIG. 4C illustrates an optical resonator structure 361 having a proximal reflecting surface 363 that is convex with respect to the optical cavity 365 and a distal reflecting surface 364 that is concave with respect to the optical cavity. FIG. 4D illustrates an optical resonator structure 361 having a proximal reflecting surface 363 that is concave with respect to the optical cavity 365 and a distal reflecting surface 364 that is substantially planar and substantially square to the optical waveguide 371. FIG. 4E illustrates an optical resonator structure 361 having a proximal reflecting surface 363 and a distal reflecting surface 364 that are both concave with respect to the optical cavity 365.

FIG. 5A illustrates an optical sensor system for use with a fiber optical sensor according to embodiments herein. FIG. 5B illustrates an interferometer based optical sensor according to embodiments herein. The optical sensor system 100B of FIG. 5A is configured for use with an interferometer based fiber optical sensor 101B, as shown in FIG. 5B.

The fiber optical sensor 101B may include a fiber end sensor having an interferometer based acoustic sensor. The fiber optical sensor 101B may include a sensor fiber 301A having an interferometer based fiber-end sensor structure 321A disposed at an end thereof, e.g., at the end of an optical waveguide 311A. Except where noted, the sensor fiber 301A may include features and structures consistent with those of sensor fiber 301. The interferometer based fiber-end sensor structure 321A may include, for example, a Mach-Zehnder (MZ) type of interferometer. The interferometer based fiber-end sensor structure 321A is coupled to the end of the optical waveguide 311A. The interferometer based fiber-end sensor structure 321A may include, additional structures and components configured to facilitate the functionality of the interferometer based fiber-end sensor, as described below. The interferometer based fiber-end sensor is configured for receiving a first optical signal (e.g., light) supplied to it via the optical waveguide 311A and providing a second optical signal back along the optical waveguide 311A. The second optical signal may correspond to and represent an acoustic signal incident upon the interferometer based fiber-end sensor structure 321A. The incident acoustic signal may cause physical deformation and/or material property alteration of the interferometer based fiber-end sensor structure 321A. Accordingly, an optical signal provided along the optical waveguide 311A by the interferometer based fiber-end sensor structure 321A may be altered by, influenced by, or otherwise indicative or representative of the acoustic signal and therefore may be used to characterize the incident acoustic signal.

The interferometer based fiber-end sensor structure 321A may include an acoustically responsive polymer portion 317A including parylene or other suitable polymer that is sensitive to acoustic signals. The acoustic impedance of the polymer portion 317A may be selected to match (e.g., within 1%, 5%, 10%, or 20%) of the acoustic impedance of an encapsulating structure of the sensor fiber 301A to enhance the sensitivity of the fiber-end sensor structure 321A, as described above. A distal reflecting surface 364A is arranged at the distal end of the fiber-end sensor structure 321A and may be constructed of any suitable material, for example, gold. As shown in FIG. 5B the distal reflecting surface 364A is formed from gold and integral with polymer portion 317A.

The fiber-end sensor structure 321A is disposed at an end of the optical waveguide 311A and may therefore be referred to as a fiber end sensor. The optical waveguide 311A may have a first diameter and the fiber end sensor structure 321A may have a second diameter. The first diameter and the second diameter may be substantially the same and/or may have a ratio in a range between 1.05 and 0.95, a ratio in a range between 1.02 and 0.98, or a ratio in a range between 1.01 and 0.99. As discussed above, the sensor fiber 301A may be compact, e.g., wherein the first diameter and/or the second diameter are less than 200 microns, less than 175 microns, less than 150 microns, less than 130 microns, less than 100 microns, or less than 85 microns.

The optical sensor system 100B is configured for use with an interferometer based fiber optical sensor 101B. The optical sensor system 100B may include a light source 104, such as a laser, a light reception device 103, such as a photodetector, one or more optical waveguides 105, an optical circulator 102, one or more frequency shifters 106, and one or more couplers 107. In operation, the light source 104 supplies the initial optical signal 111A to the fiber optical sensor 101 via the optical waveguides 105, through a coupler/decoupler 107A, and through the optical circulator 102. The supplied initial optical signal 111A is returned by the fiber optical sensor 101 back along the optical waveguide 105. The returned optical signal 112 travels via the optical waveguides 105 through the optical circulator 102 and a coupler/decoupler 107B and is received at the light reception device 103. The coupler/decoupler 107A serves to direct a portion of the initial optical signal 111A through the frequency shifter 106 as reference optical signal 111B to the coupler/decoupler 107B where it may be combined with the returned optical signal 112 for detection and comparison at the light reception device 103. As discussed above, acoustic signals incident on the fiber optical sensor 101 alter the optical characteristics (including the physical structure as well as the optical material properties) of the fiber optical sensor 101. Such optical characteristic alterations may be measured according to changes in the returned optical signal 112 as compared to the reference optical signal 111B.

FIGS. 5C and 5D illustrate embodiments of fiber optical sensors that include fiber end facets configured to provide or enhance acoustic detection capabilities. Fiber optical sensor 101C and fiber optical sensor 101D each include at least an optical waveguide 311, a fiber core 312, a cladding structure 313, and an encapsulating structure 314. The fiber optical sensor 101C includes an optical sensor structure 329C that includes an acoustically responsive polymer portion 397 and a facet substrate 398A located at a distal end thereof. The fiber optical sensor 101D includes an optical sensor structure 329D that includes that includes an acoustically responsive polymer portion 397, a facet substrate 398B disposed between the polymer portion 397 and the core 312 and cladding structure 313, and a distal end reflective surface 394 disposed at a distal end of the polymer portion 397.

In the fiber optical sensor 101C, the facet substrate 398A is disposed at a distal end of the fiber optical sensor 101C. The optical sensor structure 329C is formed by the polymer portion 397 and the facet substrate 398A. The facet substrate 398A includes one or more facet structures 399A, as shown in the cross-sectional view. The facet structures 399A may include acoustically responsive microstructures, such as metasurfaces including patterns of small elements arranged to change the wavefront shape of the acoustic signals and maximize the detection of acoustic signals, acoustically responsive low-dimensional materials with optomechanical features selected to optimize acoustic response, e.g., features that are more prone to deformation when receiving acoustic signals, exhibit greater material responses to acoustic signals, and plasmonic structures patterned to amplify light-matter interactions, as described herein. Plasmonic structures may locally amplify incident light due to their plasmonic resonance. The facet structures 399A operate as an optical sensor as described herein. During operation, the supplied optical signal 1111 reflects off of the facet substrate 398A and is returned to the system as the returned optical signal 1121. Because the facet structures 399A are acoustically responsive, the returned optical signal 1121 is modified by changes in the facet structures 399A caused by incident acoustic signals. In embodiments, plasmonic resonance induced in a plasmonic meta-surface serving as the facet structures 399A or Mie resonance induced in a dielectric meta-surface serving as the facet structures 399A may be altered (e.g., shifted) by incident acoustic signals to provide detectable modifications in the returned optical signal 1121. The returned optical signal 1121 may then be interpreted by any of the systems described herein.

In the fiber optical sensor 101D, the facet substrate 398B is disposed between the polymer portion 397 and core 312 and cladding structure 313. The optical sensor structure 329D is formed by the polymer portion 397, the facet substrate 398B, and the distal reflective surface 394. The facet substrate 398B includes one or more facet structures 399B, as shown in the cross-sectional view. The facet structures 399B may include acoustically responsive microstructures similar to those described above with respect to facet structures 399A. The facet structures 399B operate to enhance, improve, or otherwise modify the acoustic response of the optical sensor structure 329D. During operation, the supplied optical signal 1111 reflects off of distal reflective surface 394 and is returned to the system as the returned optical signal 1121. The polymer portion 397 and the distal reflective surface 394 are acoustically responsive and the returned optical signal 1121 is modified according to acoustic signals incident upon these structures. Because the facet structures 399B are acoustically responsive and both the supplied optical signal 1111 and the returned optical signal 1121 pass through the facet substrate 398B, the returned optical signal 1121 is further modified by changes in the facet structures 399B caused by incident acoustic signals. In embodiments, the facet structures 399B may be designed and/or selected to optimize coupling (e.g., decrease signal loss) and/or achieve critical coupling (e.g., eliminate signal loss) for the optical sensor structure 329D. Increased coupling in the optical sensor structure 329D serves to increase the amplitude of optical signals responsive to incident acoustic signals. Thus, the returned optical signal 1121 may exhibit a higher signal to noise ratio. Further, incident acoustic signals that cause deformation in the facet structures 399B may also server to alter the degree to which the facet structures 399B modify the coupling in the optical sensor structure 329D, thus providing another aspect of returned optical signal 1121 that is altered by incident acoustic signals for interpretation. The returned optical signal 1121 may then be interpreted by any of the systems described herein. Accordingly, the facet substrate 399B may serve to enhance, improve, or otherwise modify the acoustic response of the optical sensor structure 329D.

The facet structures 399A and 399B are illustrated in FIGS. 5C and 5D as being incorporated into fiber optical sensors 101C and 101D. Such facet substrates are not limited to use with optical sensors having the interferometer based structure and operation of fiber optical sensors 101C and 101D and may be incorporated into any of the fiber optical sensors discussed herein.

FIG. 5E illustrates an example of plasmonic meta-surfaces and FIG. 5F illustrates an example of dielectric meta-surfaces. As illustrated in FIG. 5E, a fiber 500 may include plasmonic meta-surfaces 511 disposed at an end of an optical waveguide 502 having a core 501. The plasmonic meta-surfaces 511 may be disposed on the end of the fiber 500 within the area defined by the core 501. As illustrated, the plasmonic meta-surfaces 511 may be disposed in a pattern of squares, for example, or may also be disposed in any other suitable pattern. The plasmonic meta-surfaces 511 may exhibit plasmonic resonance when struck by an optical signal from the core 501. Deformations caused by incident acoustic signals alter the plasmonic resonance and permit detection and decoding of the acoustic signal as discussed herein. The plasmonic meta-surfaces 511 may include various metals and in particular may include noble metals, such as gold. Further the plasmonic meta-surfaces 511 may be thin film surfaces, having a height less than 50 microns, less than 40 microns, less than 30 microns, less than 20 microns, or less than 10 microns. In further embodiments, the plasmonic meta-surfaces 511 may be low dimensional or two dimensional surfaces, having a height less than 1 micron. In the lateral dimension, the features of the plasmonic meta-surfaces 511 may be small, having lateral dimensions D (e.g., width and/or length) less than the wavelength of optical signals used by the sensors (e.g., less than 600 nanometers, less than 400 nanometers, less than 200 nanometers, etc.) Lateral dimensions of the plasmonic meta-surface 511 features may also refer to spacing between the features. FIG. 5F illustrates dielectric meta-surfaces 512, which may be similarly disposed within the area of a fiber core 501 at the end of an optical waveguide 502 of a fiber 550. The dielectric meta-surfaces 512 may be arranged in strips or rectangles, as illustrated in FIG. 5F, or in any other suitable shape. The dielectric meta-surfaces 512 may be configured to exhibit Mie resonance when struck by an optical signal. The Mie resonance may be altered by an incident acoustic signal, thereby permitting the detection and decoding of the acoustic signal. In embodiments, the dielectric meta-surfaces 512 may include dielectric materials, such as. Silicon, Titanium Oxide, etc. In embodiments, the dielectric meta-surfaces 512 may be sized similarly to the plasmonic meta-surfaces 512, as discussed above.

FIG. 6A illustrates an optical sensor system for use with a fiber optical sensor according to embodiments herein. FIG. 6B illustrates a polarization based optical sensor according to embodiments herein. The optical sensor system 100B is configured for use with a polarization based fiber optical sensor 101C. The fiber optical sensor 101C may include a fiber end sensor having a polarization based acoustic sensor. The fiber optical sensor 101C may include a sensor fiber 301B having a polarization based fiber-end sensor structure 321B disposed at an end thereof, e.g., at the end of an optical waveguide 311B. In further embodiments, as discussed below, the polarization based fiber-end sensor structure 321B may be disposed at any location along the sensor fiber 301B. Except where noted, the sensor fiber 301B may include features and structures consistent with those of sensor fiber 301. The sensor fiber 301B includes an encapsulating structure 314C, which may include, for example, an outer coating, protective outer layer, and/or fiber jacket. The encapsulating structure 314C may include a material selected to have a relatively high acoustic impedance mismatch with the cladding structure of the sensor fiber 301B. Accordingly, where the sensor fiber 301B is covered by the encapsulating structure 314C, incident acoustic signals may be reflected. The polarization based fiber-end sensor structure 321B may be exposed by a window 320B defined by a lack of encapsulating structure 314C and may include a polymer portion 317B comprising an acoustically responsive polymer and a distal reflective surface 364B configured to reflect the initial optical signal 111 as a reflected optical signal 112. The polarization based fiber-end sensor structure 321B is configured for receiving a first optical signal (e.g., light) supplied to it via the optical waveguide 311B and providing a second optical signal back along the optical waveguide 311B. The second optical signal may correspond to and represent an acoustic signal incident upon the polarization based fiber-end sensor structure 321B. The incident acoustic signal may cause physical deformation and/or material property alteration of the polarization based fiber-end sensor structure 321B. Accordingly, an optical signal provided along the optical waveguide 311B by the polarization based fiber-end sensor structure 321B may be altered by, influenced by, or otherwise indicative or representative of the acoustic signal and therefore may be used to characterize the incident acoustic signal. In the polarization based fiber-end sensor structure 321B, the incident acoustic signal cause stress in the polymer portion 317B that results in one or more of birefringence and a rotation of the polarization of the light passing through the polymer portion 317B changes in the polarization of the light carried by the optical waveguide 311B, which may be detected and analyzed by the optical sensor system 100B as discussed below.

The optical sensor system 100B includes a light source 104, such as a laser, a light reception device 103, such as a photodetector, one or more optical waveguides 105, an optical circulator 102, and a fiber optical sensor 101B. In operation, the light source 104 supplies the initial optical signal 111 to the fiber optical sensor 101B via the optical waveguides 105 and through the optical circulator 102. The supplied initial optical signal 111 is returned by the fiber optical sensor 101B back along the optical waveguide 105. The returned optical signal 112 travels via the optical waveguides 105 through the optical circulator 102, through the polarization analyzer 108, and is received at the light reception device 103. Use of the polarization analyzer 108 permits the determination of the polarization difference between the initial optical signal 111 and the returned optical signal 112. As discussed above, acoustic signals incident on the fiber optical sensor 101B alter the optical characteristics (including the physical structure as well as the optical material properties) of the fiber optical sensor 101B and cause an alteration in the polarization of the returned optical signal 112. Such polarization changes may be measured according to differences in the returned optical signal 112 and the initial optical signal 111 as determined according to the photodetector.

In embodiments, the angular sensitivity of the polarization based fiber-end sensor structure 321B may be subject to differences in the polarization of the initial optical signal 111. Depending on the polarization of the initial optical signal 111, the angle of incident acoustic signals to which the polarization based fiber-end sensor structure 321B is most sensitive may be altered, as shown in FIG. 6C. Accordingly, in embodiments, a control system associated with the optical sensor system 100B may be configured to adjust or optimize the polarization of the initial optical signal 111, such as from input polarization state 1 to input polarization state 2 to increase acoustic sensitivity. These polarization states are provided by way of example only, and may be altered or configured according to operational needs, as discussed below. FIG. 6C illustrates the direction in which input polarization state 1 and input polarization state 2 are most sensitive to incoming acoustic signals. The solid arrows correspond to the directions in which input polarization state 1 is most sensitive, and the dashed arrows correspond to input polarization state 2. Thus, the lobes of the polarization states provide the highest acoustic sensitivity. Accordingly, an input polarization state may be selected and implemented to align with an expected direction of acoustic signals or with a direction in which acoustic sensitivity is most desired. This may permit the optical sensor system 100B to optimize performance of the fiber-end sensor structure 321B according to an incoming direction of an acoustic signal. The angular sensitivity of the polarization based fiber-end sensor structure 321B is not reliant on the structure of the fiber-end sensor structure 321B. In embodiments, a polarization maintaining fiber may be used. After the polarization state is selected and implemented, it is maintained by the optical signal. In embodiments, an adjustable fiber component may be used to provide an adjustable polarization state. In an embodiment, the polarization state may be adjusted during use to account for changing conditions (such as movement of an acoustic transducer 221 generating the acoustic signal and/or movement, rotation, etc., of the fiber-end sensor structure 321B.) Further benefits of the polarization based fiber-end sensor structure 321B may include a simplified sensor structure and no wavelength locking requirements.

Figure 6D:
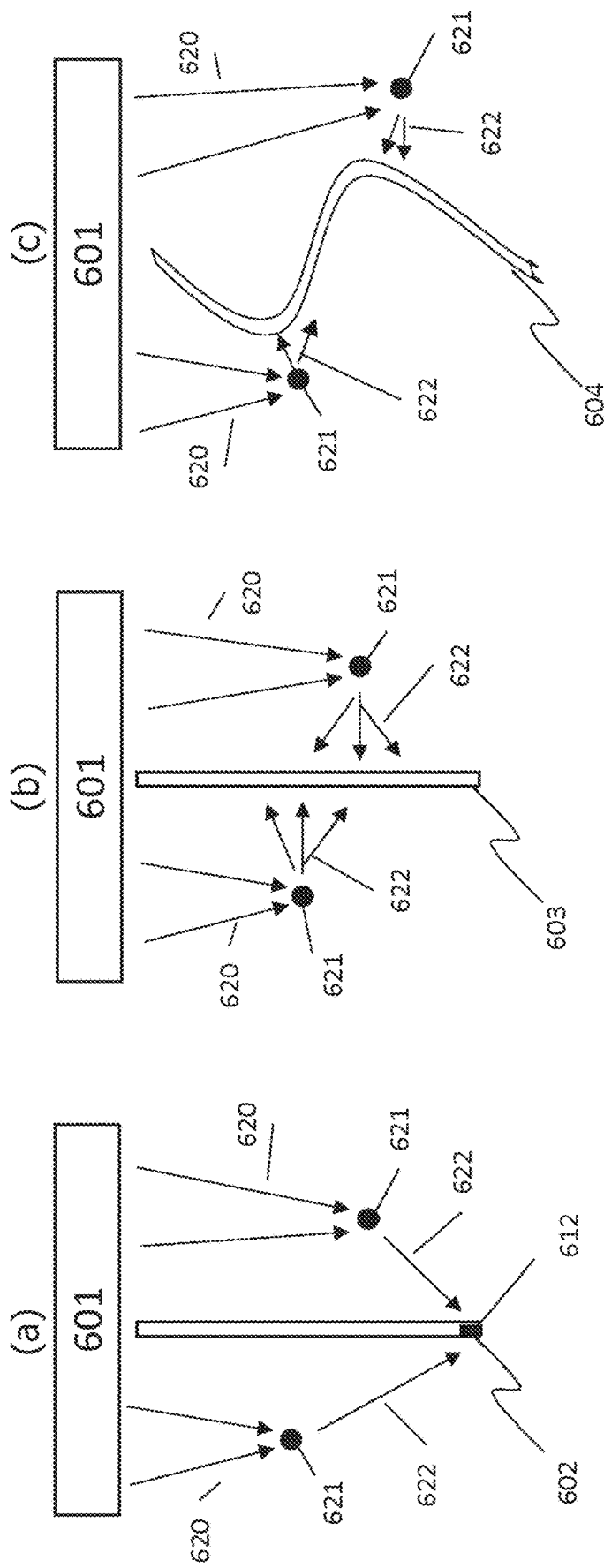

FIG. 6D illustrates a further embodiment of a fiber-based optical sensor consistent with embodiments hereof. A sensor fiber 301C may be an optical fiber configured similarly to sensor fiber 301, including an optical waveguide comprising a core and a cladding structure, as described herein. The sensor fiber 301C may have a fiber end sensor structure 321C disposed on an end thereof. The fiber end sensor structure 321C may include any of the fiber end sensor structures discussed herein, including optical resonator structures, interferometer structures, acoustically responsive fiber end facet structure and polarization based structures. The sensor fiber 301C may further include an encapsulating structure 314C configured to reflect incident acoustic signals and a window 320C representing a gap or exposure area that lacks encapsulating structure 314C. The window 320C may expose a polarization based optical sensor structure 322C, e.g., as discussed with respect to FIG. 6B. In embodiments, the polarization based optical sensor structure 322C is formed from the cladding structure and the core of the fiber of which it is a part. That is, the polarization based optical sensor structure 322C may be defined by exposure to incident acoustic signals created by the lack of acoustic shielding at the window 320C, rather than any additional structure within the fiber. The sensor fiber 301C may include any number of windows 320C and polarization based optical sensor structures 322C disposed along its length. Thus, the sensor fiber 301C may include a plurality of optical based acoustic sensor structures, including both fiber end sensor structures 321C and polarization based optical sensor structures 322C configured for mid-fiber location. In further embodiments, the window 320C may be sized along the length of the fiber sufficiently that it will operate as a line sensor as opposed to a point sensor as will be discussed in greater detail below. The line sensor may be a straight line sensor or a curved line receiver. In further embodiments, the sensor fiber 301C may be configured with one or more polarization based optical sensor structures 322C disposed along its length while not including any fiber end sensor structures 321C.

Each of the fiber end sensor structure 321C and the polarization based optical sensor structures 322C may be used to facilitate both imaging and tracking, as described herein. In embodiments, a polarization based optical sensor 322C may be configured, e.g., by size/shape, to facilitate imaging, tracking, or both. For example, a longer polarization based optical sensor structure 322C may increase image quality, acting as a line sensor and the line may be straight or curved. In another example, multiple polarization based optical sensor structures 322C may be used to facilitate tracking methods (multiple sensors along a device may assist with orientation determination, for example.)

In some embodiments, the polarization window portion may also work as a fiber optical sensor that detects scattered acoustic signals and/or tissue harmonics. When the fiber optical sensor is positioned within an imaging area of interest, it may receive weak harmonic or scattered acoustic signals that are unable to propagate very far. The fiber optical may convey optical signals corresponding to the received acoustic signals to a system processor (e.g., processing unit 209). The system processor may use the received optical signals to reconstruct the ultrasound image of the anatomy surrounding the sensor with a delay and sum beamforming method or other suitable image reconstruction method, as discussed in more detail in corresponding U.S. Provisional Application No. 63/522,994, titled Transponder Tracking and Ultrasound Image Enhancement, filed on Jun. 23, 2023 and U.S. application Ser. No. 18/382,984 titled Transponder Tracking and Ultrasound Image Enhancement filed concurrently on Oct. 23, 2023. With this data, the system processor may generate an image of better quality than one generated solely based on the pulses emitted and received an acoustic probe. In embodiments, the system processor may construct an image based solely on the optical signals received from one or more fiber optical sensors. In embodiments, the optical signals received from one or more fiber optical sensors may be used in conjunction with the acoustic signals received by a traditional ultrasound probe.

This principle is illustrated in greater detail in FIG. 6DD. As shown in FIG. 6DD, an acoustic probe 601 may be used to transmit acoustic signals 620 into an area of interest. The acoustic probe 601 may function as a traditional acoustic probe to detect reflections of the acoustic signals 620 for imaging purposes. These images may be enhanced by additional information obtained by one or more fiber optical sensors. The fiber optical sensor 612 of the sensor fiber 602 may correspond to any of the fiber end optical sensor structures discussed herein and may receive acoustic signals 622. The acoustic signals 622 may result from reflection, scattering, and/or tissue harmonics. As shown in FIG. 6DD, the acoustic signals 622 are generated from points 621 within the area of interest. The fiber optical sensor 612 may be configured to receive acoustic signals 622 from any direction, as discussed herein. The sensor fiber 603 may be configured to act as a polarization based optical sensor, as discussed herein, and may receive acoustic signals 622 from directions lateral to the axis of the sensor fiber 603. As used herein, "lateral" refers to all directions that are not parallel to the axis of the sensor fiber 603. As shown in FIG. 6DD, the acoustic signals 622 may be received by the sensor fiber 602 at any exposed portion along its length and from any direction, as discussed with respect to FIG. 6D. Further, as discussed with respect to and shown in FIG. 6C, the polarization of the sensor fiber 602 may be selected or adjusted to accommodate an expected or desired radial angle of incidence of the acoustic signals 622. FIG. 6DD further illustrates the sensor fiber 604, which may curve within the area of imaging interest. Similar to the sensor fiber 603, the sensor fiber 604 may detect incident acoustic signals 622 lateral, substantially lateral, or from any direction relative to the axis of the sensor fiber 604. Detection of lateral signals at multiple points along the length of the sensor fiber 604 may enhance an ability to track and/or locate the sensor fiber 604 when it is disposed within a medium (e.g., within a human body during a medical procedure). For example, as shown in FIG. 6DD(b), multiple signals incident along the length of the sensor fiber 604 may enhance an ability to determine the location of different portions of the sensor fiber 604 along its length and therefore to identify the location of the entire sensor fiber 604, and not just a tip region. For example, as shown in FIG. 6DD(c), multiple signals incident along the length of the sensor fiber 604 may enhance an ability to determine the location of different portions of the sensor fiber 604 and therefore to identify curvature of the sensor fiber 604 with greater accuracy.

FIGS. 6E and 6F illustrate an optical sensor system for use with a fiber optical sensor according to embodiments herein. FIG. 6F illustrates an optical resonator based optical sensor configured for use with a multi-core optical fiber according to embodiments herein. The optical sensor system 100D of FIG. 6E is configured for use with the multi-core optical resonator based fiber optical sensor 101D, as shown in FIG. 6F. In further embodiments, other optical sensors discussed herein, including, for example, interferometer based sensors may be employed in a multi-core optical fiber based system.

The fiber optical sensor 101D may include a fiber end sensor having an optical resonator based acoustic sensor as described herein. The fiber optical sensor 101D may include a sensor fiber 301D having an optical resonator based fiber-end sensor structure 321D disposed at an end thereof, e.g., at the end of an optical waveguide 311D. Except where noted, the sensor fiber 301D may include features and structures consistent with those of sensor fibers 301 and 351. The optical resonator based fiber-end sensor structure 321D is coupled to the end of the optical waveguide 311D. The optical resonator based fiber-end sensor structure 321D may include an optical resonator sensor 322D, in addition to additional structures and components configured to facilitate the functionality of the optical resonator sensor 322D, as described below. The optical resonator based fiber-end sensor 322D, schematically illustrated in FIG. 6F, may be waveguide-coupled such that it is configured for receiving an initial optical signal 111 (e.g., light) supplied to it via a first optical core 313D of the sensor fiber 301D and providing a returned optical signal 112 back along a second optical core 312D of the sensor fiber 301D. The second optical signal may correspond to and represent an acoustic signal incident upon the optical resonator based fiber-end sensor structure 321D. The incident acoustic signal may cause physical deformation and/or material property alteration of the optical resonator based fiber-end sensor structure 321D. Accordingly, an optical signal provided along the second optical core 312D by the optical resonator based fiber-end sensor structure 321D may be altered by, influenced by, or otherwise indicative or representative of the acoustic signal and therefore may be used to characterize the incident acoustic signal.

The optical resonator based fiber-end sensor structure 321D may include an acoustically responsive polymer portion 317D including parylene or other suitable polymer that is sensitive to acoustic signals. The acoustic impedance of the polymer portion 317D may be selected to match (e.g., within 1%, 5%, 10%, or 20%) of the acoustic impedance of an encapsulating structure or cladding structure 314D of the sensor fiber 301D to enhance the sensitivity of the optical resonator based fiber-end sensor structure 321D, as described above.

The fiber-end sensor structure 321D is disposed at an end of the optical waveguide 311D and may therefore be referred to as a fiber end sensor. The encapsulating or cladding structure 314D may have a first diameter and the fiber end sensor structure 321D may have a second diameter. The first diameter and the second diameter may be substantially the same and/or may have a ratio in a range between 1.05 and 0.95, a ratio in a range between 1.02 and 0.98, or a ratio in a range between 1.01 and 0.99. As discussed above, the sensor fiber 301D may be compact, e.g., wherein the first diameter and/or the second diameter are less than 200 microns, less than 175 microns, less than 150 microns, less than 130 microns, less than 100 microns, or less than 85 microns. With very small fiber diameters, increasing the diameter of the fiber sensor end may further enhance acoustic sensitivity.

The optical sensor system 100D is configured for use with the resonator based fiber optical sensor 101D. The optical sensor system 100D may include a light source 104, such as a laser, a light reception device 103, such as a photodetector, one or more optical waveguides 105, and a multi-core fiber fan-out coupler 109. In operation, the light source 104 supplies the initial light signal 111 to the fiber optical sensor 101D via the optical waveguide 105, through the multi-core fiber fan-out coupler 109. The supplied initial optical signal 111 travels to the optical resonator based fiber-end sensor structure 321D via a first optical core 313D, where it may be affected by an incident acoustic signal, and then is returned by the second optical core 312D as a returned optical signal 112. The returned optical signal 112 travels via the optical waveguides 105 through the fan-out coupler 109 to be received at the light reception device 103. As discussed above, acoustic signals incident on the fiber optical sensor 101D alter the optical characteristics (including the physical structure as well as the optical material properties) of the fiber optical sensor 101D. Such optical characteristic alterations may be measured from the returned optical signal 112 to measure properties and characteristics of the incident acoustic signals. In the embodiment of FIG. 6E, it is not necessary to provide the initial optical signal 111 to the light reception device 103 to measure the optical characteristic alterations, for example, because the parameters of the initial optical signal 111 are known by the system.

The multi-core fiber fan-out coupler 109 serves to couple the single core optical waveguides 105 to the multi-core optical waveguide 311D. Thus, the initial optical signal 111 and the returned optical signal 112 may travel in separate optical cores in the multi-core optical waveguide 311D. As compared to the optical sensor system 100B, use of the multi-core fiber fan-out coupler 109 and multi-core optical waveguide 311D in the optical sensor system 100D may eliminate the need for an optical circulator. Such a design may be advantageous for several reasons. For example, the multi-core fiber fan-out coupler 109 of the optical sensor system 100D may be smaller, lighter, and/or less expensive than an optical circulator, which may permit more flexibility when incorporating the fiber optical sensor 101D into a device or apparatus. In embodiments, other suitable optical couplers configured for coupling single core optical fibers to multi-core optical fibers may take the place of the multi-core fiber fan-out coupler 109.

FIGS. 6G and 6H illustrate an optical sensor system for use with a fiber optical sensor according to embodiments herein. FIG. 6H illustrates an optical resonator based optical sensor configured for use with a pair of single core optical fibers according to embodiments herein. The optical sensor system 100E of FIG. 6G is configured for use with the dual fiber optical resonator based sensor 101E, as shown in FIG. 6H. In further embodiments, other optical sensors discussed herein, including, for example, interferometer based sensors may be employed in a dual optical fiber based system.

The fiber optical sensor 101E may include a fiber end sensor having an optical resonator based acoustic sensor as described herein. The fiber optical sensor 101E may include a sensor fiber 301E having an optical resonator based fiber-end sensor structure 321D disposed at an end thereof. Except where noted, the sensor fiber 301E may include features and structures consistent with those of sensor fibers 301 and 351.

The fiber optical sensor 101E may include a dual optical fiber structure. The fiber optical sensor 101E may include a first optical waveguide 311E having a first fiber optical core 313E and a second optical waveguide 315E having a second fiber optical core 312E. Each of the first optical waveguide 311E and the second optical waveguide 315E may be individual optical fibers and may each have a separate cladding structure 314E. The first optical waveguide 311E and the second optical waveguide 315E may be coupled together. For example, the first optical waveguide 311E and the second optical waveguide 315E may be coupled via glue or other adhesive.

The optical resonator based fiber-end sensor structure 321E is coupled to the end of both the first optical waveguide 311E and the second optical waveguide 315E. The optical resonator based fiber-end sensor structure 321E may include an optical resonator sensor 322E, in addition to additional structures and components configured to facilitate the functionality of the optical resonator sensor 322E, as described below. The optical resonator based fiber-end sensor 322E, schematically illustrated in FIG. 6H, may be waveguide-coupled such that it is configured for receiving an initial optical signal 111 (e.g., light) supplied to it via a first optical core 313E of the first optical waveguide 311E and providing a returned optical signal 112 back along a second optical core 312E of the second optical waveguide 315E. The returned optical signal 112 may correspond to and represent an acoustic signal incident upon the optical resonator based fiber-end sensor structure 321E. The incident acoustic signal may cause physical deformation and/or material property alteration of the optical resonator based fiber-end sensor structure 321E. Accordingly, an optical signal provided along the second optical core 312E by the optical resonator based fiber-end sensor structure 321E may be altered by, influenced by, or otherwise indicative or representative of the acoustic signal and therefore may be used to characterize the incident acoustic signal. In the embodiment of FIG. 6G, it is not necessary to provide the initial optical signal 111 to the light reception device 103 to measure the optical characteristic alterations, for example, because the parameters of the initial optical signal 111 are known by the system.

The optical resonator based fiber-end sensor structure 321E may include an acoustically responsive polymer portion 317E including parylene or other suitable polymer that is sensitive to acoustic signals. The acoustic impedance of the polymer portion 317E may be selected to match (e.g., within 1%, 5%, 10%, or 20%) of the acoustic impedance of an encapsulating structure (or cladding structure) of the sensor fiber 301E to enhance the sensitivity of the optical resonator based fiber-end sensor structure 321E, as described above.

The optical sensor system 100E is configured for use with the resonator based fiber optical sensor 101E. The optical sensor system 100D may include a light source 104, such as a laser, a light reception device 103, such as a photodetector, one or more optical waveguides 105. The one or more optical waveguides 105 may be structurally bound to one another to form the first optical waveguide 311E and the second optical waveguide 315E of the sensor fiber 301E and may be separated to couple with the light source 104 and the light reception device 103. In embodiments, a coupler or other device may be used to facilitate the junction. In operation, the light source 104 supplies the initial light signal 111 to the fiber optical sensor 101E via the optical waveguide 105. The supplied initial optical signal 111 travels to the optical resonator based fiber-end sensor structure 321E via the first optical waveguide 311E, where it may be affected by an incident acoustic signal, and then is returned by the second optical waveguide 315E as a returned optical signal 112. The returned optical signal 112 travels via the optical waveguides 105 to be received at light reception device 103. As discussed above, acoustic signals incident on the fiber optical sensor 101E alter the optical characteristics (including the physical structure as well as the optical material properties) of the fiber optical sensor 101E. Such optical characteristic alterations may be measured from the returned optical signal 112.

The dual fiber design of the sensor fiber 301E eliminates the need for a circulator or a multi-core fan-out coupler. Such a design may be advantageous for several reasons. For example, eliminating a multi-core fiber fan-out coupler and an optical circulator may provide a smaller, lighter, and/or less expensive system, which may permit more flexibility when incorporating the fiber optical sensor 101E into a device or apparatus.

Figure 7A:
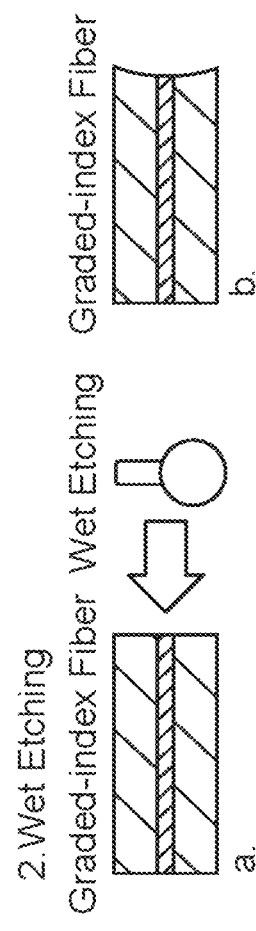
FIG. 7A-FIG. 7D provide examples of manufacturing techniques that may be used to shape or machine an end of an optical waveguide.
Figure 7B:
Figure 7C:
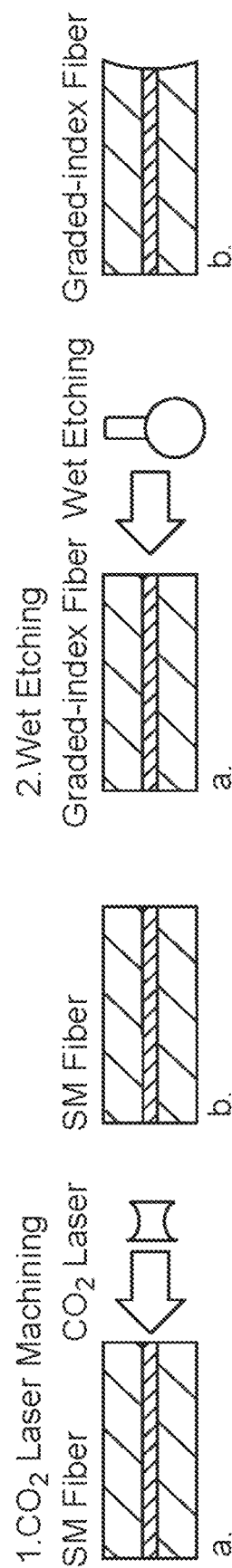
Figure 7D:
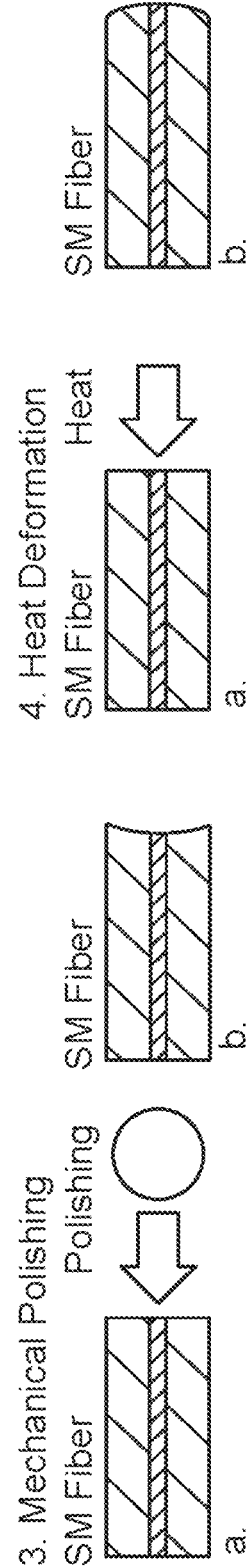

FIG. 7A-FIG. 7D provide examples of manufacturing techniques that may be used to shape or machine an end of an optical waveguide. FIG. 7A illustrates a method of $CO_2$ laser machining of an end of an optical waveguide to achieve a concave, for example, to accommodate a proximal reflective surface that is concave with respect to an optical cavity. FIG. 7B illustrates a method of wet etching an end of an optical waveguide to achieve a concave, for example, to accommodate a proximal reflective surface that is concave with respect to an optical cavity. FIG. 7C illustrates a method of mechanical polishing of an end of an optical waveguide to achieve a concave, for example, to accommodate a proximal reflective surface that is concave with respect to an optical cavity. FIG. 7D illustrates a method of $CO_2$ laser machining of an end of an optical waveguide to achieve a concave, for example, to accommodate a proximal reflective surface that is concave with respect to an optical cavity.

Figure 8A:
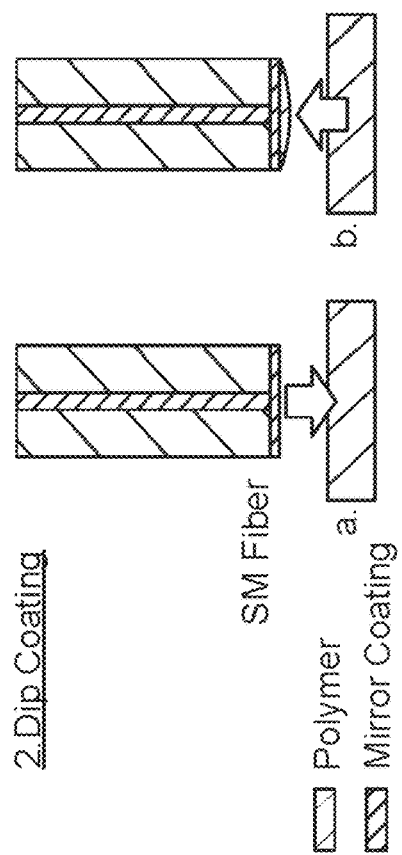
FIG. 8A-FIG. 8D provide examples of manufacturing techniques that may be used to manufacture an optical resonator structure at an end of an optical waveguide.
Figure 8B:
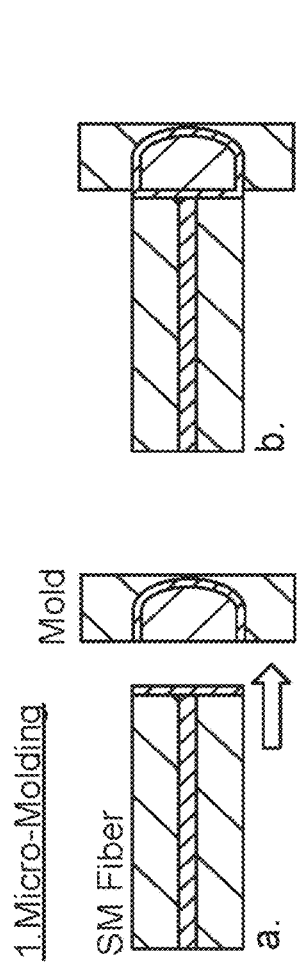
Figure 8C:
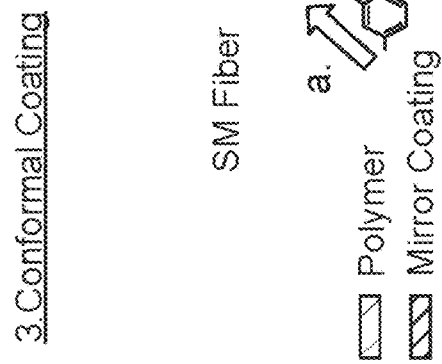
Figure 8D:
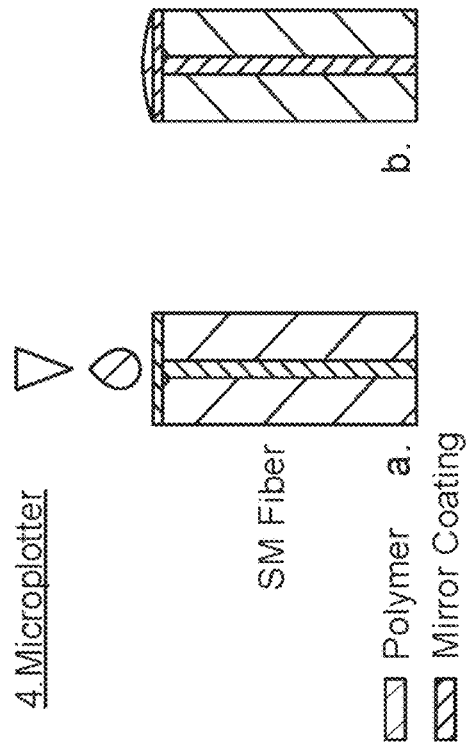

FIG. 8A-FIG. 8D provide examples of manufacturing techniques that may be used to manufacture an optical resonator structure at an end of an optical waveguide. FIG. 8A illustrates a method of micro-molding that may be used to form an optical resonator structure. FIG. 8B illustrates a method of dip-coating that may be used to form an optical resonator structure. FIG. 8C illustrates a method of conformal coating that may be used to form an optical resonator structure. FIG. 8D illustrates a method of dip-coating that may be used to form an optical resonator structure.

Figure 9A:
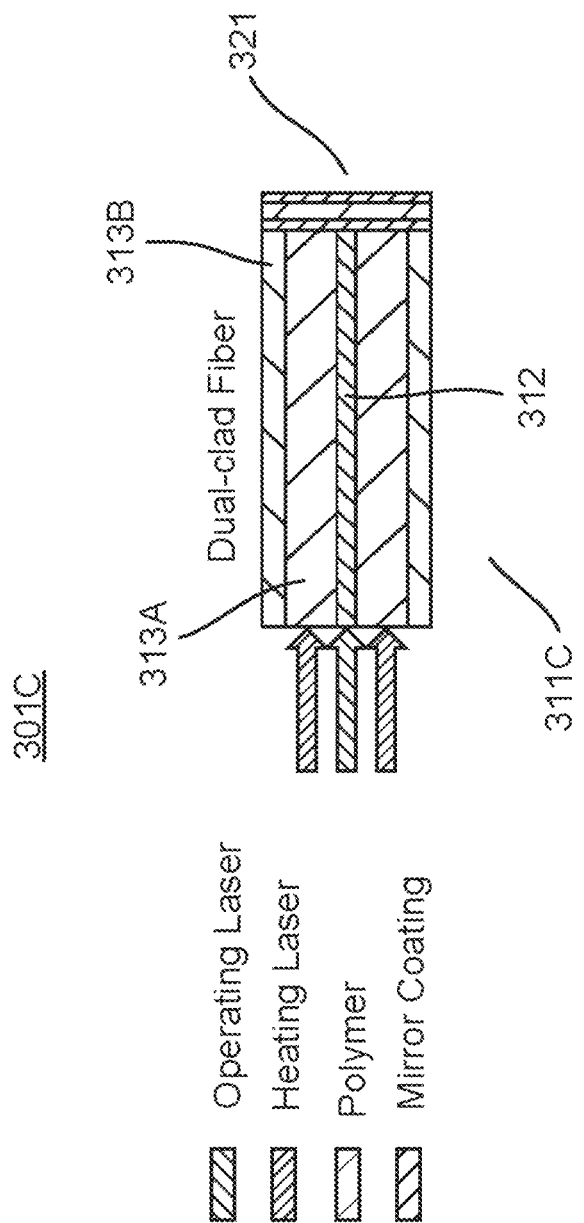
FIGS. 9A-9B illustrate a method of thermal tuning applied to a sensor fiber.

FIG. 9A illustrates a method of thermal tuning applied to a sensor fiber. An interferometer-based fiber sensor (or other optical sensor structure consistent with embodiments hereof) may benefit from a wavelength tuning mechanism to maintain the interferometer-based fiber sensor at an optimum operational point. An optimum operational point may be based on a resonance of the optical sensor structure. In embodiments, the resonance wavelength of the optical sensor structure and the operational wavelength of a laser providing an optical signal may be selected, adjusted, or determined together to optimize or maximize an optical readout. The resonance wavelength of the optical sensor structure and the operational wavelength of the laser may be selected, adjusted, or determined such that the operational wavelength of the laser coincides with a slope of the resonant peak of the optical sensor structure. A specific position on the slope of the resonant peak may vary according to sensor design and application specific requirements. The specific operation position on slope of the resonant peak effects the dynamic range and the sensitivity of the optical sensor structure. In embodiments, an operation position (e.g., wavelength) may be selected so as to have a response amplitude within a range of 10%-90% of a resonance depth, within a range of 10%-30% of a resonance depth, within a range of 30%-50% of a resonance depth, within a range of 50%-70% of a resonance depth, or within a range of 70%-90% of a resonance depth. Accordingly, wavelength tuning according to embodiments hereof may include tuning either the operational wavelength or the laser or the resonance wavelength of the optical sensor to achieve this.

Wavelength tuning mechanism consistent with embodiments hereof may include, for example, a heating or tuning laser or an external tuner configured for tuning via the application of mechanical stress and/or electrothermal heating. While a tunable laser in the back-end system may provide tunability, individual tunability at the sensing front-end (localized tuning) is also desirable, because it may allow (1) a less expensive laser without wavelength tunability and (2) a scalable sensor array with a shared laser. FIG. 9A illustrates one method for localized tuning using photothermal tuning, which does not require extra cabling. In an embodiment, light from an operating laser and a heating laser (at different wavelengths) is guided by the fiber together. The operating laser wavelength may be selected to optimize the sensing performance, and at least one structure on the fiber end (e.g. optical resonator structure 321, part of the encapsulating structure 314 etc. is absorptive at the heating wavelength. By tuning the power of the heating laser light, the local temperature in the optical resonator structure 321 is changed and therefore the temperature sensitive optical transmissivity of the fiber optical sensor is tuned so as to better coincide with the wavelength of the operating laser. Accordingly, the heating laser is operated to adjust the temperature of the optical resonator structure 321 according to the wavelength of the operating laser. The heating laser may be either continuous-wave or pulse-width-modulated. In an embodiment, a sensor fiber 301C may have a dual clad structure. Any of the sensor fibers 301/301A/301B may incorporate the features of sensor fiber 301C. The sensor fiber 301C may include an inner cladding structure 313A and an outer cladding structure 313B. The outer cladding structure 313B may be introduced if the heating wavelength is longer than the cut-off wavelength of the core, which is optimized for operating light transmission.

Figure 9B:
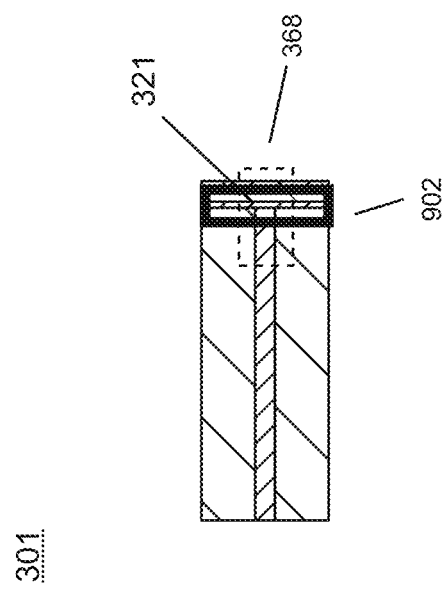

In another localized tuning method, illustrated in FIG. 9B, an external tuner 902 may be provided to replace the heating laser for tuning the sensor transmission through application of, for example, mechanical stress or electrothermal heating. FIG. 9B illustrates sensor fiber 301 having an optical resonator structure 321 by way of example. Any suitable sensor fiber and fiber optical sensor may be used with the external tuner 902. The external tuner 902 may include, for example, a piezoelectric and/or an electrothermal element external to the optical cavity that may be configured to apply pressure (i.e., squeeze) or heat to the optical resonator structure 321. This may require additional electrical cabling, wires, traces, and/or a microheater printed flex circuit along the length of the fiber sensor to enable the external tuners. The extra structures do not affect the optical properties of the sensor as long as the sensor optical path (within dashed frame 368) in the optical resonator structure 321 is not interrupted.

In a further example the optical resonator structure 361 may have an operational wavelength adjusted to more closely align with the wavelength of a light source (e.g., source laser). When multiple fiber optical sensors are arranged in an array, the capability to individually calibrate and fine tune each fiber optical sensor within the array offers the potential to drive and synchronize the operations of each sensor in an array. This synchronization may also empower a user to drive multiple (≥2) fiber optical sensors with one source laser and capture signals from multiple sensors simultaneously. Such a feature is advantageous in constructing a sensor array for imaging. In this process, a feedback loop may be employed to monitor and adjust the heat source or stress to fine tune the operation wavelength of the sensor to ensure its alignment with the source laser. Through simultaneous capture of multiple data points or the collaborative analysis of sophisticated imaging patterns, the synchronized operation of the sensor arrays warrants robust data interpretation.

Figure 10:
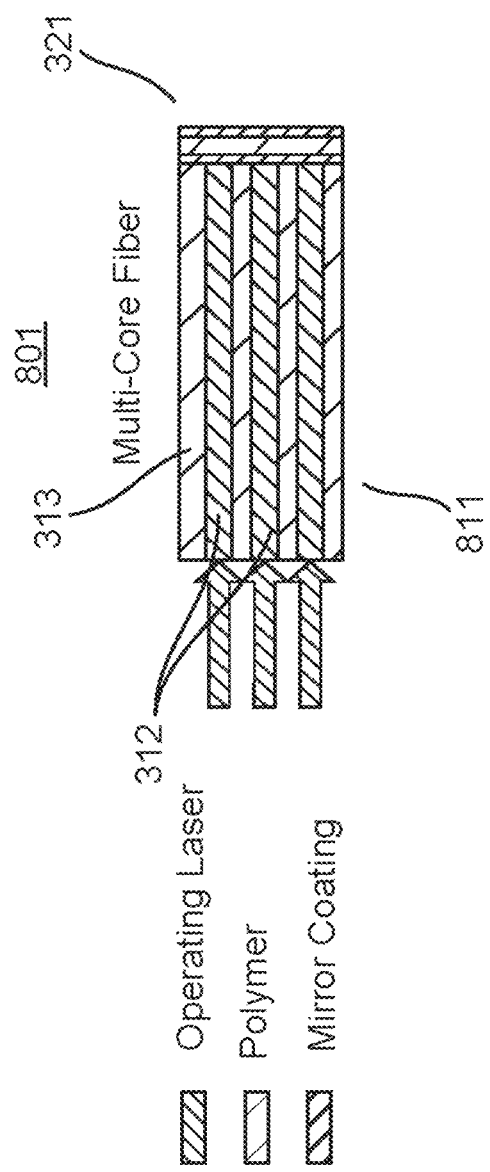
FIG. 10 illustrates an embodiment of a sensor fiber including a multi-core optical waveguide.

FIG. 10 illustrates an embodiment of a sensor fiber including a multi-core optical waveguide. The sensor fiber 801 may include any or all of the features of sensor fibers 301 and 351, as described above. The sensor fiber 801 may include an optical waveguide 811 and an optical resonator structure 321. The optical waveguide 811 includes a plurality of cores 312, for example, 2, 3, 4, 5, 6, 7, 8, 9, etc., within the cladding structure 313.

FIG. 11A and FIG. 11B illustrate a comparison between sensor fibers arranged with a forward-facing optical sensor and a side facing optical sensor. Consideration of the environment in which the sensor will be used and the direction of the transmitted acoustic beams is an important consideration when incorporating the sensor with the device. For example, some use cases of optical sensors disclosed herein may benefit from a forward-facing arrangement while other use-cases may benefit from a side-facing arrangement.

FIG. 11A illustrates the sensor fiber 351 having a Fabry-Perot resonator functioning as an optical resonator as part of an optical resonator structure, consistent with that shown in FIG. 3A. The optical resonator structure 361 is disposed in a forward facing configuration. In a forward facing configuration, a face(s) or surface(s) of the optical resonator structure 361 that is configured to receive and detect acoustic signals (in optical resonator 362, this face may be the distal reflecting surface 364 or the proximal reflecting surface 363) is arranged such that that the acoustically responsive face(s) or surface(s) is oriented in the same direction as the sensor fiber 351 extends. The sensor fiber 351 and the acoustically responsive surface(s) or face(s) may share an axis.

FIG. 11B illustrates a sensor fiber 1001 having a Fabry-Perot resonator functioning as an optical resonator as part of an optical resonator structure 1021 arranged for side facing capture of incident acoustic signals. The sensor fiber 1001 may include all of the features (even if not illustrated) of sensor fibers 301, 351, 701, and 801. The sensor fiber 1001 may include one or more cores 1012, one or more cladding structures 1013, an encapsulating structure 1014, and an optical resonant structure 1021. The optical resonant structure 1021 may include a Fabry-Perot resonator, as illustrated in FIG. 11B, and/or any other type of optical resonator discussed herein. The optical resonant structure 1021 may include a distal reflecting surface 1064 and a proximal reflecting surface 1063 arranged at either side of an optical cavity 1065. In an embodiment, the optical resonant structure 1021 is configured in a sideways facing configuration. In a sideways facing configuration, an acoustically responsive face or surface of the optical resonator structure 1021 is configured to receive and detect acoustic signals (in optical resonator 362, this face may be the distal reflecting surface 364 or the proximal reflecting surface) is arranged such that that the acoustically responsive face(s) or surface(s) is oriented in the same direction as the sensor fiber 351 extends. The sensor fiber 351 and the acoustically responsive surface(s) or face(s) may have an axis that is substantially perpendicular to an axis of the sensor fiber 1001. In further embodiments, an angle between an axis of the acoustically responsive surface(s) or face(s) and the axis of the sensor fiber 1001 may be between 0° and 90°, depending upon a desired angle of acoustic sensitivity.

Figure 12:
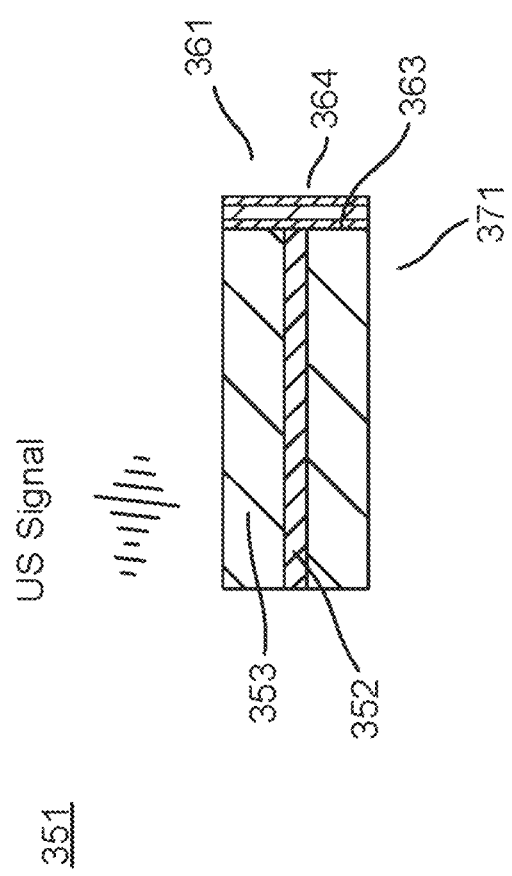
FIG. 12 illustrates an embodiment of a sensor fiber providing backwards looking acoustic detection capabilities consistent with embodiments hereof.

FIG. 12 illustrates an embodiment of a sensor fiber providing acoustic detection capabilities from a direction behind the distal end of the sensor, or proximal detection capabilities and consistent with embodiments hereof. Sensor fibers described herein, such as sensor fiber 301, sensor fiber 351, sensor fiber 701, sensor fiber 801, may be provided with increased proximal detection capabilities. FIG. 12 illustrates sensor fiber 351, having an optical resonator structure 361 having a proximal reflecting surface 363 and a distal reflecting surface 364 arranged to share an axis with the optical waveguide 371. Both the proximal reflecting surface 363 and the distal reflecting surface 364 operate as acoustically responsive surfaces. To increase backwards looking capabilities, the cladding structure 353 may include a material selected to minimize acoustic impedance mismatch with an intended medium within which the sensor fiber 351 is to be used. By minimizing the acoustic impedance mismatch, the critical angle of the boundary between the sensor fiber 351 and the medium in which it is disposed is increased, permitting the optical resonator structure 361 to receive acoustic signals from a greater range of angles. For example, a sensor fiber 351 intended for use within the human body may be include a cladding structure 353 comprising a polymer selected to optimize the detection sensitivity by minimizing any acoustic impedance mismatch. In embodiments, the cladding structure 353 may be selected to have at least one of a Young's modulus (E) smaller than that of the core 352, a photo-elastic coefficient larger than that of the core 352, and a refractive index smaller (n) than that of the core 352. In embodiments, the cladding structure 353 may include benzocyclobutene (BCB) or Polydimethylsiloxane (PDMS), each of which has a small Young's modulus (E), a high photo-elastic coefficient, and a small refractive index (n). Reducing acoustic impedance mismatch serves to increase the acoustic signal that penetrates the cladding structure 353 and strikes the proximal reflecting surface 363. A smaller Young's modulus may increase stress related deformation of the cladding structure 353, which may increase the sensitivity to incident acoustic signals. A higher photo-elastic coefficient may also result in greater sensitivity to acoustic signals, as the optical properties of such material exhibit larger-strain related changes. Further suitable materials for the cladding structure 353 may include ultrasonic enhancement materials such as polyvinylidene fluoride, parylene, polystyrene, and/or the like.

Figure 13:
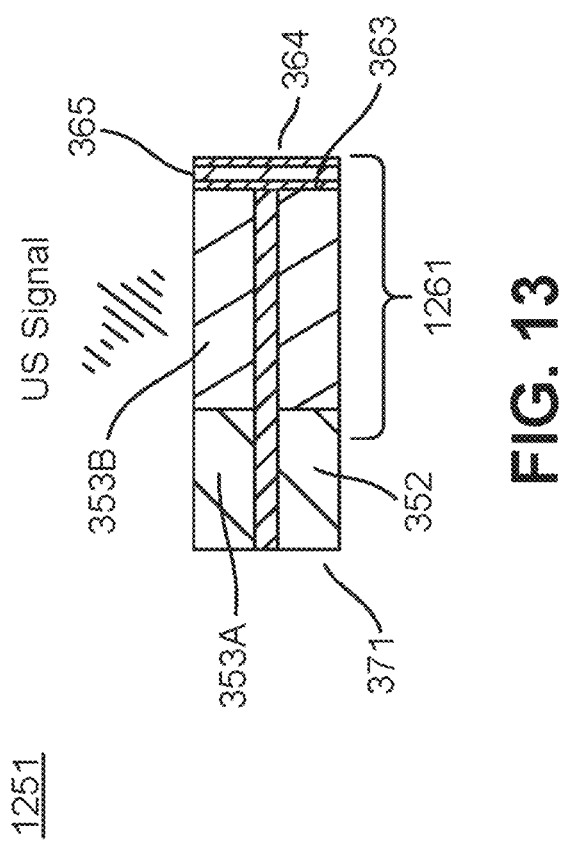
FIG. 13 illustrates an embodiment of a sensor fiber providing increased backwards looking acoustic detection capabilities consistent with embodiments hereof.

FIG. 13 illustrates an embodiment of a sensor fiber providing increased backwards looking acoustic detection capabilities consistent with embodiments hereof. Sensor fibers described herein, such as sensor fiber 301, sensor fiber 351, sensor fiber 701, sensor fiber 801, may be provided with increased backwards looking detection capabilities as shown in FIG. 13. FIG. 13 illustrates sensor fiber 1251, having an optical resonator structure 1261. The optical resonator structure 1261 includes an optical resonator defined by a proximal reflecting surface 363 and a distal reflecting surface 364 arranged to share an axis with the optical waveguide 371 (e.g., the optical resonator is disposed in the same fashion as the forward facing configuration described above). An optical cavity 365 is arranged between the proximal reflecting surface 363 and the distal reflecting surface 364. Both the proximal reflecting surface 363 and the distal reflecting surface 364 operate as acoustically responsive surfaces. The optical resonator structure 1261 may further include any features of optical resonators and optical resonator structures discussed herein in any suitable combination. To increase backwards looking capabilities, the optical resonator structure 1261 may include a distal portion of the optical waveguide 371, specifically structured to increase acoustic sensitivity at the proximal reflecting surface 363. The optical resonator structure 1261 may include the cladding structure of the distal end of the optical waveguide 371, which may include a proximal cladding structure portion 353A and a distal cladding structure portion 353B. The distal cladding structure portion 353B is disposed closer to the optical resonator. The distal cladding structure portion 353B may be selected so as to have a material that reduces or minimizes acoustic impedance mismatch with an intended medium within which the sensor fiber 1251 is to be used. For example, the distal cladding structure 353B may include a polymer, as discussed above. In embodiments, the distal cladding structure 353B may include benzocyclobutene (BCB) or Polydimethylsiloxane (PDMS), each of which has a small Young's modulus (E), a high photo-elastic coefficient, and a smaller refractive index (n). The distal cladding structure 353B may have a length dimension sufficient to permit acoustic signals from backwards looking angles to reach the proximal reflecting surface 363 of the optical resonator. The proximal cladding structure portion 353A may include any suitable material for optical waveguides, including, for example silica.

Figure 14:
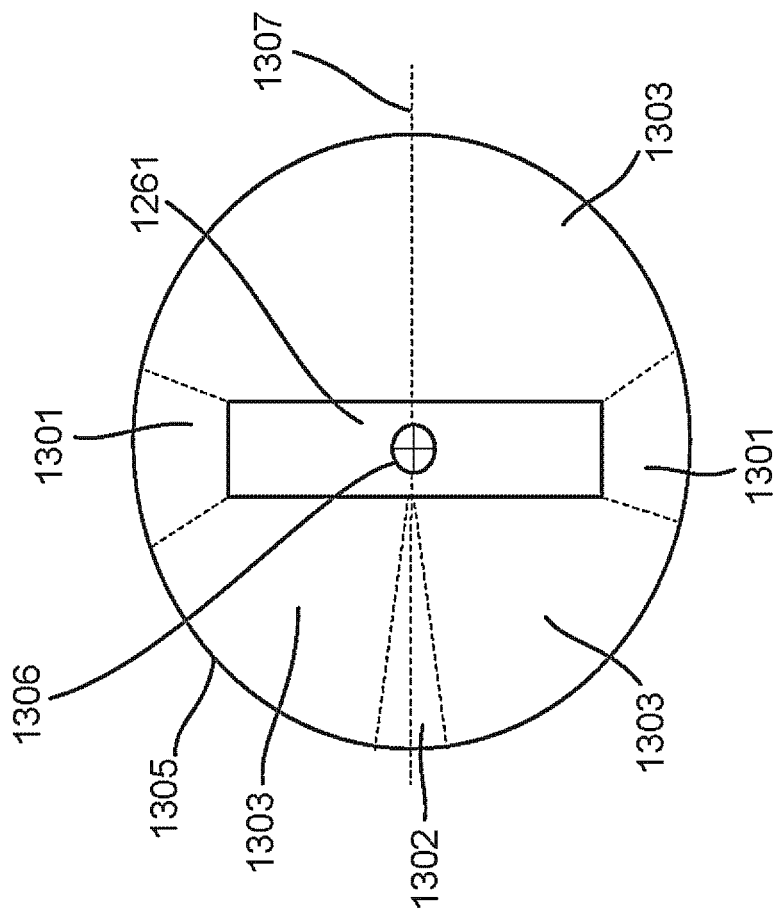
FIG. 14 illustrates a directional range of optical resonant structures consistent with embodiments hereof.

FIG. 14 illustrates a directional range of optical resonant structures consistent with embodiments hereof. As discussed above, the optical resonator structure 1261 may be configured to detect acoustic signals at a broad range of incidence. In embodiments, the optical resonator structure 1261 may be configured to detect acoustic signals across a directional range of at least 180 degrees, at least 270 degrees, at least 300 degrees, or at least 330 degrees. In some embodiments, the optical resonator structure 1261 may be configured to detect acoustic signals in an omni-directional fashion, e.g., across a range of 360 degrees. FIG. 14 illustrates a side view of an optical resonator structure 361 consistent with embodiments hereof. The circle 1305 represents a 360 range around the optical resonator structure 1261 and has an axis 1306 substantially perpendicular to an axis 1307 of the optical resonator structure 1261. The circle 1305 represents the 360 range from which acoustic signals may be incident upon the optical resonator structure 1261. The optical resonator structure 1261 may be configured to detect acoustic signals in the acoustically responsive portions 1303 of the circle 1305 and may have reduced sensitivity or detection ability in the portions of reduced acoustic sensitivity, including lateral portions 1301 and core portion 1302. In the lateral portions 1301, incident acoustic signals may be less detectable due to their oblique angle of incident upon the reflecting surfaces of the optical resonator. In the core portion 1302, acoustic signals may be less detectable due to blockage from the core of the optical waveguide. The sum of the ranges of the acoustically responsive portions 1303 may represent the range over which the optical resonator structure 1261 detects acoustic signals. Different arrangements of optical resonator structures (e.g., the side facing optical resonator structure 1021) may have different arrangements of acoustically responsive portions 1303 and portions of reduced acoustic sensitivity.

In embodiments, the optical resonator structure 361 is radially symmetric. Accordingly, the acoustically responsive range defined by the two dimensional circle 1305 may be rotated around the axis 1307 to define a three dimensional acoustically responsive range of the optical resonator structure 1261. It will be understood that further effects on the acoustically responsive range may be caused by structures around the optical resonator structure 1261, including, for example, a medical device distal end 231.

Figure 15:
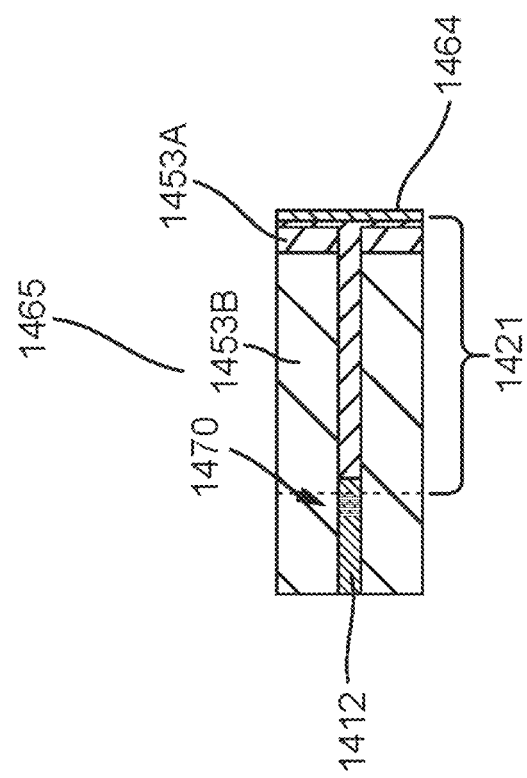
FIG. 15 illustrates an optical resonator structure including an in fiber Bragg grating consistent with embodiments hereof.

FIG. 15 illustrates an optical resonator structure including an in-fiber Bragg grating consistent with embodiments hereof. The optical resonator structure 1421 may be provided in combination with any of the sensor fibers discussed herein. The optical resonator structure 1421 includes a distal reflecting surface 1464, an elongated optical cavity 1465 comprising a distal cladding structure 1453A, and a proximal cladding structure 1453B, and a Bragg grating 1470. As in the optical resonator structure 1261, the distal cladding structure 1453A may include a polymer (e.g., benzocyclobutene (BCB) or Polydimethylsiloxane (PDMS)) while the proximal cladding structure 1453B may include, for example, silica glass. The proximal cladding structure 1453B may be greater in length than the distal cladding structure 1453A, for example, more than 2×, more than 5×, more than 10×, etc. In an embodiment, the proximal cladding structure 1453B may be approximately 10 times the length of the distal cladding structure 1453A, e.g., the distal cladding structure may be approximately 10 microns in length while the proximal cladding structure is approximately 100 microns in length. In embodiments, the proximal cladding structure 1453B may have a Young's modulus in the range of 60-80 GPa while the distal cladding structure 1453A has a Young's modulus in the range of 0.8-1.2 GPa. In embodiments, the proximal cladding structure 1453B may have photo-elastic coefficients $C1=-6*10^{-13}$ 1/Pa and $C2=-4.2*10^{-12}$ 1/Pa while the distal cladding structure 1453A has photo-elastic coefficients $C1=-4.8*10^{-11}$ 1/Pa and $C2=-2.9*10^{-11}$ 1/Pa. While these numbers are provided, such photo-elastic coefficients are a relative number depending on the material selected. For the distal end, a material with larger C1 or C2 values is preferable to optimize the acoustic sensitivity. The Bragg grating 1470 is integrated within the structure of the core 1412 and defines variations in the refractive index of the core 1412, thereby producing a structure that may reflect light of specific wavelengths. The optical resonator structure 1421 operates as a hybrid Fabry-Perot resonator. In this configuration, the distal cladding structure 1453A (e.g., the polymer structure) provides the major response of the acoustic signal. The distal cladding structure 1453A may be directly fabricated via two-photon-polymerization (TPP) 3D printing on the top of the fiber with an in-fiber Bragg grating reflector. One advantage of the hybrid optical resonator structure 1421 is the combination of broad bandwidth and high sensitivity. In some designs, there is a trade-off between broad bandwidth and high sensitivity. In this hybrid configuration, the total length of the elongated optical cavity 1465 is longer because it is the sum of the distal cladding structure 1453A and the proximal cladding structure 1453B. With a longer cavity length, in regular design, the frequency bandwidth response may be narrower. However, in this hybrid configuration, since the major response of the FPI sensor is coming from the polymer region, the effective sensor thickness is still very small and provides a broadband response.

Figure 16:
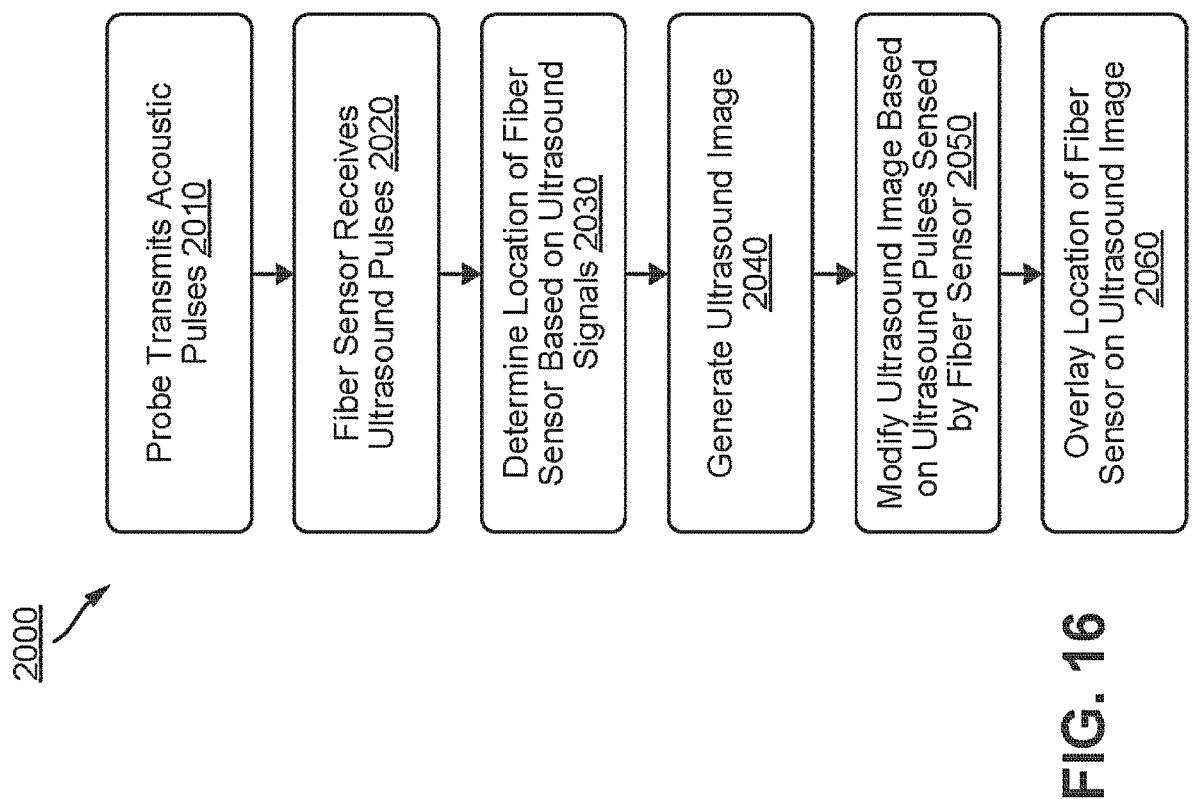
FIG. 16 illustrates a method of operating a fiber based optical sensor consistent with embodiments hereof.

FIG. 16 illustrates steps in a method of generating location and imaging information by a fiber based optical sensor. More details can be found in co-pending application U.S. Provisional No. 63/522,994, titled Transponder Tracking and Ultrasound Image Enhancement, filed the Jun. 23, 2023 and U.S. patent application Ser. No. 18/382,984 titled Transponder Tracking and Ultrasound Image Enhancement filed concurrently on Oct. 23, 2023.

The method 2000 may include block 2010, wherein the transponder, for example, the acoustic probe 245 shown in FIG. 2, transmits acoustic pulses into the medium. The transponder may transmit these pulses using a variety of known methods or as described above.

At block 2020, the fiber optical sensor 101 receives the ultrasound pulses transmitted from probe 245 and/or scattered signals or tissue harmonics. The fiber optical sensor 101 then converts the ultrasound pulses, scattered signals and/or tissue harmonics to signals that are then transmitted to the processing unit 209.

At block 2030, the processing unit 209 determines the location of the fiber sensor based at least in part on the signals received from the probe 245. For example, the processing unit 209 may utilize triangulation or coherent image formation to determine the position of the medical device distal end based on a plurality of signals received from the probe 100 and fiber optical sensor 101.

At block 2040, the processing unit 209 and image reconstruction unit 206 generates an ultrasound image based on signals returned to the probe 245 and/or scattered signals and tissue harmonics sensed by the fiber sensor. The ultrasound image may be transmitted to and displayed on the display.

At block 2050 the processing system modifies the ultrasound image based on the ultrasound pulses received from the fiber optical sensor 101. In embodiments, the processing system may also produce and display the ultrasound image based on the ultrasound pulses received by the fiber optical sensor without information from the ultrasound pulses receive by probe 245.

At block 2060, the processing system 200 overlays the location of the fiber optical sensor 101 over the ultrasound image. Thus, when viewed by a user, such as an ultrasound technician, physician, other medical personnel, or patient, the fiber optical sensor 101 on the medical device distal end are shown on the same display as the ultrasound image, indicating where in the medium, the fiber optical sensor 101 on the medical device distal end is located.

Figure 17A:
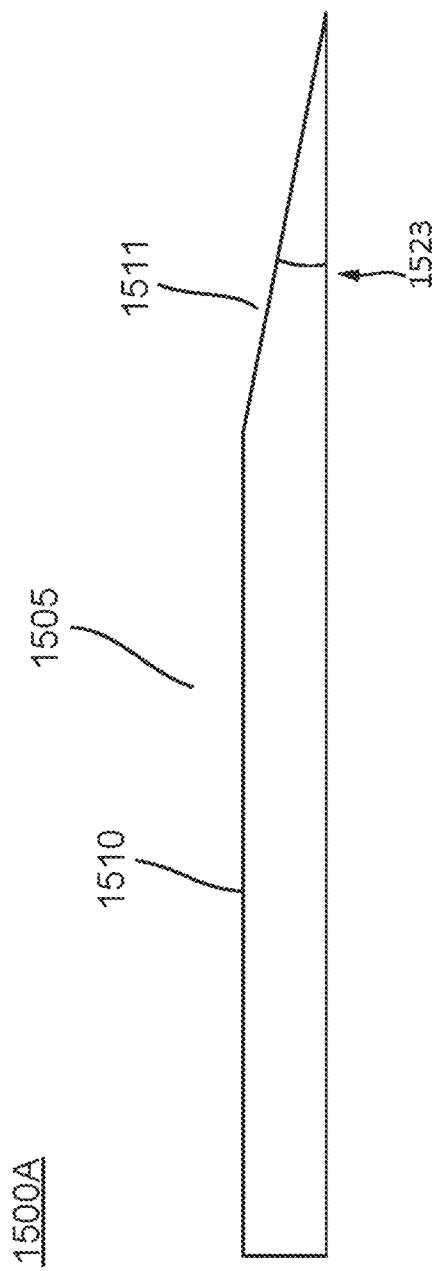
FIGS. 17A-17B illustrate needles configured with a sensor fiber according to embodiments herein.
Figure 17B:
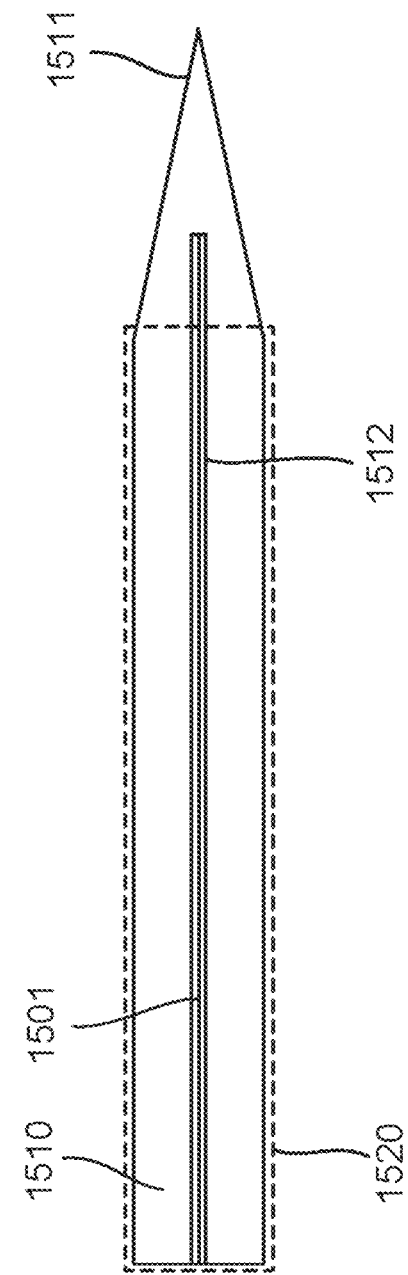

FIGS. 17A and 17B illustrate a needle configured with a sensor fiber according to embodiments herein. The needle 1500A may be an example of a medical device distal end 231 and may include one or more sensor fibers 1501 integrated therewith. The sensor fiber 1501 may include any of the sensor fibers (having any of the optical resonator structures) described herein and/or may include any combination of features of the sensor fibers described herein. The needle 1500A may be any type of needle of any appropriate size or functionality. The needle 1500A comprises a needle body 1505 having a needle shaft portion 1510 and a needle tip portion 1511. The needle tip portion 1511 may be characterized by a needle polishing angle 1523. Further, the needle 1500A includes at least one sensor channel 1512 extending over the needle body 1505 for at least a portion of the length of the needle shaft portion 1510 and the needle tip portion 1511.

In embodiments, the sensor channel 1512 may include a trench, depression, or groove in the needle body 1505. The sensor channel 1512 may be sized and configured to receive a sensor fiber 1501 consistent with embodiments hereof. For example, in embodiments, the sensor channel 1512 may be approximately 125 to 250 microns in width to accommodate a sensor fiber 1501 that is 80 microns in diameter. The needle 1500A may include a plurality of sensor channels 1512 to accommodate multiple sensor fibers 1501. For example, the needle 1500A may include 2, 3, 4, or more sensor channels 1512 accommodating multiple sensor fibers 1501 arranged around a circumference of the needle 1500A. The sensor fiber 1501 is arranged within the sensor channel 1512 such that the distal end, bearing the optical resonator structure, is positioned at or adjacent the distal end. The sensor channel 1512 may be configured with a depth such that the sensor fiber 1501 does not extend beyond the outer surfaces of the needle body 1505.

In further embodiments, a sensor channel may be created by adding material to the outer surface to form the channel, e.g., as a guide. In an example, material may be layered onto the exterior of the needle to create the channel 1512, as raised continuous or intermittent structures. In another example, an adhesive material or tape may be wrapped in a spiral configuration with spaces within the spirals to form the sensor channel or may be selectively positioned along the needle length to form the sensor channel and guide the sensor fiber along the length. In still another example, an extruded needle may include a tubular sensor channel in the form of a lumen running therethrough.

The sensor channel 1512 allows the sensor fiber 1501 to sit within a protected area of the needle body 1505. This serves to protect the sensor fiber 1501 and to create a smooth needle surface for insertion. The sensor channel 1512 may be disposed on an outer surface of the needle body 1505 (as illustrated in FIG. 17B) or on an inner surface of the needle body 1505.

The sensor fiber 1501 may be secured to the needle body 1505. In embodiments, the sensor fiber 1501 may be secured within the sensor channel 1512 by a potting compound, such as Norland-65 glue, Norland 81 glue, MY-132A polymer, MY-133, BIO-133, DC-133 or any other suitable potting compound. The potting compound may be selected according to its acoustic and mechanical properties, for example, the speed of sound, acoustic impedance, thermal conductivity, water proofing, etc. The potting compound may also offer modification of acoustic impedance matching to the surrounding medium in addition to the mechanical fixing and protection of the sensor. The potting compound may be employed over all of or over a portion of the sensor channel 1512. In embodiments, the sensor fiber 1501 may be secured within the sensor channel 1512 by a sheath 1520. The sheath 1520 is configured to wrap around the needle body 1505. The sheath 1520 may mechanically secure the sensor fiber 1501 to the needle body 1505. The sheath may wrap around the needle with the fiber insides the slot, allowing the fiber to be freely floating within the groove/slot. This can allow bending/flexibility of the needle. In embodiments, the sensor fiber 1501 may be secured at least partially by both a sheath 1520 and a potting compound. Such an arrangement may permit relative movement between the sensor fiber 1501 and the needle body 1505, thus providing potential strain relief in the event of needle bending. The needle 1500A may be fabricated of any suitable material, including, for example, medical grade materials including metals such as stainless steel or polymers such as PEEK (Polyetherketone). In embodiments, the needle 1500 may be fabricated via an additive manufacturing technique, such as 3D printing, injection molding or extrusion.

Figure 18A:
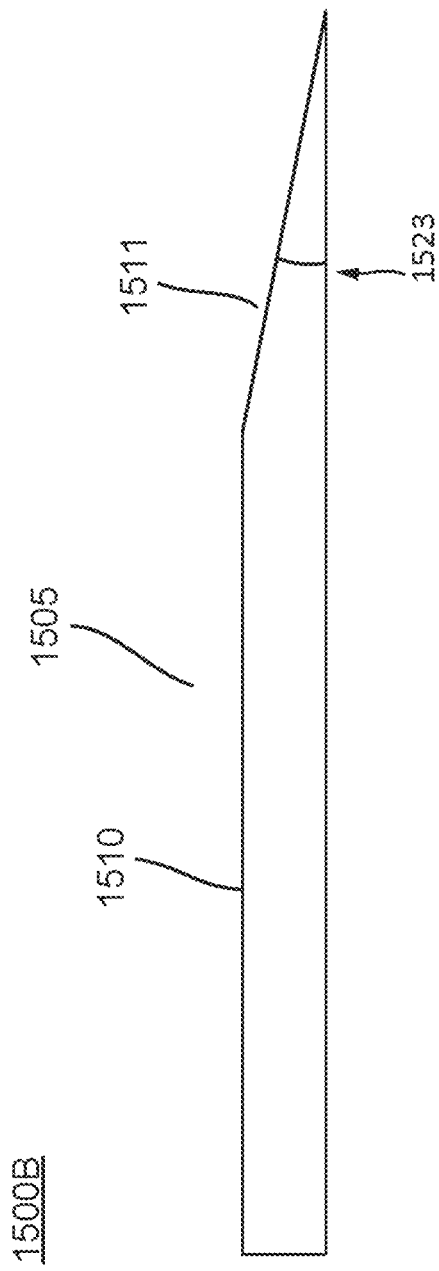
FIGS. 18A-18D illustrate needles configured with a sensor fiber according to embodiments herein.
Figure 18B:
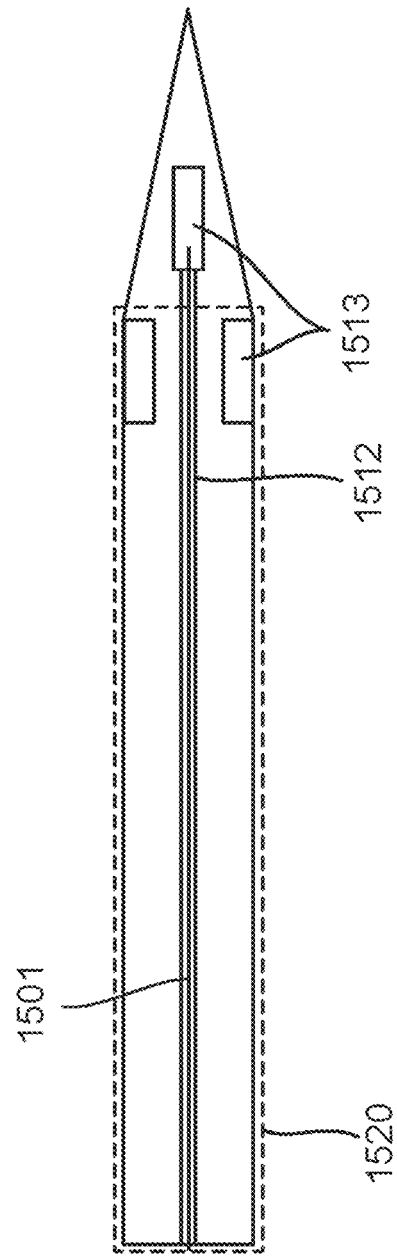

A further embodiment of a needle incorporating a fiber based optical sensor is illustrated in FIGS. 18A and 18B. The needle 1500B may further include one or more windows 1513. The window 1513 is an opening in the needle body 1505 disposed at end of the sensor channel 1512. The needle 1500B may include a plurality of sensor channels 1512 and a corresponding plurality of windows 1513 to accommodate multiple sensor fibers 1501. The sensor fiber 1501 may be arranged within the sensor channel 1512 such that the distal end, bearing an optical sensor, extends into the window 1513. In this embodiment, the distal end of the sensor fiber 1501 may be secured within the window 1513 by a potting compound while the proximal portion of the sensor fiber 1501 may be secured to the needle body 1505 by the sheath 1520. This will permit relative movement between the sensor fiber 1501 and the needle body, thus providing strain relief in the event of needle bending.

The window 1513 allows acoustic signals to reach the fiber optical sensor of the sensor fiber 1501 without blockage by the needle body 1505. The edge of the window 1513 may create boundaries for acoustic signal diffraction and permit the acoustic signals to bend and propagate around the edges of the window to reach the fiber optical sensor at the end of the sensor fiber 1501. The diffraction effect has the function of increasing the circular range of acoustic signal detection of the sensor fiber 1501. Additionally, the edges of the channel on the surface of the needle may also have a diffraction effect that aids in detection of the needle shaft.

In embodiments, an optical ultrasound sensor consistent with embodiments hereof may integrated with a medical device (e.g., at a medical device distal end 231) and may work with an ultrasound source (array) configured in an ex vivo location to provide location information of the medical device distal end 231 and/or to provide a real-time acoustic monitoring at the target/anatomy area of a procedure. In different application scenarios, the incoming acoustic signal direction may be roughly classified into two types, namely (1) transverse fire; and (2) axial fire, as shown in FIGS. 18C and 18D.

Figure 18C:
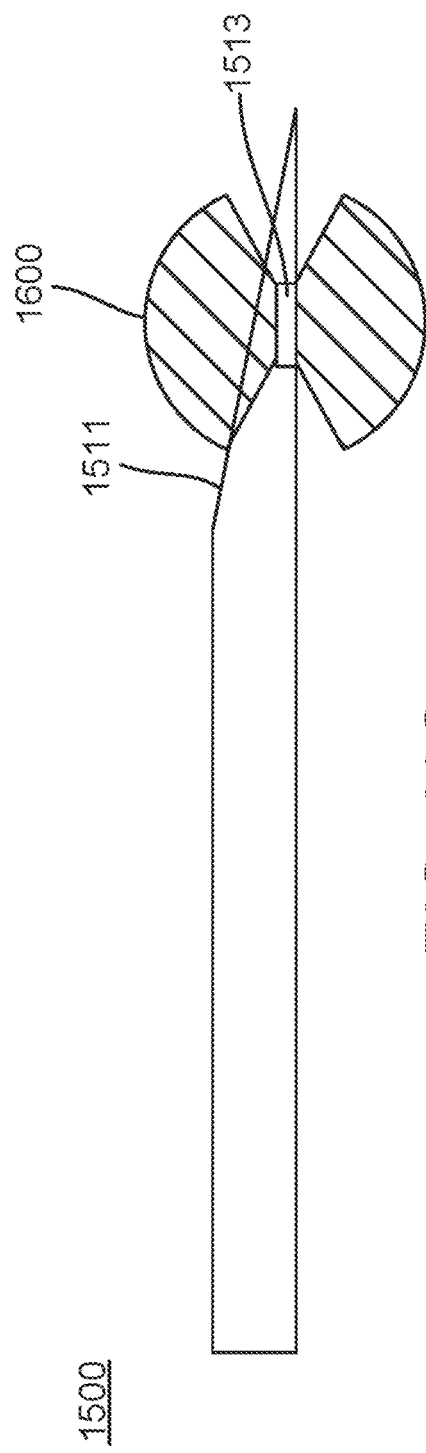
Figure 18D:
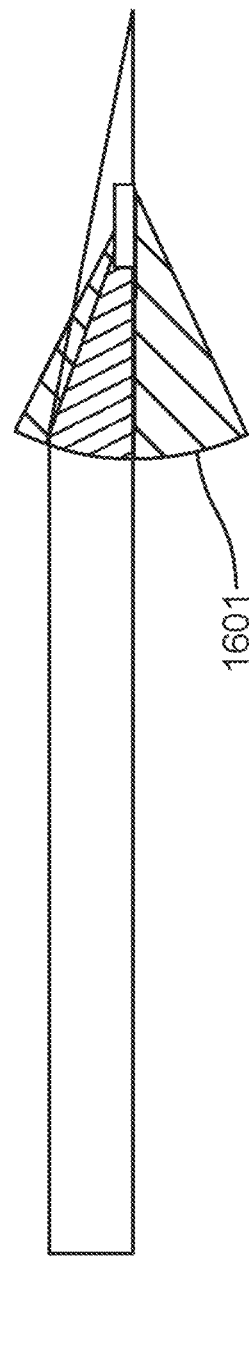

FIGS. 18C and 18D illustrate acoustic signals incident upon a sensor fiber disposed within a needle window 1513. For clarity purposes, the sensor fibers are not shown in these Figures. FIG. 18C illustrates a transverse acoustic signal 1600 while FIG. 18D illustrates an axial acoustic signal.

The transverse acoustic signal 1600 of FIG. 18C is typical of a situation that may occur when using a side-view endoscopic ultrasound transducer or an external transducer. The location of the window 1513 close to the needle tip portion 1511 permits an ultrasound field to reach the window (and fiber end sensor structure located therein) from either side without blockage from an opposite wall of the needle. The fiber end sensor structure itself may be arranged in a side-facing or forward facing fashion and may also be a polarization based sensor configured to receive lateral (transverse) signals, depending on the requirements of the application.

The axial acoustic signal 1601 of FIG. 18D is typical of a situation occurring with respect to a front-view endoscopic ultrasound transducer. Due to the small footprint of an endoscopic device, the typical incident angle may be small with respect to the needle body. As shown in FIG. 18D, when the incident angle is smaller than needle polishing angle 1523 (as shown in FIG. 18D), at least a portion of the acoustic signal 1601 may be blocked by the needle body (shown in thicker crosshatch). To address this, in an embodiment, an additional window 1513 may be included in the needle body 1505 opposite to the sensor window to permit an axial acoustic signal 1601 to pass through and reach the optical resonator structure. In another embodiment, an orientation of the needle 1500A/B may be manipulated to ensure that low angle axial acoustic signals arrive from the portion of the needle where the optical resonator structure is not located. In another embodiment, the polishing angle 1523 may be selected according to expected acoustic angles of incidence.

Figure 19:
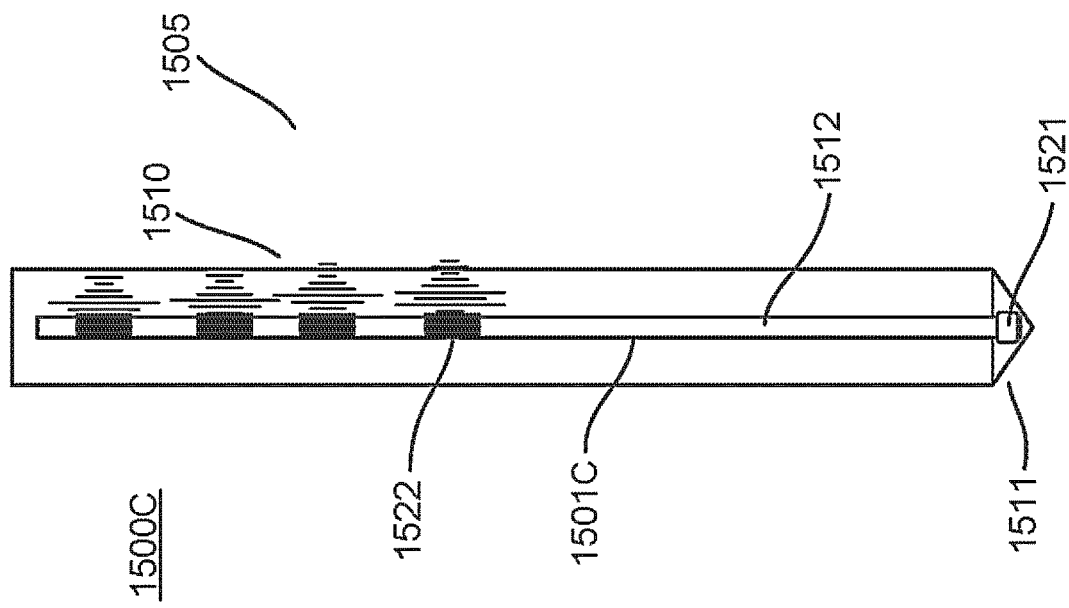
FIG. 19 illustrates acoustic signals incident upon a sensor fiber from a lateral direction.

A further embodiment of a needle incorporating a fiber based optical sensor is illustrated in FIG. 19. Similar to needles 1500A and 1500B, the needle 1500C comprises a needle body 1505 having a needle shaft portion 1510 and a needle tip portion 1511. The needle tip portion 1511 may be characterized by a needle polishing angle. Further, the needle 1500C includes at least one sensor channel 1512 extending over the needle body 1505 for at least a portion of the length of the needle shaft portion 1510 and the needle tip portion 1511. The needle 1500C may include one or more sensor fibers 1501C disposed in one or more sensor channel 1512 thereof. The sensor fibers 1501C may be similar to the sensor fiber 301C and thus may include a fiber end sensor structure 1521 disposed at an end thereof as well as one or more polarization based sensor structures 1522 disposed along a length thereof. The polarization based sensor structures 1522 located along the length of the needle 1500C may provide enhanced visualization of the needle 1500C when acoustic signals used to track or visualize the needle 1500C strike the polarization based sensor structures 1522. Information gathered from the optical signals indicative of the incident acoustic signals may be employed alone and/or in combination with traditional acoustic ultrasound imagery to provide an improved visualization of the needle 1500C. The polarization based sensor structures 1522 may operate according to the principles discussed above with respect to the polarization based sensor structures 322C and with respect to FIGS. 6D and 6DD.

Figure 20B:
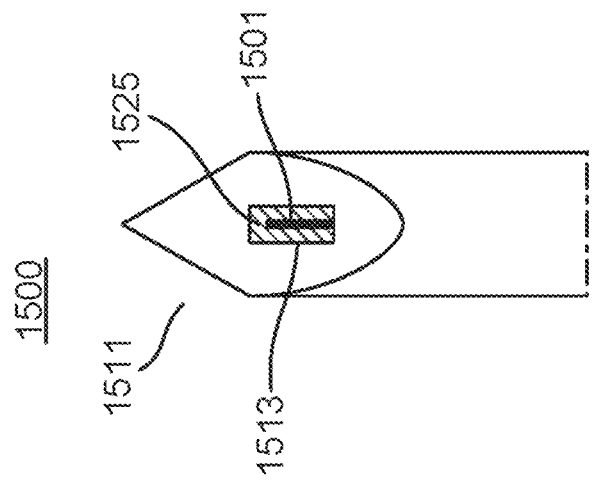
FIGS. 20A-20B provide closeup illustrations of a needle having an integrated sensor fiber consistent with embodiments hereof.
Figure 20A:
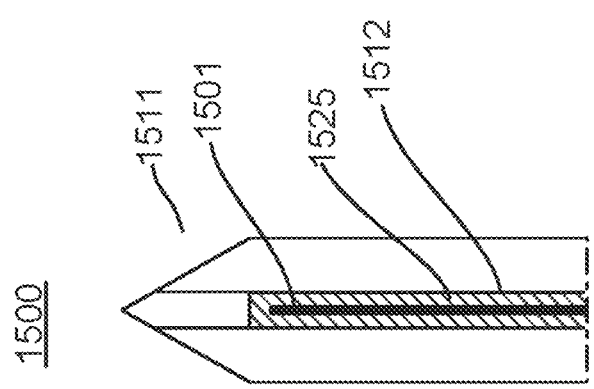

FIG. 20A and FIG. 20B provide further closeup illustrations of the needle 1500 having an integrated sensor fiber 1501. FIG. 20A illustrates a perspective from a first side of the needle 1500 on which the channel 1512 is located and FIG. 20B illustrates a perspective from a second side of the needle 1500 opposite from the first side. The second side of the needle 1500 includes a view of the interior of the needle 1500 at the needle tip portion 1511. As illustrated, the sensor fiber 1501 is disposed within a sensor channel 1512 of the needle 1500 extending from the needle shaft portion 1510 and into the needle tip portion 1511. The window 1513 is disposed within the needle tip portion 1511, thereby ensuring that both sides of the window 1513 (and the sensor fiber 1501 disposed therein) are exposed to incoming acoustic signals. Further, FIGS. 20A-20B illustrate the potting compound 1525 securing the sensor fiber 1501 within the window 1513.

Figure 20C:
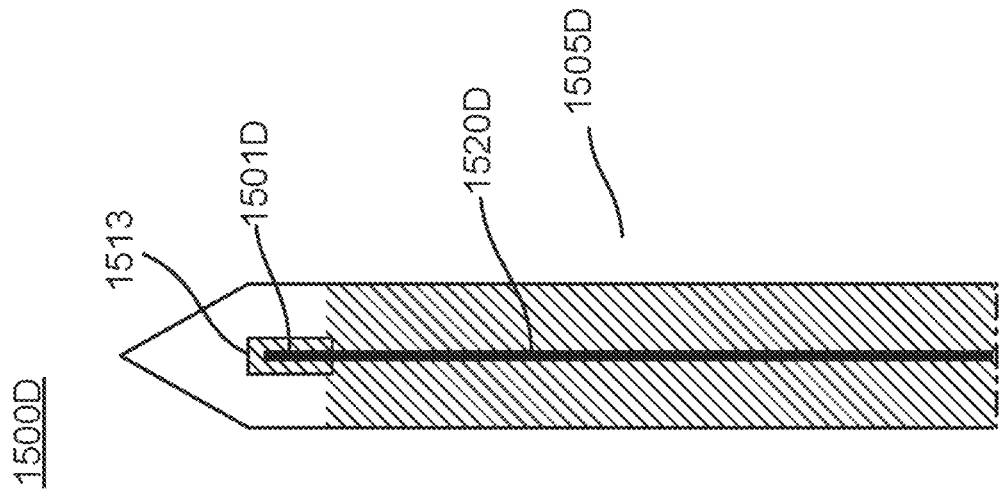
FIGS. 20C-20D illustrate needles having sensor fibers included therein, according to embodiments hereof.
Figure 20D:
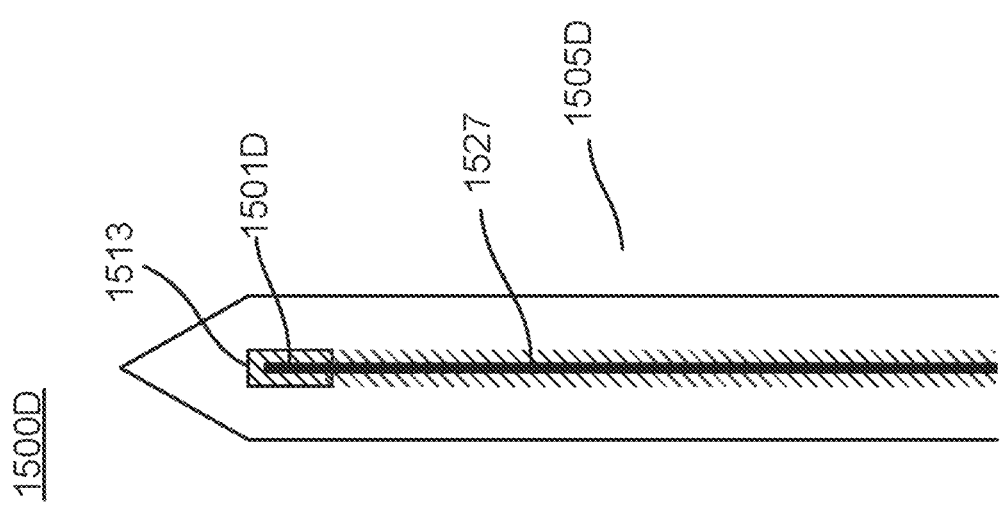

In a further embodiment, shown in FIG. 20C, sensor fiber 1501D may be secured to the surface of the needle body 1505D of needle 1500D without a channel or other fiber receiving structure. A suitable polymer or compound 1527, selected according to its acoustic and mechanical properties, may be used to secure the fiber 1501D to needle 1500D. The suitable polymer or compound 1527 may be selected according to its acoustic and mechanical properties, for example, the speed of sound, acoustic impedance, thermal conductivity, water proofing, etc. The suitable polymer or compound 1527 may also offer modification of acoustic impedance matching to the surrounding medium in addition to the mechanical fixing and protection of the sensor on its surface. Likewise, as shown in FIG. 20D, a sheath 1520D may be used to secure the sensor fiber to the needle body 1505D. The sheath 1520D is configured to wrap around the needle body 1505D. The sheath 1520D may mechanically secure the sensor fiber 1501D to the needle body 1505D. The sheath may wrap around the needle in a manner that allows some movement of the fiber to be within the sheath. This can allow bending/flexibility of the needle. In embodiments, the sensor fiber 1501D may be secured at least partially by both a sheath 1520D and a polymer or compound 1527. Such an arrangement may permit relative movement between the sensor fiber 1501D and the needle body 1505D, thus providing potential strain relief in the event of needle bending. This embodiment may further include a window in the manner of the other embodiments incorporating a window, A potting compound or polymer may be used to further secure the fiber located within the window in the manner of the earlier embodiments.

Figure 21:
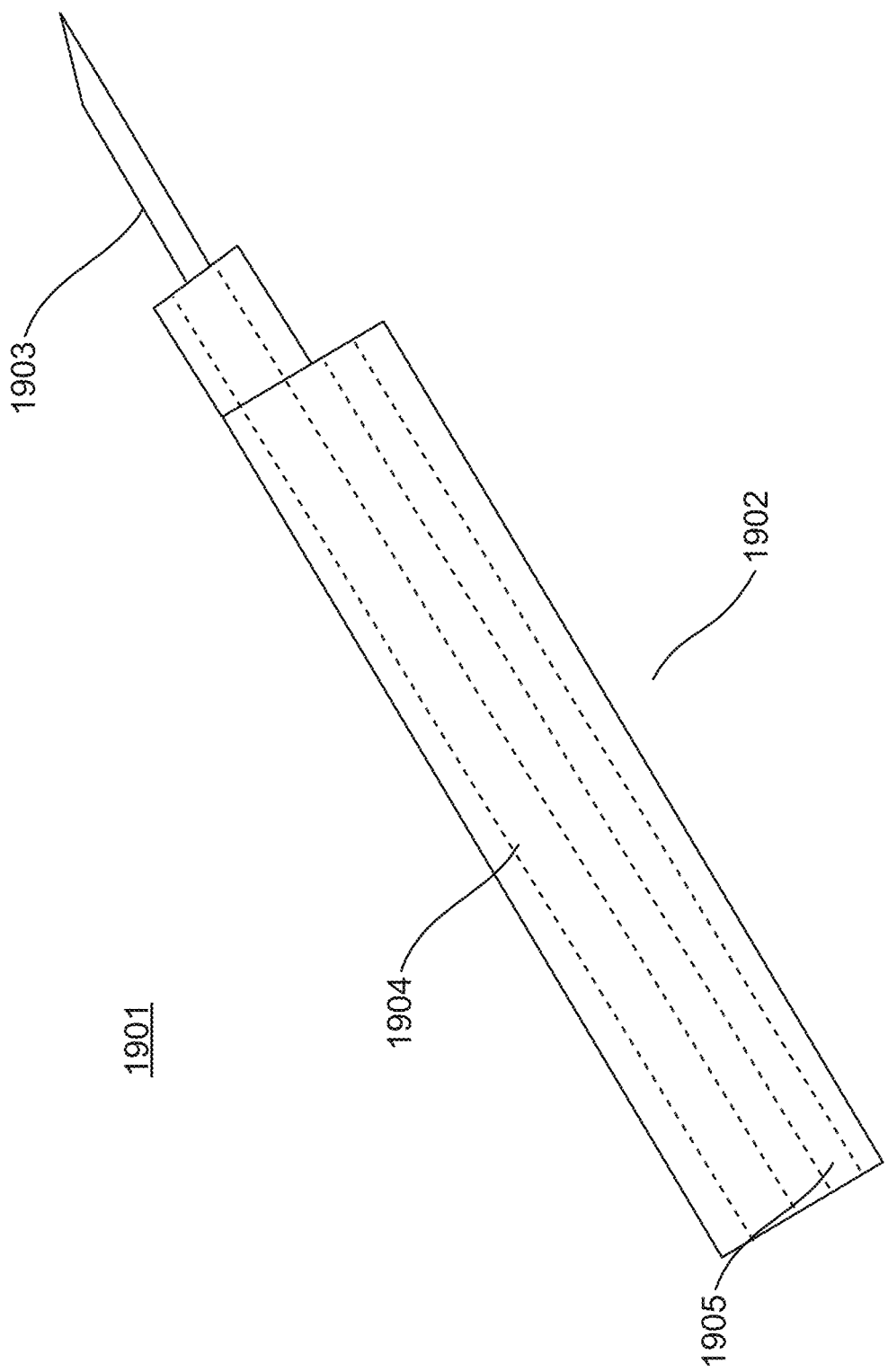
FIG. 21 illustrates a medical device distal end incorporating a catheter delivered needle according to embodiments hereof.

FIG. 21 illustrates a medical device distal end incorporating a fiber end sensor according to embodiments hereof. The medical device distal end 1901 includes a catheter 1902 and a medical tool, such as needle 1903. The catheter 1902 is configured to carry the needle 1903 (e.g., provide access through a lumen through which the needle may be conveyed) to a treatment and/or diagnosis site via the lumen 1904. The catheter 1902 may further include a guidewire lumen 1905 configured to guide the catheter 1902 along a guidewire to the treatment and/or diagnosis site. The needle 1903 is configured to be extended (e.g., by an operator, human or robotic) from the lumen 1904 of the catheter 1902 upon reaching the treatment and/or diagnosis site. In embodiments, the needle 1903 may be configured similarly to the needle 1500, including one or more sensor fibers 1501 disposed on or integrated therewith. In embodiments, the catheter 1902 may include one or more sensor fibers and one or more acoustic transducers disposed on or integrated therewith. In embodiments, the one or more sensor fibers 1501 may be used to sense, monitor, and/or track a location of the needle 1903 (for example, based on acoustic signals generated by acoustic transducers/probes located exterior to the medium in which the catheter 1902 is being used. The one or more sensor fibers 1501 and the one or more acoustic transducers disposed on the catheter 1902 may be used to generate images, e.g., through detection of acoustic echoes by the one or more sensor fibers. The one or more acoustic transducers may generate acoustic signals while the one or more sensor fibers receive echoes or reflections of the acoustic signals based on their interaction with the surrounding medium. The acoustic transducers will also receive reflected or scattered acoustic signals and/or tissue harmonics which may then be used to create an image of the surrounding area to which the tracking information will be added.

FIG. 22 illustrates an example use of a fiber based optical sensor incorporated into a needle. The uses shown may incorporate needle 1500A, needle 1500B, 1500C, 1500D, or any suitable needle that incorporates a fiber based optical sensor. As shown in FIG. 22, an external acoustic probe 2245 may be employed with a needle 1500A/B/C/D that incorporates a fiber based optical sensor. As discussed herein, in an embodiment for location/guidance, the fiber based optical sensor may receive acoustic signals generated by the external acoustic probe 2245. These acoustic signals may then be used, alone or in combination with reflected acoustic signals captured by the acoustic probe, to determine a location of the needle within the medium 2260 (e.g., the patient's body).

Figure 23B:
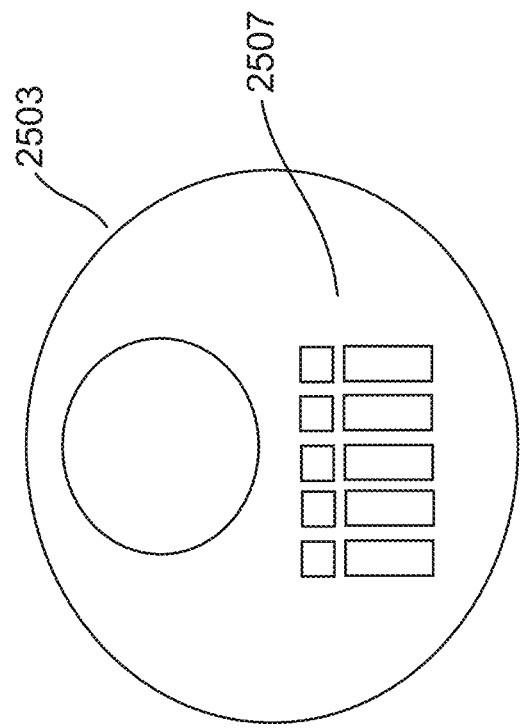
FIGS. 23A-23B illustrate a catheter delivered needle incorporating a fiber based optical sensor.
Figure 23A:
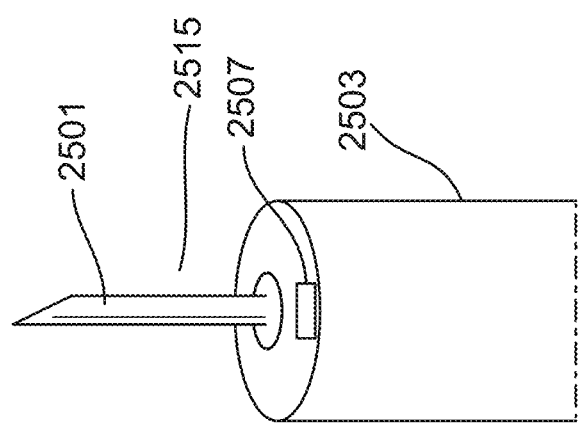

FIGS. 23A-23B illustrate embodiments of a fiber based optical sensor incorporated into a catheter delivered needle. A catheter delivered needle may be used, for example, for biopsy procedures. A needle 2515 may be delivered to a procedure site via a catheter 2503. The needle 2515 may incorporate a fiber based optical sensor 2501, as described in various embodiments herein. Upon delivery to a procedure site via the catheter 2503, the needle 2515 may be extended from a lumen in the catheter 2503 to perform the procedure. The needle 2515 may be monitored, guided, and or located, through the use of one or more external acoustic transducers that provide acoustic signals that are received by the fiber based optical sensor 2501. The acoustic transducers may be associated, e.g., with an optical sensor system. The optical sensor system, which may be an example of various optical sensor systems described herein, may provide the necessary processing and signal generation/reception requirements to perform the optical acoustic signal sensing methods described herein. In further embodiments, as illustrated in FIG. 23B, the catheter 2503 may include one or more additional transducers. For example, the catheter may include a mixed acoustic array 2507 that includes one or more of an AEG (or other suitable acoustic transducer array) array and a PIC (photonic integrated circuit) optical sensor array. US Application Publication 20230148869, filed on Nov. 18, 2022, entitled Mixed Ultrasound Transducer Arrays and incorporated herein by reference and US Application Publication US 20220350022, filed on Apr. 29, 2021, entitled Modularized Acoustic Probe and incorporated herein by reference disclose various optical sensors that may be used in a mixed transducer array. The PIC array may be adapted for detection of acoustic signals. Similar to the fiber end sensors discussed herein, the PIC array may be adapted for detection of acoustic signals by measuring or detecting changes in the optical characteristics of the PIC array that result from the incidence of acoustic signals. In embodiments, acoustic signal data captured variously by the fiber based optical sensors 2501, PIC array, AEG array, and external acoustic transducers may be used in any combination by the optical sensor system to monitor, guide, and locate the needle 2515 (and the catheter 2503 adapted to deliver it) as well as to generate images of the medium in which the catheter 2503 is deployed (e.g., a procedure site).

In further embodiments, fiber based optical sensors consistent with embodiments herein may be employed in various additional uses. For example, fiber based optical sensors may be used for tracking a cannula configured with an optical camera and moveable ultrasound transducer used in vivo during a minimally invasive surgery. In another embodiment, a transcutaneous or percutaneous ultrasound probe may be configured with one or more fiber based optical sensors according to embodiments hereof. In another embodiment, a guide wire may be configured with one or more fiber based optical sensors according to embodiments hereof.

In further embodiments, real-time visualization of a device tip including a fiber optical sensor may be co-registered with a diagnostic ultrasound image, eliminating the need for calibration. This breakthrough allows clinicians to confidently track the device in challenging anatomical regions. Real-time confidence indicators of device tip intersection with an imaging plane may be provided, with special consideration to detect when a device tip leaves the imaging plane, which may ensure accurate device tip tracking even during complex procedures. Real-time prospective visualization of tip trajectory may be provided, providing valuable insights into a predicted path of the device tip and the visualization of a device tip trail, which may be used for enhanced procedural confidence and documentation. Further, devices incorporating fiber optical sensors as described herein may facilitate the display of anatomic and blood flow images from the indwelling sensors co-registered with cross-sectional images, which may enhance diagnostic precision and confidence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Additional embodiments may include:

Embodiment 1 is an apparatus comprising: a sensor fiber including: an optical waveguide comprising a core and a cladding structure; an optical sensor structure coupled to a first end of the optical waveguide including at least one of an optical resonator, an optical interferometer, a facet end microstructure, and a polarization sensitive structure, the optical sensor structure being configured for: detecting, an acoustic signal, and providing an optical signal corresponding to the acoustic signal to the optical waveguide.

Embodiment 2 is the apparatus of embodiment 1 and further including an encapsulating structure configured with a first portion surrounding the optical waveguide and with a second portion at least partially surrounding the optical sensor structure Embodiment 3 is the apparatus of any of embodiments 1-2, wherein the optical sensor structure is a fiber optical sensor.

Embodiment 4 is the apparatus of any of embodiments 1-3, wherein the optical sensor structure is an optical resonator including a Fabry-Perot resonator, a whispering gallery mode resonator, micro-ring, micro-toroid, spiral resonator, or a photonic crystal resonator.

Embodiment 5 is the apparatus of any of embodiments 1-3, wherein the optical sensor structure is an optical interferometer including a Mach-Zehnder (MZ) interferometer, a Fabry-Perot interferometer, a phase-shift coherent interferometer, or a self-mixing interferometer Embodiment 6 is the apparatus of any of embodiments 1-3, wherein the optical sensor structure is a fiber end facet including acoustically responsive metasurface patterns, acoustically responsive low-dimensional materials, or plasmonic structures patterned to amplify light-matter interactions.

Embodiment 7 is the apparatus of any of embodiments 1-6 wherein the optical sensor structure is configured to induce a polarization change in transmitted light in response to the acoustic signal.

Embodiment 8 is the apparatus of any of embodiments 1-7 wherein the optical sensor structure is a point sensor or line sensor.

Embodiment 9 is the apparatus of any of embodiments 1-8 wherein the core or the cladding structure include a material having at least one of a relatively small Young's modulus (E) and a relatively high photo-elastic coefficient.

Embodiment 10 is the apparatus of any of embodiments 1-9 wherein the cladding structure has a lower refractive index (n) than the core.

Embodiment 11 is the apparatus of any of embodiments 1-10 wherein an acoustic impedance of the encapsulating structure is selected to match an impedance within 20% of the optical resonator structure impedance Embodiment 12 is the apparatus of any of embodiments 2-11 wherein the encapsulating structure comprises a material having a relatively small Young's modulus (E), a relatively high photo-elastic coefficient, and/or a relatively large refractive index (n).

Embodiment 13 is the apparatus of any of embodiments 1-12 wherein an acoustic impedance of the encapsulating structure is selected to match an impedance within 20% of an optical resonator structure impedance Embodiment 14 is the apparatus of any of embodiments 1-13, further comprising a medical device in which the sensor fiber is disposed.

Embodiment 15 is the apparatus of embodiment 14 where the medical device is one of a needle, an endoscope, a catheter, a cannula, a guidewire, a surgical tool, diagnostic tool or a therapeutic tool.

Embodiment 16 is the apparatus of embodiment 15, wherein the medical device is a needle including: a shaft portion configured to receive the sensor fiber; and a tip portion configured to receive the optical sensor structure.

Embodiment 17 is the apparatus of embodiment 16, wherein the needle further includes a window in the shaft portion or the tip portion approximate the optical sensor structure.

Embodiment 18 is the apparatus of embodiment 16, wherein the needle further includes a channel disposed in the shaft portion, the sensor fiber being disposed within the channel.

Embodiment 19 is the apparatus of embodiment 16, wherein the needle further includes a sheath disposed around the needle and configured to contain the sensor fiber.

Embodiment 20 is the apparatus of embodiment 17, wherein the needle further includes a plurality of additional windows in the shaft portion or the tip portion.

Embodiment 21 is the apparatus of any of embodiments 1-20, wherein the optical sensor structure is configured to detect the acoustic signal across a directional range of at least 180 degrees. at least 270 degrees, at least 300 degrees, at least 330 degrees, or 360 degrees.

Embodiment 22 is the apparatus of any of embodiments 1-21, wherein the optical sensor structure is configured for forward facing detection of the acoustic signal.

Embodiment 23 is the apparatus of any of embodiments 1-22, wherein the optical sensor structure is further configured for backward looking detection of acoustic signal.

Embodiment 24 is the apparatus of any of embodiments 1-23, wherein the optical sensor structure is configured for sideways facing detection of the acoustic signal.

Embodiment 25 is the apparatus of any of embodiments 1-24, wherein the optical sensor structure includes a distal portion comprising silica and a proximal portion comprising polymer.

Embodiment 26 is the apparatus of embodiment 16, wherein the optical sensor structure includes an in-fiber Bragg grating.

Embodiment 27 is the apparatus of any of embodiments 1-26, wherein the core is included among a plurality of cores in the optical waveguide.

Embodiment 28 is the apparatus of any of embodiments 1-28, further comprising: a light source configured to provide light to the optical sensor structure via the optical waveguide; a photodetector configured to receive the optical signal; and a processing unit configured to: control the light source, receive optical data based on the optical signal from the photodetector, and perform at least one of image generation and location determination based on the optical data.

Embodiment 29 is the apparatus of any of embodiments 1-28, further comprising: a wavelength tuning mechanism configured to adjust a resonance of the optical sensor structure via application of at least one of heat and mechanical stress.

Embodiment 30 is the apparatus of embodiment 28, wherein the light source is an operating laser and the processing unit is further configured to tune a wavelength of the operating laser.

The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single module, device, or unit for purposes of clarity, it should be understood that the features and functions described herein may be performed by any combination of units or modules. Thus, various changes and modifications may be affected by one skilled in the art without departing from the spirit or scope of the invention as defined in the appended claims.

The invention claimed is:

1. An apparatus comprising:
a sensor fiber including:
an optical waveguide comprising a core and a cladding structure;
an optical sensor structure coupled to a first end of the optical waveguide including at least one of an optical resonator, an optical interferometer, a facet end microstructure, and a polarization sensitive structure, the optical sensor structure being configured for:
detecting an acoustic signal, and
providing an optical signal corresponding to the acoustic signal to the optical waveguide.

2. The apparatus of claim 1, further including an encapsulating structure configured with a first portion surrounding the optical waveguide and with a second portion at least partially surrounding the optical sensor structure.

3. The apparatus of claim 1, wherein the optical sensor structure is a fiber optical sensor.

4. The apparatus of claim 1, wherein the optical sensor structure is an optical resonator including a Fabry-Perot resonator, a whispering gallery mode resonator, micro-ring, micro-toroid, spiral resonator, or a photonic crystal resonator.

5. The apparatus of claim 1, wherein the optical sensor structure is an optical interferometer including a Mach-Zehnder (MZ) interferometer, a Fabry-Perot interferometer, a phase-shift coherent interferometer, or a self-mixing interferometer.

6. The apparatus of claim 1, wherein the optical sensor structure is a fiber end facet including acoustically responsive metasurface patterns, acoustically responsive low-dimensional materials, or plasmonic structures patterned to amplify light-matter interactions.

7. The apparatus of claim 1, wherein the optical sensor structure is configured to induce a polarization change in transmitted light in response to the acoustic signal.

8. The apparatus of claim 1, wherein the optical sensor structure is a point sensor or line sensor.

9. The apparatus of claim 1, wherein the core or the cladding structure include a material having at least one of a relatively small Young's modulus (E) and a relatively high photo-elastic coefficient.

10. The apparatus of claim 2, wherein the cladding structure has a lower refractive index (n) than the core.

11. The apparatus of claim 2, wherein an acoustic impedance of the encapsulating structure is selected to match an impedance within 20% of an optical resonator structure impedance.

12. The apparatus of claim 2, wherein the encapsulating structure comprises a material having a relatively small Young's modulus (E), a relatively high photo-elastic coefficient, and/or a relatively large refractive index (n).

13. The apparatus of claim 10, wherein an acoustic impedance of the encapsulating structure is selected to match an impedance within 20% of an optical resonator structure impedance.

14. The apparatus of claim 1, further comprising a medical device in which the sensor fiber is disposed.

15. The apparatus of claim 14, where the medical device is one of a needle, an endoscope, a catheter, a cannula, a guidewire, a surgical tool, diagnostic tool or a therapeutic tool.

16. The apparatus of claim 15, wherein the medical device is a needle including:
a shaft portion configured to receive the sensor fiber; and
a tip portion configured to receive the optical sensor structure.

17. The apparatus of claim 16, wherein the needle further includes a window in the shaft portion or the tip portion approximate the optical sensor structure.

18. The apparatus of claim 16, wherein the needle further includes a channel disposed in the shaft portion, the sensor fiber being disposed within the channel.

19. The apparatus of claim 16, wherein the needle further includes a sheath disposed around the needle and configured to contain the sensor fiber.

20. The apparatus of claim 17, wherein the needle further includes a plurality of additional windows in the shaft portion or the tip portion.

21. The apparatus of claim 1, wherein the optical sensor structure is configured to detect the acoustic signal across a directional range of at least 180 degrees, at least 270 degrees, at least 300 degrees, at least 330 degrees, or 360 degrees.

22. The apparatus of claim 1, wherein the optical sensor structure is configured for forward facing detection of the acoustic signal.

23. The apparatus of claim 1, wherein the optical sensor structure is further configured for backward looking detection of acoustic signal.

24. The apparatus of claim 1, wherein the optical sensor structure is configured for sideways facing detection of the acoustic signal.

25. The apparatus of claim 1, wherein the optical sensor structure includes a distal portion comprising silica and a proximal portion comprising polymer.

26. The apparatus of claim 16, wherein the optical sensor structure includes an in-fiber Bragg grating.

27. The apparatus of claim 1, wherein the core is included among a plurality of cores in the optical waveguide.

28. The apparatus of claim 1, further comprising:
a light source configured to provide light to the optical sensor structure via the optical waveguide;
a photodetector configured to receive the optical signal; and
a processing unit configured to:
control the light source,
receive optical data based on the optical signal from the photodetector, and
perform at least one of image generation and location determination based on the optical data.

29. The apparatus of claim 1, further comprising:
a wavelength tuning mechanism configured to adjust a resonance of the optical sensor structure via application of at least one of heat and mechanical stress.

30. The apparatus of claim 28, wherein the light source is an operating laser and the processing unit is further configured to tune a wavelength of the operating laser.

* * * * *